US012649582B2

(12) United States Patent
Tulsyan

(10) Patent No.: US 12,649,582 B2
(45) Date of Patent: Jun. 9, 2026

(54) SYSTEMS AND METHODS FOR OIL MAINTENANCE AND DISTRIBUTION IN ELECTRIC ENGINES FOR EVTOL AIRCRAFT

(71) Applicant: Archer Aviation Inc., San Jose, CA (US)

(72) Inventor: Bharat Tulsyan, San Jose, CA (US)

(73) Assignee: Archer Aviation Inc., San Jose, CA (US)

( * ) Notice: Subject to any disclaimer, the term of this patent is extended or adjusted under 35 U.S.C. 154(b) by 0 days.

(21) Appl. No.: 18/814,297

(22) Filed: Aug. 23, 2024

(65) Prior Publication Data

US 2026/0054844 A1     Feb. 26, 2026

(51) Int. Cl.
*B64D 27/31*          (2024.01)
*B64C 29/00*          (2006.01)

(52) U.S. Cl.
CPC .......... *B64D 27/31* (2024.01); *B64C 29/0033* (2013.01)

(58) Field of Classification Search
CPC ........ B64D 27/31; B64D 27/30; B64D 27/34; B64C 29/0033
See application file for complete search history.

(56) References Cited

U.S. PATENT DOCUMENTS

| | | | |
|---|---|---|---|
| RE19,893 E | 3/1936 | Lipman | |
| 2,135,477 A | 11/1938 | Griswold | |
| 2,477,024 A | 7/1949 | Webster | |
| 3,087,078 A | 4/1963 | Brown | |
| 3,217,193 A | 11/1965 | Rayner | |
| 3,802,795 A | 4/1974 | Nyeste et al. | |
| 3,909,584 A | 9/1975 | Brienza et al. | |
| 4,092,946 A | 6/1978 | Kappas | |
| 4,544,166 A | 10/1985 | Karasawa | |
| 5,443,130 A | 8/1995 | Tanaka et al. | |
| 5,461,636 A | 10/1995 | Karube et al. | |
| 5,742,484 A | 4/1998 | Gillette et al. | |
| 5,831,358 A | 11/1998 | Bobay | |
| 5,833,566 A | 11/1998 | Showalter | |

(Continued)

FOREIGN PATENT DOCUMENTS

| | | |
|---|---|---|
| CN | 2507177 Y | 8/2002 |
| CN | 201887602 U | 6/2011 |

(Continued)

OTHER PUBLICATIONS

"Flex without the Flex", cy384, Nov. 12, 2020, http://www.cy384.com/blog/flex-pcbs.html. 5 pages.

(Continued)

*Primary Examiner* — Rodney A Bonnette
(74) *Attorney, Agent, or Firm* — Finnegan, Henderson, Farabow, Garrett & Dunner, LLP

(57)     ABSTRACT

An electric propulsion system comprising an electric motor assembly. The electric motor assembly may include a rotor and a stator. The stator may have end windings. The electric propulsion system may include a main shaft connected to the rotor and a collar connected to a rotating component of the electric motor assembly. The collar may encircle the main shaft. The collar may include a channel configured to direct a fluid away from the main shaft, through at least one opening in the collar, and toward the end windings.

20 Claims, 35 Drawing Sheets

(56) References Cited

U.S. PATENT DOCUMENTS

| | | | |
|---|---|---|---|
| 6,743,135 | B2 | 6/2004 | Klemen et al. |
| 7,753,151 | B2 | 7/2010 | Marsh et al. |
| 8,251,861 | B2 | 8/2012 | Varela |
| 8,313,403 | B2 | 11/2012 | Wilson, Jr. |
| 8,360,928 | B2 | 1/2013 | Tabata et al. |
| 8,371,978 | B2 | 2/2013 | Nobata et al. |
| 8,393,791 | B2 | 3/2013 | Thornton et al. |
| 8,427,019 | B2 | 4/2013 | Garriga et al. |
| 8,480,528 | B2 | 7/2013 | Wilhelm et al. |
| 8,531,072 | B2 | 9/2013 | Wishart |
| 8,649,925 | B2 | 2/2014 | Light et al. |
| 8,650,980 | B2 | 2/2014 | Lafer et al. |
| 8,692,425 | B2 | 4/2014 | Creviston et al. |
| 8,771,123 | B2 | 7/2014 | Palfai et al. |
| 9,163,715 | B2 | 10/2015 | Valente |
| 9,216,804 | B2 | 12/2015 | Van Der Laan et al. |
| 9,272,777 | B2 | 3/2016 | McGlaun et al. |
| 9,306,433 | B2 | 4/2016 | Sten et al. |
| 9,413,208 | B2 | 8/2016 | Pal |
| 9,482,269 | B2 | 11/2016 | Fruin et al. |
| 9,677,663 | B2 | 6/2017 | Sammataro et al. |
| 9,689,466 | B2 | 6/2017 | Kanai et al. |
| 9,702,255 | B2 | 7/2017 | Martin et al. |
| 9,787,164 | B2 | 10/2017 | Buttner et al. |
| 9,917,488 | B2 | 3/2018 | Major |
| 9,994,305 | B1 | 6/2018 | Moldovan |
| 10,017,247 | B1 | 7/2018 | Elliott et al. |
| 10,116,187 | B1 | 10/2018 | Wishart |
| 10,145,753 | B2 | 12/2018 | Perelman et al. |
| 10,220,698 | B2 | 3/2019 | Shibata et al. |
| 10,302,185 | B2 | 5/2019 | Kawakami et al. |
| 10,351,235 | B2 | 7/2019 | Karem et al. |
| 10,392,089 | B2 | 8/2019 | Bentgen et al. |
| 10,476,351 | B2 | 11/2019 | Francis et al. |
| 10,502,312 | B1 | 12/2019 | Jaszewski et al. |
| 10,598,269 | B2 | 3/2020 | Pydin |
| 10,679,586 | B2 | 6/2020 | Poster |
| 10,850,841 | B2 | 12/2020 | Bonden et al. |
| 10,967,934 | B2 | 4/2021 | Ferguson |
| 11,005,318 | B2 | 5/2021 | Nakane et al. |
| 11,059,598 | B2 | 7/2021 | Arkus et al. |
| 11,105,340 | B2 | 8/2021 | Cheung et al. |
| 11,213,934 | B2 | 1/2022 | Bandy et al. |
| 11,305,869 | B1 | 4/2022 | Ward |
| 11,401,042 | B2 | 8/2022 | Peleg |
| 11,413,946 | B2 | 8/2022 | Absenger et al. |
| 11,414,198 | B2 | 8/2022 | Harvey |
| 11,440,401 | B2 | 9/2022 | Sugimoto et al. |
| 11,447,004 | B2 | 9/2022 | Misu et al. |
| 11,453,286 | B2 | 9/2022 | Wishart |
| 11,465,488 | B2 | 10/2022 | Li et al. |
| 11,613,350 | B1 | 3/2023 | Bodla et al. |
| 11,787,551 | B1 * | 10/2023 | Graves ................... H02K 7/003 244/56 |
| 12,024,304 | B2 | 7/2024 | Graves et al. |
| 12,366,184 | B1 * | 7/2025 | Tulsyan ................ H02K 5/203 |
| 2004/0106428 | A1 | 6/2004 | Shoji |
| 2004/0195044 | A1 | 10/2004 | Kimura et al. |
| 2005/0206251 | A1 | 9/2005 | Foster |
| 2008/0022981 | A1 | 1/2008 | Keyaki et al. |
| 2009/0206709 | A1 | 8/2009 | Kakuda et al. |
| 2012/0021621 | A1 | 1/2012 | Kim |
| 2012/0091833 | A1 | 4/2012 | Hackett et al. |
| 2012/0305294 | A1 | 12/2012 | Takaura |
| 2012/0326573 | A1 | 12/2012 | Yamamoto et al. |
| 2013/0126669 | A1 | 5/2013 | Hamann et al. |
| 2013/0255416 | A1 | 10/2013 | Terauchi |
| 2014/0151495 | A1 | 6/2014 | Kuhn, Jr. |
| 2014/0274528 | A1 | 9/2014 | Valente et al. |
| 2015/0044075 | A1 | 2/2015 | Abe et al. |
| 2016/0013704 | A1 | 1/2016 | Wagner et al. |
| 2016/0123417 | A1 | 5/2016 | Rehfus et al. |
| 2016/0294257 | A1 | 10/2016 | Murakami et al. |
| 2016/0336700 | A1 | 11/2016 | Caveney et al. |
| 2016/0341281 | A1 | 11/2016 | Brunvold et al. |
| 2017/0301992 | A1 | 10/2017 | Khlat et al. |
| 2018/0056774 | A1 | 3/2018 | Chan |
| 2018/0180164 | A1 | 6/2018 | Hagino |
| 2018/0283524 | A1 | 10/2018 | Uematsu et al. |
| 2018/0363762 | A1 | 12/2018 | Kiyokami et al. |
| 2019/0028815 | A1 | 1/2019 | Brioschi et al. |
| 2019/0063503 | A1 | 2/2019 | Nowoisky et al. |
| 2019/0211841 | A1 | 7/2019 | Cottrell et al. |
| 2019/0285168 | A1 | 9/2019 | Ikeda et al. |
| 2019/0319551 | A1 | 10/2019 | Song et al. |
| 2019/0366951 | A1 | 12/2019 | Young et al. |
| 2020/0140049 | A1 | 5/2020 | Gil et al. |
| 2020/0149534 | A1 | 5/2020 | Wetterau |
| 2020/0215920 | A1 | 7/2020 | Suyama et al. |
| 2020/0262574 | A1 | 8/2020 | Peleg |
| 2020/0361622 | A1 | 11/2020 | Groninga et al. |
| 2020/0385139 | A1 | 12/2020 | Verna et al. |
| 2021/0018089 | A1 | 1/2021 | Guarino |
| 2021/0053433 | A1 | 2/2021 | Gyarmati et al. |
| 2021/0104935 | A1 | 4/2021 | Morrison |
| 2021/0107620 | A1 | 4/2021 | Weekes et al. |
| 2021/0190201 | A1 | 6/2021 | Shimokobe et al. |
| 2021/0226518 | A1 | 7/2021 | Hung et al. |
| 2021/0254705 | A1 | 8/2021 | Olson et al. |
| 2021/0276702 | A1 | 9/2021 | Heironimus et al. |
| 2021/0276707 | A1 | 9/2021 | Heironimus et al. |
| 2021/0291971 | A1 | 9/2021 | Bernard |
| 2021/0328482 | A1 | 10/2021 | Rutowski et al. |
| 2021/0336510 | A1 | 10/2021 | Yang et al. |
| 2021/0339881 | A1 | 11/2021 | Bevirt et al. |
| 2021/0344255 | A1 | 11/2021 | Said et al. |
| 2021/0403155 | A1 | 12/2021 | Neiser |
| 2022/0069664 | A1 | 3/2022 | Kim et al. |
| 2022/0119121 | A1 | 4/2022 | Lacaux et al. |
| 2022/0127011 | A1 * | 4/2022 | Long ..................... B64D 27/31 |
| 2022/0135179 | A1 | 5/2022 | Lee |
| 2022/0145806 | A1 | 5/2022 | Beck et al. |
| 2022/0186670 | A1 | 6/2022 | Blake et al. |
| 2022/0190764 | A1 | 6/2022 | Yoon |
| 2022/0221048 | A1 | 7/2022 | Remboski et al. |
| 2022/0250756 | A1 | 8/2022 | Wagner et al. |
| 2022/0252146 | A1 | 8/2022 | Hart et al. |
| 2022/0263384 | A1 | 8/2022 | Kapatral et al. |
| 2022/0267020 | A1 | 8/2022 | Warbeck |
| 2022/0289371 | A1 | 9/2022 | Schroeder et al. |
| 2022/0294295 | A1 | 9/2022 | Yang et al. |
| 2022/0297848 | A1 | 9/2022 | Sivalingam et al. |
| 2022/0306300 | A1 | 9/2022 | Matsumoto |
| 2022/0306305 | A1 | 9/2022 | Cottrell et al. |
| 2022/0315237 | A1 | 10/2022 | Fukuchi |
| 2022/0316582 | A1 | 10/2022 | Inoue |
| 2022/0357223 | A1 | 11/2022 | Khazaai et al. |
| 2022/0360133 | A1 | 11/2022 | Striedelmeyer |
| 2022/0380037 | A1 | 12/2022 | Vander Lind |

FOREIGN PATENT DOCUMENTS

| | | |
|---|---|---|
| CN | 202997950 U | 6/2013 |
| CN | 108390577 A | 8/2018 |
| CN | 108736744 A | 11/2018 |
| CN | 109672300 B | 4/2019 |
| CN | 208907678 U | 5/2019 |
| CN | 209516989 U | 10/2019 |
| CN | 111465171 A | 7/2020 |
| CN | 212163179 U | 12/2020 |
| CN | 113162299 A | 7/2021 |
| CN | 113410060 B | 4/2022 |
| CN | 216721843 U | 6/2022 |
| CN | 114928212 A | 8/2022 |
| CN | 217388412 U | 9/2022 |
| DE | 202012101392 U1 | 5/2012 |
| DE | 102017101379 A1 | 7/2018 |
| DE | 212020000044 U1 | 5/2020 |
| DE | 102019213857 A1 | 3/2021 |
| EP | 0052015 B1 | 5/1982 |
| EP | 0488434 B1 | 6/1992 |
| EP | 2650567 A1 | 10/2013 |
| EP | 2824806 A1 | 1/2015 |
| EP | 3139044 B1 | 3/2017 |

(56) References Cited

FOREIGN PATENT DOCUMENTS

| | | | |
|---|---|---|---|
| EP | 2735501 | B1 | 6/2018 |
| EP | 3078534 | B1 | 8/2019 |
| EP | 3919376 | A1 | 12/2021 |
| EP | 3939890 | A1 | 1/2022 |
| EP | 4071983 | A1 | 10/2022 |
| EP | 4266546 | A1 | 10/2023 |
| JP | 3955874 | B2 | 8/2007 |
| JP | 6279059 | B1 | 2/2018 |
| KR | 20100082105 | A | 7/2010 |
| WO | 2012042806 | A1 | 4/2012 |
| WO | 2014026202 | A2 | 2/2014 |
| WO | 2014114560 | A1 | 7/2014 |
| WO | 2017166811 | A1 | 10/2017 |
| WO | 2018026735 | A1 | 2/2018 |
| WO | 2019099378 | A1 | 5/2019 |
| WO | 2020015590 | A1 | 1/2020 |
| WO | 2021114606 | A1 | 6/2021 |
| WO | 2021222528 | A1 | 11/2021 |
| WO | 2021236576 | A1 | 11/2021 |
| WO | 2022074405 | A1 | 4/2022 |
| WO | 2022076531 | A1 | 4/2022 |
| WO | 2022096059 | A1 | 5/2022 |
| WO | 2022123229 | A1 | 6/2022 |
| WO | 2022135939 | A1 | 6/2022 |
| WO | 2022156546 | A1 | 7/2022 |
| WO | 2022197838 | A1 | 9/2022 |
| WO | 2022213209 | A1 | 10/2022 |
| WO | 2022223810 | A1 | 10/2022 |

OTHER PUBLICATIONS

"Endless-Snake Flexible Printed Circuits", Leiton, May 20, 2022. 4 pages.

"Things to Know About PCB for LED Strips", MyLeoy, Sep. 13, 2021. 12 pages.

Ing, W. et al."New Generation of Intelligent Electromechanical Valve Actuation", 11th International Fluid Power Conference 2018, 5 pages.

Jeon, D. et al., "4 Types of Enclosures for Large Motors", TMEIC, Jul. 4, 2021, 8 pages.

PCT International Search Report and Written Opinion mailed Dec. 14, 2023, issued in corresponding International Application No. PCT/US2023/076299 (10 pgs.).

PCT International Search Report and Written Opinion mailed Dec. 22, 2025, issued in corresponding International Application No. PCT/US2025/042415 (10 pgs.).

* cited by examiner

1300

1300

1400

1400

1400

1402

1412

1400

1400

1404

1412

1423

1402

1414

1400

1404

1412

1402

1414

1400

OIL INLET
OIL OUTLETS

OIL INLET

OIL OUTLETS

1600

SYSTEMS AND METHODS FOR OIL MAINTENANCE AND DISTRIBUTION IN ELECTRIC ENGINES FOR EVTOL AIRCRAFT

TECHNICAL FIELD

This disclosure relates generally to the field of engines. More particularly, and without limitation, the present disclosure relates to innovations in cooling and lubricating engine systems. Certain aspects of the present disclosure generally relate to improvements in electric propulsion systems that may be used in aircrafts driven by electric motors and in other types of vehicles.

SUMMARY

Some embodiments of the present disclosure addresses systems, components, and techniques primarily for use in a non-conventional aircraft driven by an electric propulsion system. For example, a tilt-rotor aircraft according to embodiments of the present disclosure may be configured for frequent (e.g., over 50 flights per work day), short-duration flights (e.g., less than 100 miles per flight) over, into, and out of densely populated regions. The aircraft may be configured to carry 4-6 passengers or commuters who have an expectation of a comfortable experience with low noise and low vibration. Accordingly, it may be desired that components of the aircraft are configured and designed to withstand frequent use without wearing, generate less heat and vibration, and that the aircraft include mechanisms to effectively control and manage heat or vibration generated by the components.

The disclosed embodiments may include apparatuses and methods for distributing oil or other coolant to heated components of an electric propulsion system. For example, in some embodiments, the electric propulsion system may include an electric motor assembly including a stator, a rotor, and a main shaft connected to the rotor. In some embodiments, the stator may include end windings which generate large amounts of heat during use. Accordingly, some disclosed embodiments may include a collar connected to a main shaft for distributing oil to the stator windings. In some embodiments, the collar encircles the main shaft. In some embodiments, the collar may include a channel configured to direct a fluid away from the main shaft, through at least one opening in the collar, and toward the end windings.

In some embodiments, the collar includes a first portion and a second portion, and the channel may be formed between the first portion and the second portion. In some embodiments, the first portion extends outward from the main shaft, and the second portion extends inward toward the main shaft in relation to the first portion. In some embodiments, one of the first portion or the second portion comprises a bend configured to direct the fluid around the rotor. Some disclosed embodiments include a bearing at an output end of the main shaft. In some embodiments, the bend may be disposed adjacent to the bearing. In some embodiments, the fluid may be fed to the collar from a rotating component of the electric propulsion system. In some embodiments, the rotating component includes a bearing at an output end of the main shaft. In some embodiments, a fluid pressure at the at least one opening depends on a depth of the fluid in the channel and a rotational speed of the collar. In some embodiments, the at least one opening in the collar includes a slit. In some embodiments, the at least one opening in the collar includes a plurality of openings in the collar. In some embodiments, a first opening of the plurality of openings is configured to direct the fluid in a first direction and a second opening of the plurality of openings is configured to direct the fluid in a second direction different from the first direction.

Some disclosed embodiments include a method of operating an electric propulsion system. Some disclosed embodiments involve operating the electric motor assembly discussed above. Some disclosed embodiments involve distributing fluid by the collar when the main shaft is rotated to direct the fluid away from the main shaft, through at least one opening in the collar, and toward the end windings.

DETAILED DESCRIPTION

The disclosed embodiments provide systems, subsystems, and components for VTOL aircraft having various combinations of an electric propulsion system and cooling systems that maximize performance while minimizing weight.

Reference will now be made in detail to exemplary embodiments, examples of which are illustrated in the accompanying drawings. The following description refers to the accompanying drawings in which the same numbers in different drawings may represent the same or similar elements unless otherwise represented. The implementations set forth in the following description of exemplary embodiments do not represent all implementations consistent with the disclosure. Instead, they are merely examples of apparatuses and methods consistent with aspects related to the subject matter recited in the appended claims.

Figure 1A:
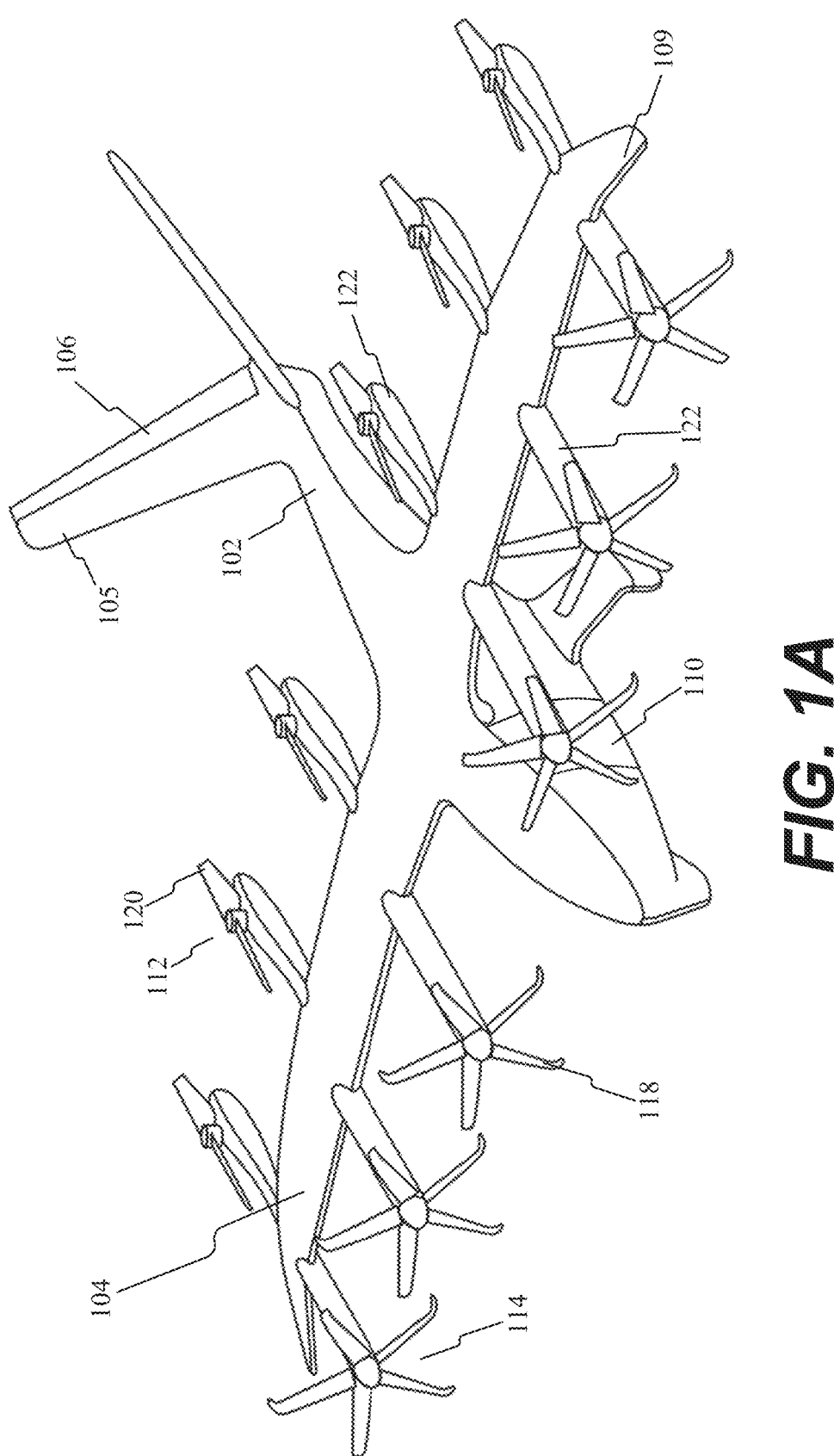
FIGS. 1A and 1B are illustrations of a perspective view of an exemplary VTOL aircraft, consistent with disclosed embodiments.
Figure 1B:
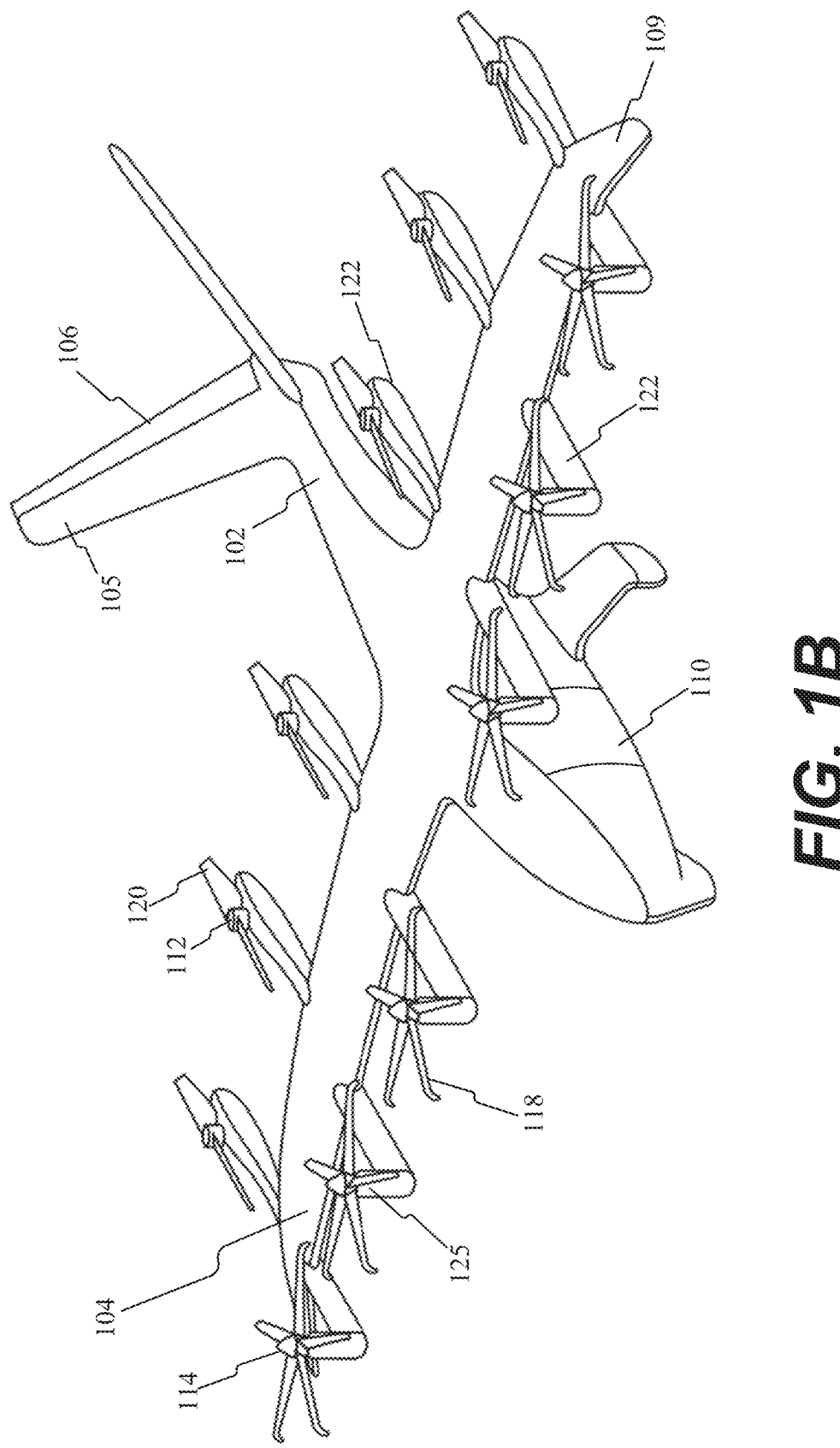

FIGS. 1A and 1B illustrate a VTOL aircraft 100 in a cruise configuration and a vertical take-off, landing and hover configuration (also referred to herein as a "lift" configuration), respectively, consistent with embodiments of the present disclosure. The aircraft 100 may include a fuselage 102, wings 104 mounted to the fuselage 102, tail 105, and one or more rear stabilizers 106 mounted to the tail 105 or the rear of the fuselage 102. A plurality of lift propellers 112 may be mounted to wings 104 and configured to provide lift for vertical take-off, landing and hover. A plurality of tilt propellers 114 may be mounted to wings 104 and may be tiltable between the cruise configuration in which they provide forward thrust to aircraft 100 for horizontal flight, as shown in FIG. 1A, and the lift configuration in which they provide a portion of the lift required for vertical take-off, landing and hovering, as shown in FIG. 1B. As used herein, a lift configuration may refer to a tilt propeller orientation in which the tilt propeller thrust is providing primarily lift to the aircraft. A cruise configuration may refer to a tilt propeller orientation in which the tilt propeller thrust is providing primarily forward thrust to the aircraft. Alternatively, a cruise configuration may refer to a configuration in which a lift propeller is stowed.

In some embodiments, lift propellers 112 may be configured for providing lift only, with all propulsion being provided by the tilt propellers. Accordingly, lift propellers 112 may be in fixed positions and may only generate thrust during take-off, landing and hover. Meanwhile, tilt propellers 114 may be tilted to lift configurations in which their thrust is directed vertically for providing additional lift.

For forward flight, tilt propellers 114 may tilt from their lift configurations to their cruise configurations. In other words, the pitch and tilt angle of tilt propellers 114 may be varied from an orientation in which the tilt propeller thrust is directed vertically (to provide lift during vertical take-off, landing and hover) to an orientation in which the tilt propeller thrust is directed horizontally (to provide forward thrust to aircraft 100). The tilt propellers may tilt about axes that may be perpendicular to the forward direction of the aircraft 100. When the aircraft 100 is in full forward flight during the cruise configuration, lift may be provided entirely by wings 104. Meanwhile, lift propellers 112 may be shut off. The blades 120 of lift propellers 112 may be locked in low-drag positions for aircraft cruising. In some embodiments, lift propellers 112 may each have two blades 120 that may be locked for cruising in minimum drag positions in which one blade is directly in front of the other blade as illustrated in FIG. 1A. In some embodiments, lift propellers 112 have more than two blades. In some embodiments, there may be more blades 118 on tilt propellers 114 than on lift propellers 112. For example, as illustrated in FIGS. 1A and 1B, lift propellers 112 may each include, e.g., two blades and tilt propellers 114 may each include, e.g., five blades. In some embodiments, tilt propellers 114 may have, e.g., from 2 to 5 blades.

In some embodiments, the aircraft may include only one wing 104 on each side of fuselage 102 (or a single wing that extends across the entire aircraft) and at least a portion of lift propellers 112 may be located rearward of wings 104 and at least a portion of tilt propellers 114 may be located forward of wings 104. In some embodiments, all of lift propellers 112 may be located rearward of wings 104 and all of tilt propellers 114 may be located forward of wings 104. According to some embodiments, all lift propellers 112 and tilt propellers 114 may be mounted to the wings—i.e., no lift propellers or tilt propellers may be mounted to the fuselage. In some embodiments, lift propellers 112 may be all located rearwardly of wings 104 and tilt propellers 114 may be all located forward of wings 104. According to some embodiments, all lift propellers 112 and tilt propellers 114 may be positioned inwardly of the wing tips 109.

In some embodiments, lift propellers 112 and tilt propellers 114 may be mounted to wings 104 by booms 122. Booms 122 may be mounted beneath wings 104, on top of the wings, and/or may be integrated into the wing profile. In some embodiments, one lift propeller 112 and one tilt propeller 114 may be mounted to each boom 122. Lift propeller 112 may be mounted at a rear end of boom 122 and tilt propeller 114 may be mounted at a front end of boom 122. In some embodiments, lift propeller 112 may be mounted in a fixed position on boom 122. In some embodiments, tilt propeller 114 may mounted to a front end of boom 122 via a hinge. Tilt propeller 114 may be mounted to boom 122 such that tilt propeller 114 is aligned with the body of boom 122 when in the cruise configuration, forming a continuous extension of the front end of boom 122 that minimizes drag for forward flight. In some embodiments, propulsion system 125 may provide propulsion to propellers.

In some embodiments, aircraft 100 may include, e.g., one wing on each side of fuselage 102 or a single wing that extends across the aircraft. According to some embodiments, the at least one wing 104 is a high wing mounted to an upper side of fuselage 102. According to some embodiments, the wings include control surfaces, such as flaps, ailerons or flaperons. According to some embodiments, the wings may have curved wing tips 109 for reduced drag during forward flight.

In some embodiments, rear stabilizers 106 include control surfaces, such as one or more rudders, one or more elevators, and/or one or more combined rudder-elevators. The wing(s) may have any suitable design. For example, the wings have a tapering leading edge or a tapering trailing edge. In some embodiments, the wings may have a substantially straight leading edge in the central section of wings 104.

Aircraft 100 may include at least one door 110 for passenger entry and exit. In some embodiments, the door 110 may be located beneath and forward of wings 104 as seen in FIGS. 1A and 1B.

Further discussion of VTOL aircraft may be found in U.S. Patent Publication No. 2021/0362849, which is incorporated by reference in its entirety.

Figure 2:
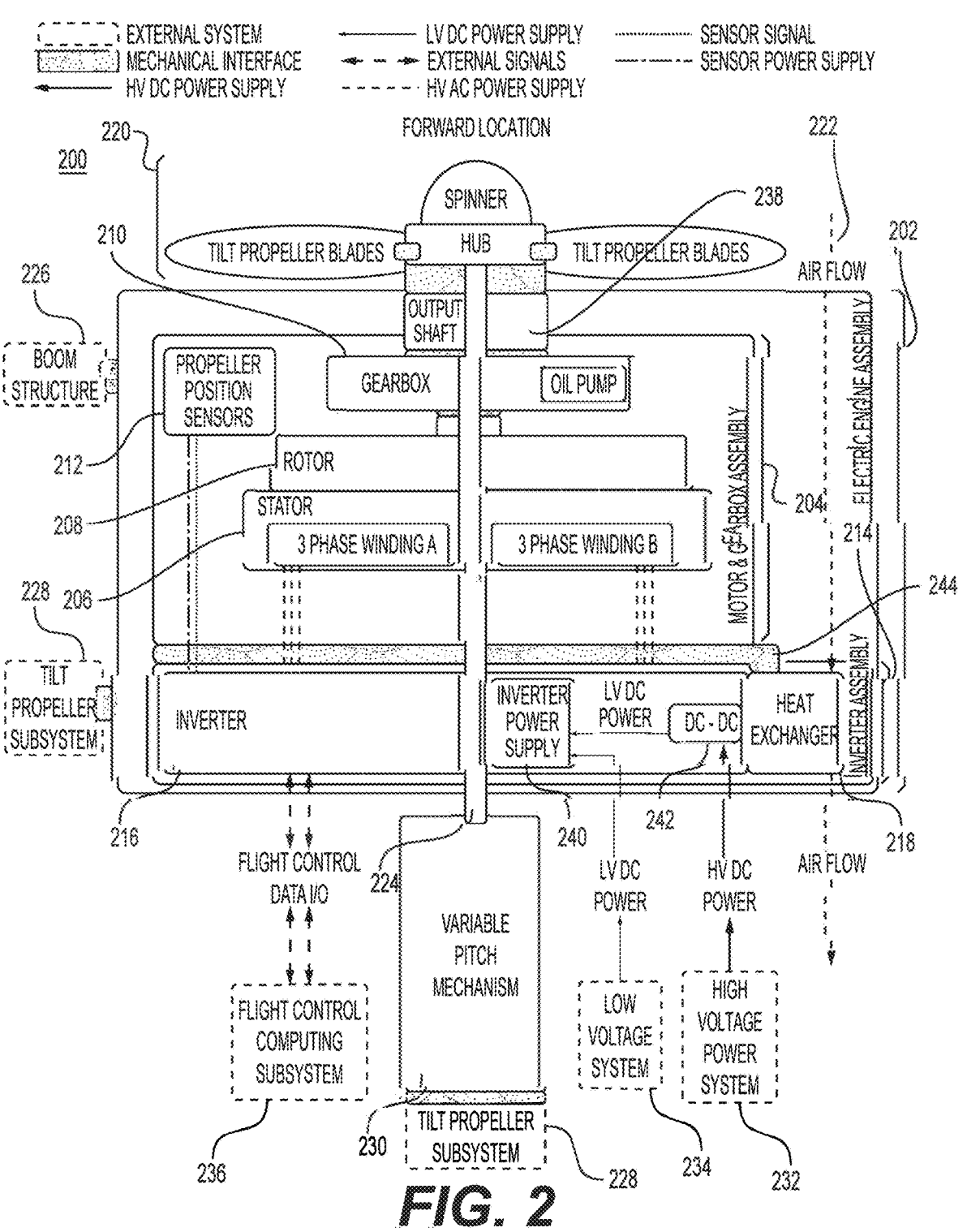
FIG. 2 is a schematic diagram illustrating an exemplary tilt electric propulsion system of a VTOL aircraft, consistent with disclosed embodiments.

FIG. 2 is a schematic diagram illustrating an exemplary tilt electric propulsion system of a VTOL aircraft, consistent with disclosed embodiments. A tiltable electric propulsion system 200 may include an electric engine assembly 202 aligned along a shaft 224 that is connected to an output shaft 238 that is mechanically coupled to a propeller assembly 220 comprising a hub, a spinner, and tilt propeller blades. In some embodiments, an electric engine assembly 202 may include a motor and gearbox assembly 204 aligned along and mechanically coupled to the shaft 224. In some embodiments, a motor and gearbox assembly 204 may include an electric motor assembly comprising a stator 206 and a rotor 208. As shown in FIG. 2, and present in some embodiments, a stator 206 may include multiple stator windings connected to an inverter 216. In such a configuration, a stator 206 may incorporate one or more redundancies so that, in the event one set of windings were to fail, power would still be transmitted to the stator 206 via one or more remaining windings, so that the electric engine assembly 202 retains power and continues to generate thrust at the propeller assembly 220.

In some embodiments, a motor and gearbox assembly 204 may contain a gearbox 210 aligned along the shaft 224 to provide a gear reduction between the torque of the shaft 224 from the electric engine assembly, comprising a stator 206 and rotor 208, and the output shaft 238 Torque applied to the output shaft 238 may be transferred to the propeller assembly 220. Some embodiments may include a gearbox 210 containing an oil pump. In such embodiments, the oil pump may drive a circulation of oil throughout the motor and gearbox assembly 204 at a speed equivalent to the rotation of the output shaft 238 to cool and lubricate the gearbox and electric motor components. In some embodiments, the oil pump may drive a circulation of oil at a speed greater than or less than the rotation of the output shaft 238. Some embodiments of a motor and gearbox assembly 204 may include propeller position sensors 212 present within the housing that may detect a magnetic field produced by the electric engine assembly to determine a propeller position. Further embodiments may include propeller position sensors 212 that are powered by an inverter 216 and send collected data to inverter 216.

In some embodiments, an electric engine assembly 202 may also include an inverter assembly 214 aligned along the shaft 224. An inverter assembly 214 may include inverter 216 and an inverter power supply 240 An inverter power supply 240 may accept low voltage DC power from a low voltage system 234 located outside the electric engine assembly 202. An inverter power supply 240 may accept low voltage DC power originating from a high voltage power system 232, located outside the electric engine assembly 202, that has been converted to low voltage DC power via a DC-DC converter 242. An inverter 216 may supply high voltage alternating current to the stator 206 of the electric engine assembly located within the motor and gearbox assembly 204 via at least one three-phase winding. An inverter assembly 214 may include an inverter 216 that may receive flight control data from a flight control computing subsystem 236.

In some embodiments, a motor and gearbox 204 may be located between an inverter assembly 214 and a propeller assembly 220. Some embodiments may also include a divider plate 244 coupled to the motor and gearbox assembly 204 and inverter assembly 214. The divider plate 244 may create an enclosed environment for an upper portion of the motor and gearbox assembly 204 via an end bell assembly, and create an enclosed environment for a lower portion of the inverter assembly 214 via a thermal plate. In some embodiments, divider plate 244 may serve as an integral mounting bracket for supporting heat exchanger 218. Heat exchanger 218 may comprise, for example, a folded fin or other type of heat exchanger. In some embodiments, the electric propulsion system 200 may circulate oil or other coolant throughout the electric engine assembly 202, motor and gearbox assembly 204, or inverter assembly 214 to transfer heat generated from the components to the oil or other coolant liquid. The heated oil or other coolant liquid may circulate through heat exchanger 218 to transfer the heat to an air flow 222 passing through the fins of the heat exchanger.

In some embodiments, the electric engine assembly 202 may be mounted or coupled to a boom structure 226 of the aircraft. A variable pitch mechanism 230 may be mechanically coupled to the propeller assembly 220. In some embodiments, the variable pitch mechanism may abut on the electric engine assembly 202. In some embodiments, the variable pitch mechanism 230 may be coupled to a shaft or component traveling within or adjacent to the shaft 224 such it may be remotely mounted within the boom, wing, or fuselage of the aircraft. A variable pitch mechanism 230 may serve to change the collective angle of the forward electric engine's propeller assembly blades as needed for operation during the hover-phase, transition phase, and/or cruise-phase. Some embodiments may include the electric engine assembly 202 being mechanically coupled to a tilt propeller subsystem 228 that may redirect thrust between a primarily vertical direction during vertical flight mode to a mostly horizontal direction during forward-flight mode. In some embodiments, the tilt propeller subsystem may abut on the variable pitch mechanism 230. Some embodiments may include a tilt propeller subsystem 228 comprising various components located in various locations. For example, a component of the tilt propeller subsystem may be coupled to the electric engine assembly 202 and other components may be coupled to the variable pitch mechanism 230. These various components of the tilt propeller subsystem 228 may work together to redirect the thrust of the tiltable electric propulsion system 200.

Figures 3A, 3B, 3C:
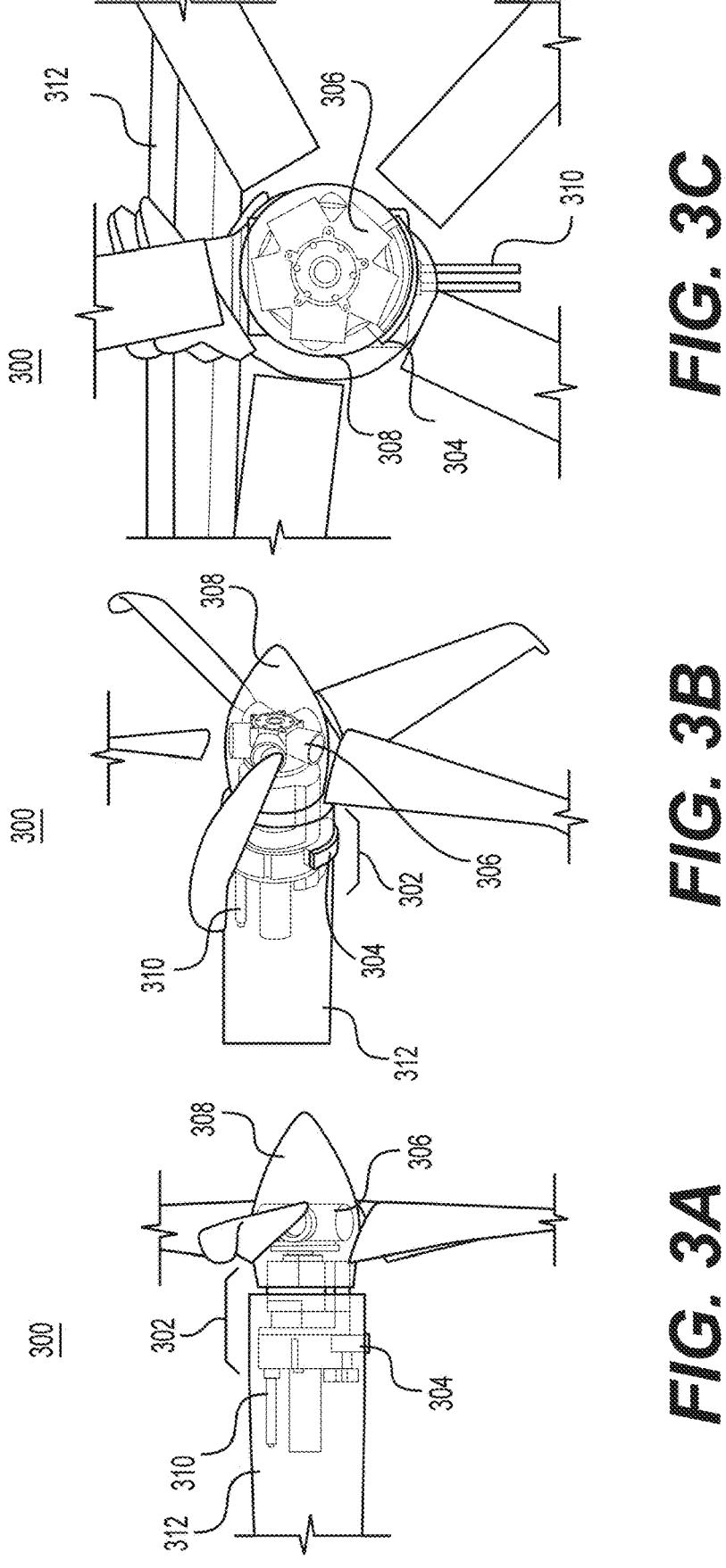
FIGS. 3A-3C are illustrations of an exemplary tilt electric propulsion system of a VTOL aircraft, consistent with disclosed embodiments.

FIGS. 3A-3C are illustrations of an exemplary tilt electric propulsion system of a VTOL aircraft, consistent with disclosed embodiments. FIGS. 3A-3C may possess like numerals and refer to similar elements of tiltable electric propulsion system 300. As such, similar design considerations and configurations may be considered throughout the embodiments FIGS. 3A and 3B illustrate a side profile and perspective view, respectively, of a tiltable electric propulsion system 300 in a cruise configuration integrated into a boom 312, 312 consistent with this disclosure. A tiltable propeller electric propulsion system 300 may comprise an electric engine assembly 302 housed within a boom 312 of a VTOL aircraft. In some embodiments, a cruise configuration may include the electric engine assembly 302 being positioned within the boom 312. An electric engine assembly 302 may comprise an electric motor assembly, a gearbox assembly, an inverter assembly with power connection channels 310, and a heat exchanger 304, as described herein. The electric engine assembly 302 may be mechanically coupled to a propulsion assembly 308 comprising a shaft flange assembly 306, a spinner, and propeller blades.

FIG. 3C illustrates a top-down view, along a spinner 308, of a tiltable electric propulsion system 300 in a lift configuration integrated into a boom 312 consistent with this disclosure. As shown in FIG. 3C a tiltable electric propulsion system 300 in a lift configuration may comprise the electric engine assembly 302 being positioned outside of the boom 312 and changing its orientation with respect to the boom 312C.

As discussed herein, a lift electric propulsion system may be configured to provide thrust in one direction and may not provide thrust during all phases of flight. For example, a lift system may provide thrust during take-off, landing, and hover, but may not provide thrust during cruise.

Figure 4:
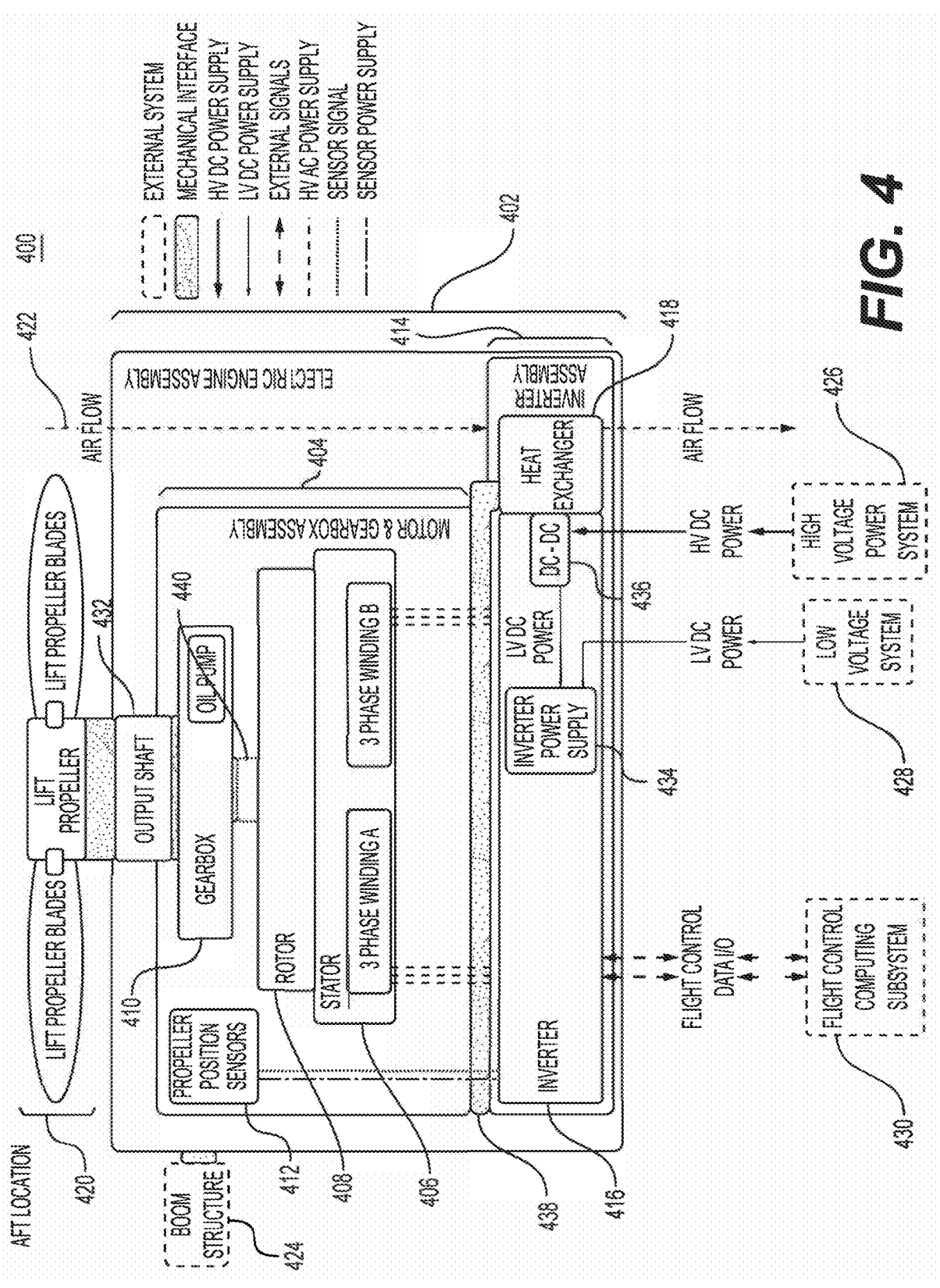
FIG. 4 is a schematic diagram illustrating an exemplary lift electric propulsion system of a VTOL aircraft, consistent with disclosed embodiments.

FIG. 4 is a schematic diagram illustrating an exemplary lift electric propulsion system of a VTOL aircraft, consistent with disclosed embodiments. A lift electric propulsion system 400 may be mounted or coupled to a boom structure 424 of the aircraft. A lift electric propulsion system 400 may include electric engine assembly 402 aligned along a shaft 440 that is connected to an output shaft 432 that is mechanically coupled to a propeller assembly 420 comprising a hub and tilt propeller blades. In some embodiments, an electric engine assembly 402 may include a motor and gearbox assembly housing 404 aligned along and mechanically coupled to the shaft 440. In some embodiments, a motor and gearbox assembly housing 404 may include an electric motor assembly comprising a stator 406 and a rotor 408. A stator 406 may include multiple stator windings connected to the inverter 416. In such a configuration, a stator 406 may incorporate one or more redundancies and backup measures to avoid a single point of failure in the case. For example, stator 406 may include multiple windings such that, if a winding fails, power may continue to be transmitted to the stator 406 via remaining windings, allowing the electric engine assembly 402 to retain power and continue to generate thrust at the propeller assembly 420.

In some embodiments, a motor and gearbox assembly housing 404 may contain a gearbox 410 aligned along the shaft 440 to provide a gear reduction between the torque of the shaft 432 from the electric engine assembly, comprising a stator 406 and rotor 408, and the output shaft 432. Torque applied to the output shaft 432 may be transferred to the propeller assembly 420. Some embodiments may include a gearbox 410 containing a fluid pump for circulating cooling and/or lubrication fluid. In the embodiment shown, the fluid pump is an oil pump. In such an embodiment, the oil pump may drive a circulation of oil throughout the motor and gearbox assembly housing 404 at a speed equivalent to the rotation of the output shaft 432 to cool and lubricate the gearbox and electric motor components. Some embodiments of a motor and gearbox assembly housing 404 may include propeller position sensors 412 present within the housing that may detect a magnetic field produced by the electric engine assembly to determine a propeller position. Further embodiments may include propeller position sensors 412 that are powered by inverter 416 and send collected data to inverter 416. The collected data may be transferred to a flight control computing system 430 among other flight control data.

In some embodiments, an electric engine assembly 402 may also include an inverter assembly housing 414 aligned along an axis sharing the axis of the shaft 424. An inverter assembly housing 414 may include inverter 416 and an inverter power supply 434. An inverter power supply 434 may accept low voltage DC power from a low voltage system 428 located outside the electric engine assembly 402. An inverter power supply 434 may accept low voltage DC power originating from a high voltage power system 426, located outside the electric engine assembly 402, that has been converted to low voltage DC power via a DC-DC converter 436. An inverter 416 may supply high voltage alternating current to the stator 406 of the electric engine assembly located within the motor and gearbox assembly housing 404 via at least one three-phase winding. An inverter assembly 414 may include an inverter 416 that may send data to and receive data from a flight control computing subsystem 430.

In some embodiments, a motor and gearbox housing 404 may be located between an inverter assembly housing 414 and a propeller assembly 420. Some embodiments may also include a divider plate 438 coupled to the motor and gearbox assembly housing 404 and inverter assembly housing 414. A divider plate 438 may create an enclosed environment for an upper portion of the motor and gearbox assembly housing 404 via an end bell assembly, and may create an enclosed environment for a lower portion of the inverter assembly housing 414 via a thermal plate. In some embodiments, a divider plate 438 may serve as an integral mounting bracket for supporting heat exchanger 418. Heat exchanger 418 may comprise, e.g., a folded fin or other type of heat exchanger. In some embodiments, the electric propulsion system 400 may circulate oil or other coolant fluid throughout the electric engine assembly 402, motor and gearbox assembly 404, or inverter assembly 414 to transfer heat generated from the components to the oil or other coolant liquid. The heated oil or other coolant liquid may be circulated through heat exchanger 418 to transfer the heat to an air flow 422 passing through the fins of the heat exchanger.

In some embodiments, a tiltable electric propulsion system and a lift electric propulsion system may possess similar components. This may be advantageous with respect to many design considerations present within VTOL aircrafts. For example, from a manufacturability standpoint, different types of electric propulsion systems having similar components may be beneficial in terms of manufacturing efficiency. Further, having similar components may be beneficial in terms of risk management as similar components possess similar points of failure and these points of failure may be well explored and designed around when comparing systems having similar components to systems having different components and configurations.

While a tiltable electric propulsion system may possess additional, and in some embodiments different, components compared to a lift electric propulsion system, it should be understood that in some embodiments a tiltable electric propulsion system and a lift electric propulsion system may possess the same configuration of components. For example, in some embodiments, a tiltable and lift electric propulsion system may contain the same components while the lift electric propulsion system may be coupled to a boom, wing, or fuselage of the aircraft such that it may not be able to provide thrust in as many directions as tiltable electric propulsion system.

Figures 5A, 5B:
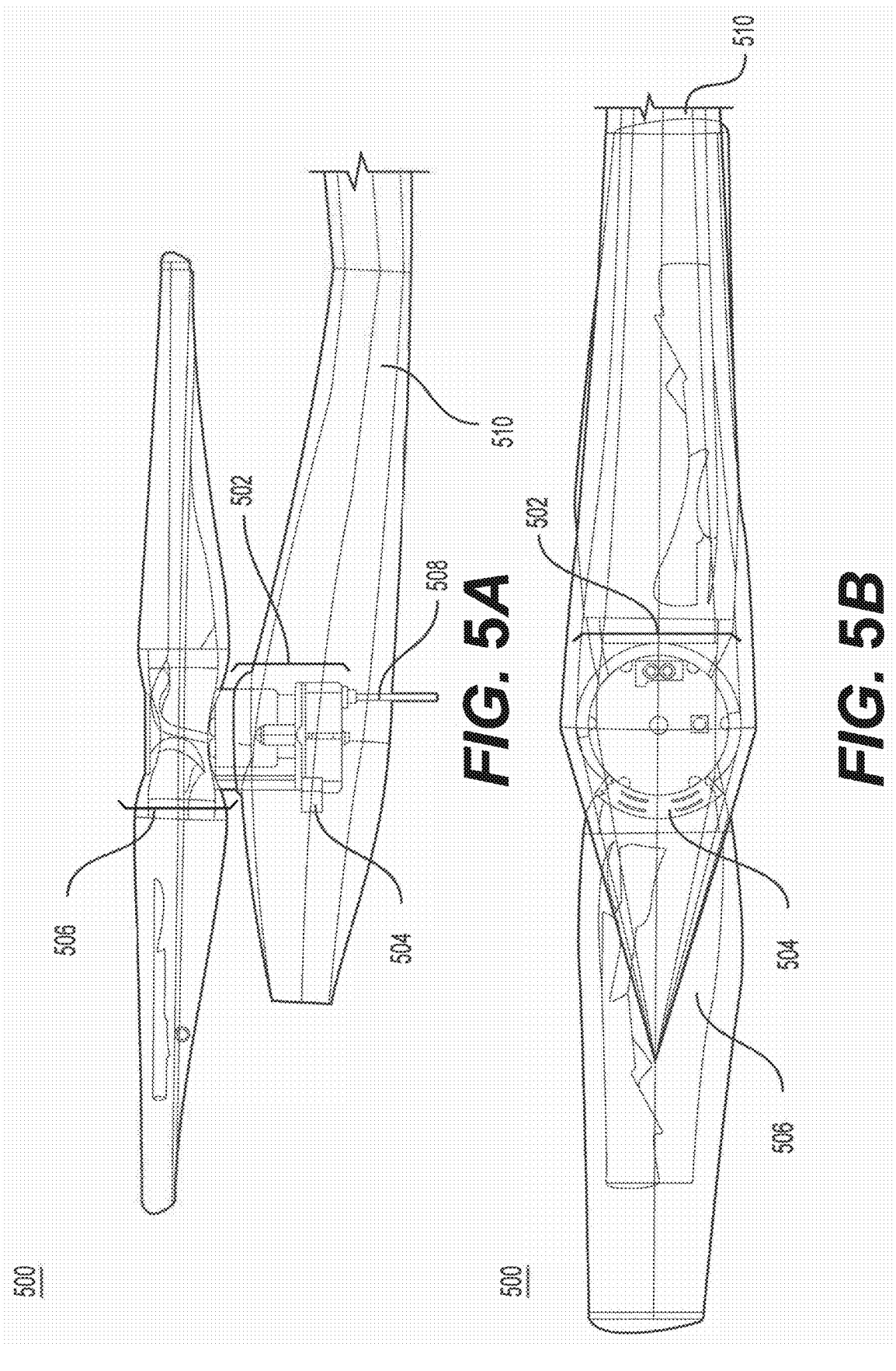
FIGS. 5A and 5B are illustrations of an exemplary lift electric propulsion systems of a VTOL aircraft, consistent with disclosed embodiments.

FIGS. 5A and 5B are illustrations of an exemplary lift electric propulsion systems of a VTOL aircraft, consistent with disclosed embodiments. FIGS. 5A and 5B may possess like numerals and refer to similar elements of lift electric propulsion systems 500. As such, similar design considerations and configurations may be considered throughout the embodiments.

FIG. 5A illustrates a side profile of a lift electric propulsion system 500 in a lift configuration integrated into a boom 510 consistent with this disclosure. A lift electric propulsion system 500 may comprise an electric engine assembly 502 housed within a boom 510 of a VTOL aircraft. In some embodiments, a lift configuration may include the electric engine assembly 502 being positioned vertically within the boom 510. An electric engine assembly 502 may comprise an electric motor assembly, a gearbox assembly, an inverter assembly with power connection channels 508, and a heat exchanger 504, as described herein. The electric engine assembly 502 may be mechanically coupled to a propulsion assembly 506 comprising a shaft flange assembly and propeller blades.

FIG. 5B illustrates a top-down view of a lift electric propulsion system 500 in a lift configuration integrated into a boom 510, consistent with this disclosure.

Some embodiments of the disclosed electric engine may generate heat during operation and may comprise a heat management system to ensure components of the electric engine do not fail during operation. In some embodiments, coolant may be used and circulated throughout individual components of the engine, such as an inverter, gearbox, or motor, through some of the components, or through all of the components of the engine to assist with managing the heat present in the engine. Some embodiments may include using air cooling methods to cool the electric engine or using a mixture of coolant and air to manage the heat generated during operation in the electric engine. In some embodiments, the coolant being used may also be the same liquid that is being used as lubricant throughout the inverter, gearbox, or motor. For example, components of the electric engines may be cooled using a liquid or air or using a mixture of air and liquid cooling. As another example, a motor may be cooled using air cooling while the inverter and gearbox are cooled using liquid cooling. It should be understood that a mixture of cooling media may be used for any combination of electric engine components or within each component.

In some embodiments, oil may be used as a lubricant throughout an electric engine and may also be used as coolant fluid to assist in managing the heat generated by the engine during operation. Further to this example, different amounts of oil may be used to act as both lubricant and coolant fluid in the electric engine, such as less than or equal to one quart, 1.5 quarts, two quarts, 2.5 quarts, three quarts, five quarts or any other amount of oil needed to lubricate and cool the electric engine, in combination with or without the assistance of air cooling. In some embodiments, the amount of the oil or liquid to be used in the system in relation to cooling may be determined based on an amount of thermal mass needed to drive heat transfer from the components of the electric propulsion system. As has been disclosed herein, an electric engine may have different primary functionalities such as being used only for lifting and landing, and as such only being used in one orientation, or being used during all stages of flight such as lifting, landing, and in-flight. An engine that is used in all stages of flight may experience various orientations throughout flight and may comprise more lubricant and coolant than the engine only used in one orientation. As such, all the engines on an aircraft may not include the same amount of lubricant and coolant. For example, a lifting and landing engine may only require less than one quart of oil while an engine that operates in all stages of flight may require more than one quart of oil. In some embodiments, the amount of oil or liquid for cooling may be of an appropriate amount to provide sufficient thermal mass to drive heat transfer from the components of the electric propulsion system no matter the orientation of the electric propulsion system. The embodiments discussed herein are exemplary, non-limiting, and do not dictate the bounds of the amount of lubricant and coolant that may be used in an electric engine.

Some embodiments may use oil to lubricate the electric engine and to cool the electric engine. Such embodiments may require additional volumes of oil over embodiments using oil exclusively for cooling or exclusively for lubrication. In such embodiments, the additional oil may allow for removal of traditional components that may be used to cool such an electric engine. For example, if the electric engine were cooled by another liquid such as glycol, the engine may comprise separate heat exchangers for both the lubricant fluid and the coolant fluid. As such, in embodiments where a single fluid is being used for both lubrication and cooling, such as oil, an increase in oil would be present but there would only be a need for one heat exchanger, so there may be a decrease in mass, due to using a smaller number of heat exchangers and potentially other components not being required, of the overall system and an improved drag profile may be present. Further, using one substance, such as oil, for the lubrication and cooling of the engine may increase efficiency of the system due to the reduction in mass (e.g., due to redundancies) and the benefits of cooling the engine with a substance such as oil rather than relying on air cooling which may have issues traveling throughout the engine.

During takeoff, landing, hover and cruise, motors and related control components of the VTOL aircraft may generate heat. The heat must be dissipated to prevent degradation or damage to the motor, control components and other elements of the VTOL aircraft. For some types of VTOL aircraft, such as electric VTOL (eVTOL) aircraft, thermal control is likewise important to maintain optimal energy efficiency of, e.g., battery-powered components.

Some elements may generate high thermal loads only during certain operational periods. For example, some lift propellers may be used only during takeoff, landing, and hover, and may be shut off during cruise. Therefore, such lift propellers may generate a high thermal load during takeoff, landing, and hover, and generate little or no heat during cruise.

As described herein, embodiments of an electric engine may include an inverter assembly, a gearbox assembly, and an electric motor assembly, or various combinations thereof. In some embodiments, each of the inverter assembly, the gearbox assembly, and the electric motor assembly may abut on at least one of the other assemblies. Abutting on may include contact between the components comprising an assembly or housings wherein an assembly is located. In some embodiments, an electric engine may include an inverter assembly and an electric motor assembly without a gearbox assembly. Some embodiments of an electric engine may include an electric motor assembly and a gearbox assembly without an inverter assembly, or an electric motor assembly without a gearbox assembly or an inverter assembly.

Figures 6A, 6B, 6C:
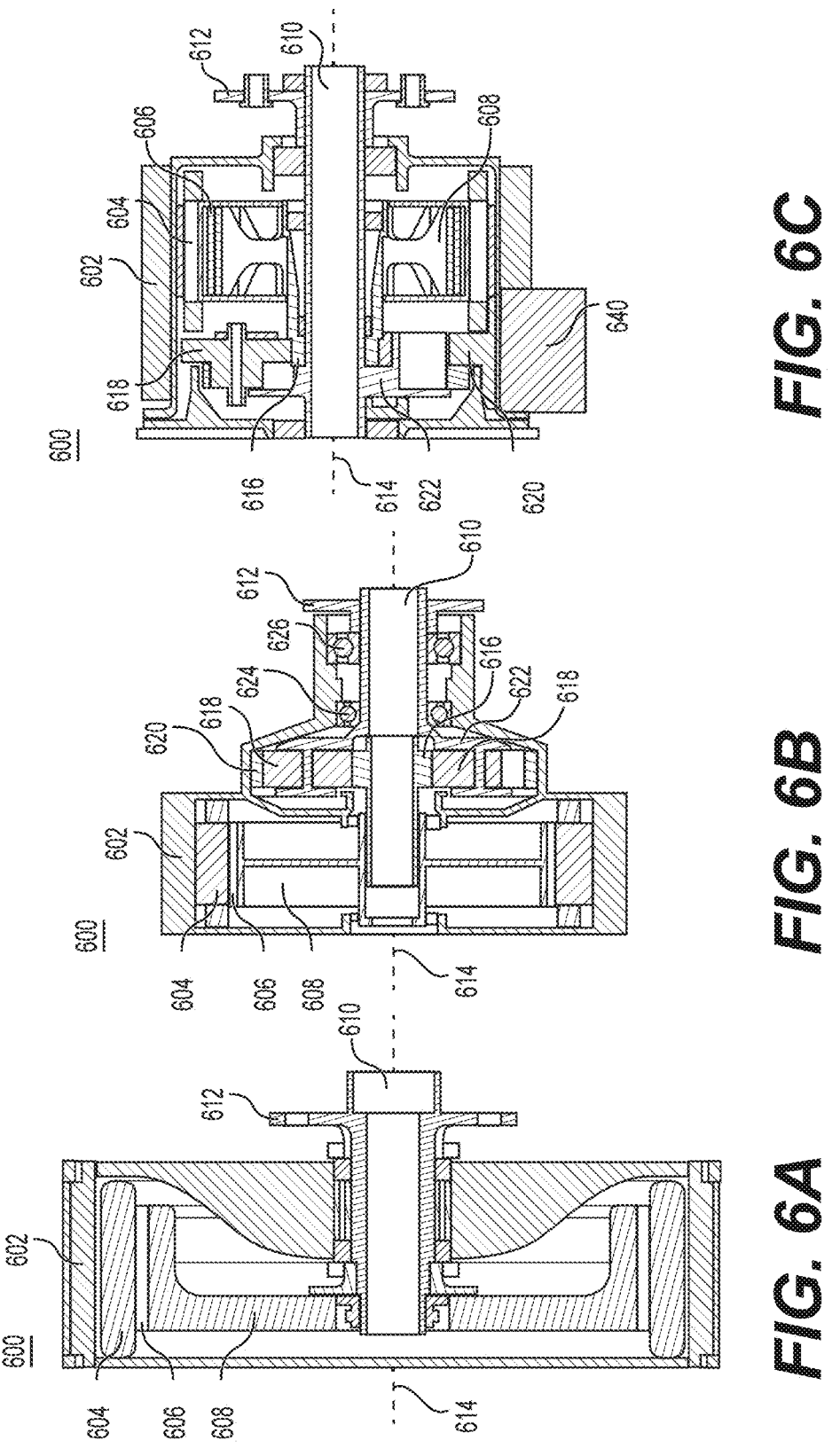
FIGS. 6A-6C are cross-sectional illustrations of exemplary electric propulsion systems of a VTOL aircraft, consistent with disclosed embodiments.

FIGS. 6A-6C are cross-sectional illustrations of exemplary electric propulsion systems of a VTOL aircraft, consistent with disclosed embodiments FIG. 6A illustrates an example of an electric propulsion system. In some embodiments, an electric engine may directly assist in the propulsion of propellers for an aircraft. Electric engine 600 may include a motor housing 602. Electric engine 600 may also include an electric motor assembly comprising components such as a stator 604, rotor magnet 606, and rotor 608. In some embodiments, rotor 608 may be mechanically coupled to a main shaft 610 such that the main shaft 610 spins at a speed equivalent to the rotation speed of the rotor 608. The main shaft 610 may be mechanically coupled to shaft flange assembly 612. In some embodiments, propellers may be attached to shaft flange assembly 612. The electric motor assembly may be substantially aligned along central axis 614.

In some embodiments, an electric engine may include a gearbox. FIG. 6B illustrates an example of an electric engine. In some embodiments, an electric engine may include an electric motor assembly and a gearbox assembly substantially aligned along a shaft. In some embodiments, an electric motor assembly, a gearbox assembly, and a shaft may be substantially aligned along an axis 614. Electric engine 600 may include a motor housing 602, stator 604, rotor magnet 606, and rotor 608. In some embodiments, the rotor 608 may be mechanically coupled to a main shaft 610 such that the main shaft 610 spins at a speed equivalent to the speed of the rotor 608. Main shaft 610 may be mechanically coupled to a shaft flange assembly 612 such that the shaft flange assembly 612, and by extension a propeller assembly (not shown), may rotate at a speed equal to the speed of rotation of the main shaft 610. In some embodiments, a gearbox assembly may provide a gear reduction and change the speed of rotation of the main shaft 610. For example, electric engine 602 may include gearbox assembly comprising a sun gear 616, planetary gears 618, ring gear 620, and planetary carrier 622. In some embodiments, sun gear 616 may be mechanically coupled to the main shaft 610 such that the sun gear 616 rotates at a speed equal to that of the main shaft 610. Sun gear 616 may interface with planetary gears 618 that also interface with ring gear 620. In such an embodiment where the sun gear 616 is rotating, the ring gear 620 may be fixed to the motor housing 602. In some embodiments, the planetary gears 618 may rotate around the sun gear 616 due to their interaction with the rotating sun gear 616 and fixed ring gear 620. A planetary carrier 622 may be mechanically coupled to planetary gears 618 and may rotate at an equivalent speed. Some embodiments may include a planetary carrier 622 mechanically coupled to the main shaft 610. In some embodiments, a main shaft 610 may include multiple phases of the shaft or layers of the shaft such that portions of the shaft may rotate at different speeds. Some embodiments may include a first portion of the main shaft rotating at a speed equivalent to the speed of the rotor 608 and another portion of the main shaft rotating at a speed equivalent to the speed of the planetary carrier 622. In some embodiments, a speed of the planetary carrier may be less than the speed of the rotor 608.

In some embodiments, an electric engine 600 may include bearings 624, 626 aligned along the main shaft 610. Some embodiments may include inner races of bearings 624, 626 that are mechanically coupled to the planetary carrier and various bearings such as 624 and 626.

FIG. 6C illustrates an example of an electric propulsion system. In some embodiments, an electric propulsion system may include an electric motor assembly and a gearbox assembly substantially aligned along a shaft. In some embodiments, an electric motor assembly may be positioned between a gearbox assembly and a shaft flange assembly. Electric propulsion system 600 may include a motor-gearbox assembly housing 602. In some embodiments, an electric propulsion system 600 may comprise an electric motor assembly including a stator 604, rotor magnet 606, and rotor 608. Electric propulsion system 600 may also include a gearbox assembly. In some embodiments, a gearbox assembly may comprise a sun gear 616, planetary gears 618, ring gear 620, and a planetary carrier 622. A sun gear 616 may interface with planetary gears 618 that also may interface with a ring gear 620. Sun gear 616 may be mechanically coupled to rotor 606, such that the rotation of rotor 606 may rotate the sun gear 616 at the same speed of rotation. A planetary carrier 622 may be mechanically coupled to planetary gears 618 and may rotate at an equivalent speed. Some embodiments may include a planetary carrier 622 mechanically coupled to the main shaft 610. A main shaft 610 may be mechanically coupled to a shaft flange assembly 612. Main shaft 610 may be substantially aligned along central axis 614, such that the gearbox assembly and motor assembly are also substantially aligned along central axis 614. In some embodiments, an electric propulsion system 600 may comprise a heat exchanger 624 that may be used to cool oil or liquid used to cool or lubricate components of the gearbox assembly or electric motor assembly.

Electric propulsion system 600, as discussed above, are exemplary embodiments. However, while electric propulsion system 600 as seen in FIG. 6A may be capable of providing required thrust to a VTOL aircraft, it may create a larger drag profile and contribute more mass to the VTOL aircraft than electric propulsion system 600 as seen in FIG. 6B and FIG. 6C. Electric propulsion system 600 comprise gearbox assemblies. As such, the electric propulsion system 600 possess a gear reduction that allows the electric motor assembly, and thus the electric propulsion systems, to possess smaller drag profiles and less mass.

Electric propulsion system 600 may possess a gearbox assembly between an electric motor assembly and a shaft flange assembly. While this configuration may require less mass than electric propulsion system 600, it may require more mass than electric propulsion system 600. Electric propulsion system 600 may possess a gearbox assembly such that an input shaft, or sun gear, travels from the electric motor assembly to the gearbox assembly and an output shaft, or portion of planetary carrier, travels from the gearbox assembly to the shaft flange assembly. However, electric propulsion system 600, in some embodiments, may possess a sun gear that travels from the rotor of the electric motor assembly to the gearbox assembly and a main shaft, coupled to a planetary carrier or carrier cover, that travels through the sun gear, past the electric motor assembly to a shaft flange assembly. As such, electric propulsion system 600 may comprise a more compact design, more compact housing, and streamlined drag profile when compared to electric propulsion system 600. This may result in an improved drag profile and a more mass efficient system. Further, electric propulsion system 600 may possess a gearbox assembly without means of lubrication which may limit the run time of the electric propulsion system. Electric propulsion system 600 may comprise a heat exchanger to cool and lubricate portions of the systems, including the gearbox assembly. This may lead to additional efficiency and enable longer flight times and/or increased flight range.

Figure 7:
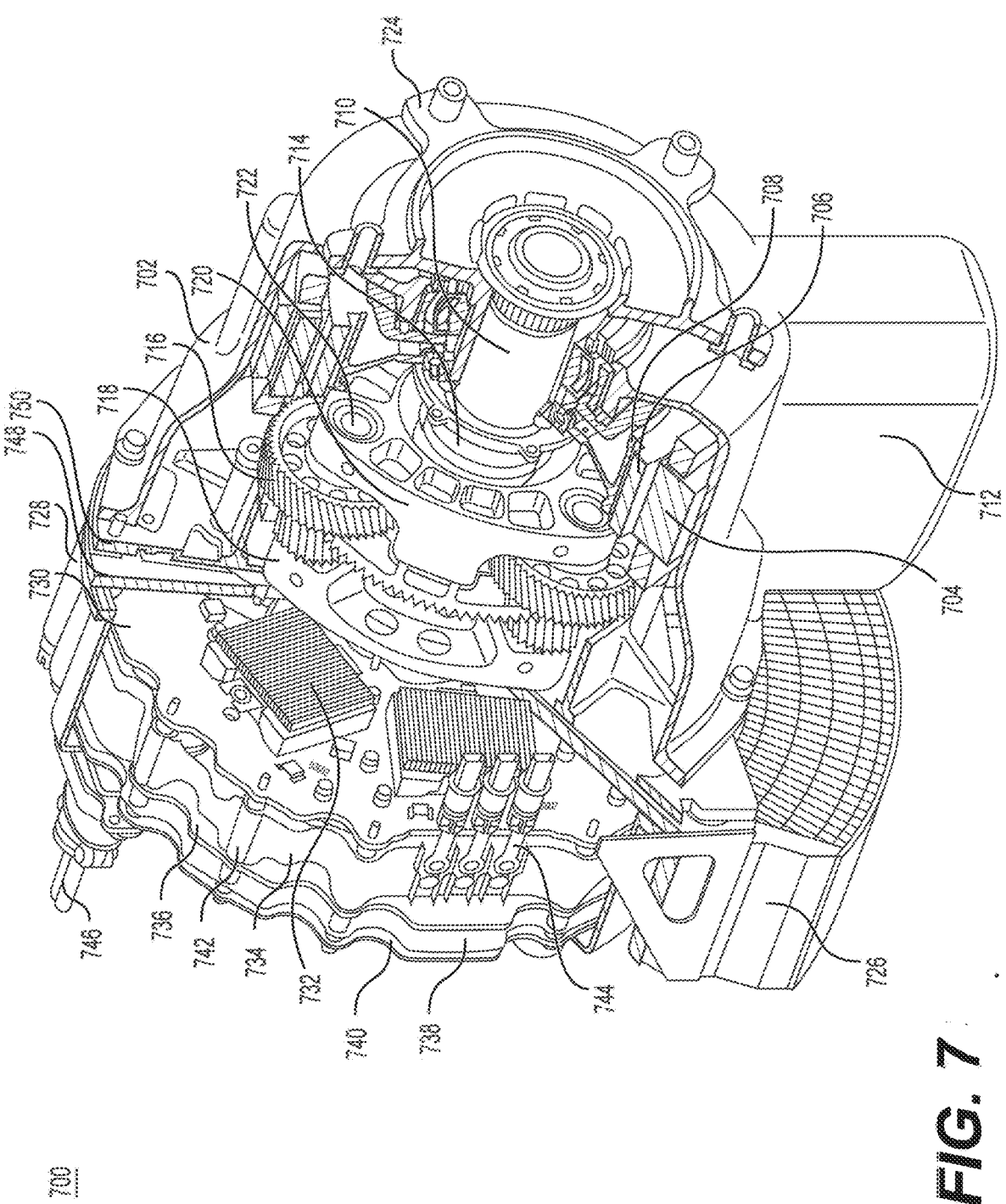
FIG. 7 is an illustration of an exploded view of an exemplary electric propulsion system of a VTOL aircraft, consistent with disclosed embodiments.

FIG. 7 is an illustration of exemplary electric propulsion systems of a VTOL aircraft, consistent with disclosed embodiments.

As described herein, an electric propulsion system may include an inverter assembly, gearbox assembly, and engine assembly. In some embodiments, the electric propulsion system 700 may include components packaged in various housings including a motor-gearbox assembly housing 702 and an inverter assembly housing 728. Enclosing the various components of electric propulsion system 700 in housings 702 and 728 may provide various benefits, including lower mass and an improved drag profile, as described herein. Further, in some embodiments, the gearbox assembly, inverter assembly, and/or electric motor assembly may possess a substantially circular profile. As used herein a profile may be substantially circular where the length of a minor axis of a circular shape and the length of a major axis of a circular shape possess a relationship such that the length of the minor axis is at least a threshold amount, such as 80%, of the length of the major axis. Further, in some embodiments, the gearbox assembly, inverter assembly, and electric motor assembly, or a subset of those listed, may be sized such that the assemblies possess substantially equivalent radii. As used herein assemblies may possess substantially equivalent radii where the difference among the radii between two assemblies is less than a threshold amount, such as 10%, of the radius of the largest assembly. In some embodiments, the profile of components making up the electric propulsion system as described herein may include various polygons such as hexagons, heptagons, octagons, nonagons, decagons, and additional polygons having more than ten sides.

Electric propulsion system 700 may include an electric motor assembly, including stator 704, rotor magnet 706, and rotor 708.

In some embodiments, the electric motor assembly may interact with, and in some embodiments transfer toque to, a gearbox assembly. Electric propulsion system 700 may include a gearbox assembly, comprising a sun gear 714, a set of planetary gears 716, a planetary carrier 718, and a carrier cover 720. Some embodiments may include a sun gear 714 having teeth that interact with teeth of the planetary gears 716, and a ring gear (not picture here in this figure) having teeth that also interact with the teeth of the planetary gears 716. In some embodiments, a shaft 722 may extend through or from the planetary gears 716. In some embodiments, the planetary carrier 718 may receive a first end of the shafts 722 such that the planetary carrier 718 may rotate at the same rate as the planetary gears 716. In some embodiments, the carrier cover 720 may receive a second end of the shafts 722 such that the carrier cover 720 may rotate at the same rate as the planetary gears 716. In some embodiments, the planetary gears 716, planetary carrier 718, and carrier cover 720 may be mechanically coupled along the axis of shaft 722.

In some embodiments, electric propulsion system 700 may include a main shaft 710 that may be mechanically coupled to a shaft flange assembly 724 to provide mechanical shaft power to turn the propellers of a propeller assembly. As used herein, components may be mechanically coupled where there exists any connections or coupling, whether direct or indirect, between two components. A shaft flange assembly may include a flange that is coupled to a main shaft with a splined connection to take torque loads from the main shaft and transfer the torque to the propellers that coupled to the flange. A flange may also be coupled to a main shaft using fasteners, by welding, by brazing, or any other use of components or methods to couple the main shaft and the flange. In some embodiments, a main shaft and a flange may be machined together to form a single component. In some embodiments, a shaft flange assembly may be a component of a propeller assembly that may comprise a shaft flange assembly, propellers, and a spinner. In some embodiments, a shaft flange assembly may also be referred to as a propeller hub.

In some embodiments, electric propulsion system 700 may include components for an inverter assembly, as described herein. For example, electric propulsion system 700 may include printed circuit board assemblies (PCBAs) such as a power PCBA 730 that may comprise power modules 732, a gate drive PCBA 736, and a control PCBA 740, Some embodiments of the inverter assembly of the electric propulsion system 700A may also include a spacer board 738 between the various PCBAs. Further, some embodiments may include an energy storage device, for example a DC capacitor that may be stored within the DC capacitor housing 734. Some embodiments of an inverter assembly may also include busbar connectors 744 to supply alternating current to the electric motor assembly. Some embodiments of an inverter assembly may include power connections 746 coupled to a high voltage connector to deliver high voltage power to the inverter assembly.

Some embodiments of an inverter assembly of the electric propulsion system 700 may include layering the respective inverter assembly components in a stacking formation along guide pins 742 that extend through each layer of the inverter assembly. It is recognized that an inverter assembly utilizing a stacking formation, such as components stacked on each other, along guide pins 742 may be beneficial in various design criteria relevant for VTOL aircrafts. For example, a stacking formation may allow for a more compact packaging of the inverter assembly, and thus may help in minimizing the mass of the electric propulsion system 700 and minimize the drag experienced due to the electric propulsion system packaging. Further, a stacking formation of the inverter assembly may be advantageous from a manufacturing perspective as a stacking formation may allow for tolerances within various parts of the inverter assembly. In some embodiments, the inverter assembly may include structural components to assist in supporting the stacking formation with loads experienced during various phases of flight. Some embodiments may include inverter assembly components also acting as structural components. For example, a DC capacitor housing 734 may house the capacitor, as well as other components, for the inverter assembly and may be made of a plastic, or other material, capable of supporting the PCBAs and other components surrounding it.

In some embodiments, an electric propulsion system 700 may include a heat exchanger 726 coupled to the motor-gearbox assembly housing 702 and an inverter assembly housing 728. A heat exchanger 726 may be coupled to a dividing plate comprising a thermal plate 748 and an end bell plate 750. An end bell plate 750 may serve to close off the motor-gearbox assembly housing 702. A thermal plate 748 may serve to close off the inverter assembly housing 728. In some embodiments, the dividing plate may serve as an integral mounting bracket for supporting heat exchanger 726. Heat exchanger 726 may comprise, e.g., a folded fin or other type of heat exchanger. In some embodiments, the electric propulsion system 700 may circulate oil or other coolant throughout the electric motor assembly, gearbox assembly, or inverter assembly to transfer heat generated from the components to the oil or other coolant liquid. The heated oil or other coolant liquid may be circulated through the fins of heat exchanger 726 by an internal liquid flow paths which may possess an inlet and outlet for the liquid flow paths that may be coupled to an outlet and inlet, respectively, of the bores or grooves that may be present on the dividing plate. In some embodiments, a motor-gearbox housing 702 may comprise a sump 712. Sump 712 may serve to collect oil or liquid coolant distributed throughout the electric propulsion system 700 and recirculate the oil or liquid coolant.

In some embodiments, a heat exchanger may be fluidically coupled to the gearbox assembly, inverter assembly, and/or electric motor assembly. As used herein, an assembly, or components therein, may be fluidically coupled where a liquid flow path from the heat exchanger may interact with, supply liquid to, or interface with the assembly or components therein.

Figure 8:
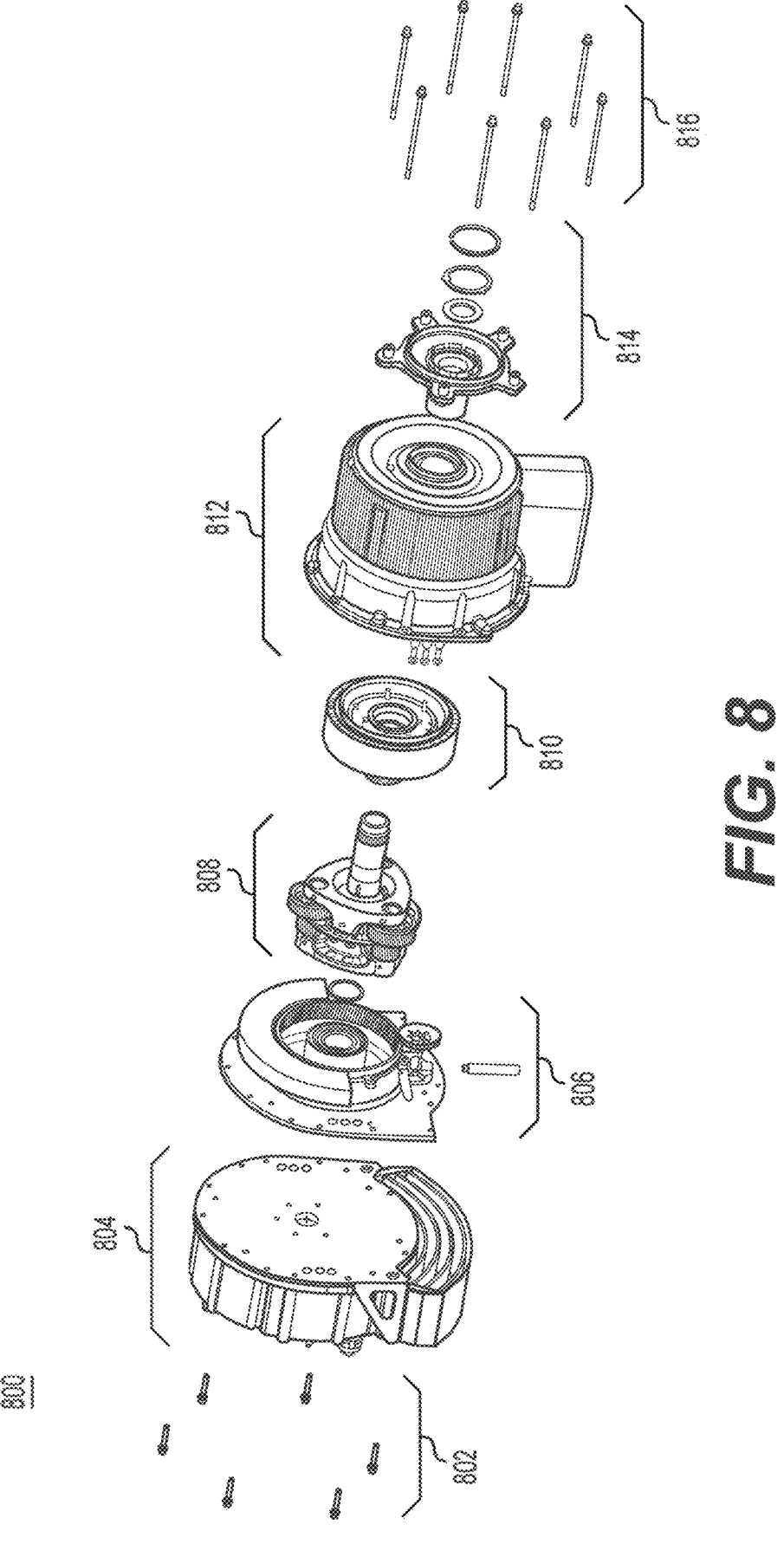
FIG. 8 is an illustration of an exploded view of an exemplary electric propulsion system of a VTOL aircraft, consistent with disclosed embodiments.

FIG. 8 is an illustration of an exploded view of an exemplary electric propulsion system of a VTOL aircraft, consistent with disclosed embodiments. In some embodiments, electric engine 800 may refer to or be included in electric propulsion system 700. Electric engine 800 may include an inverter assembly 804, end bell assembly 806, main shaft assembly 808, rotor 810, stator housing 812, and shaft flange assembly 814. In some embodiments, inverter assembly 804 may abut on a gearbox assembly. A gearbox assembly may include end bell assembly 806 and main shaft assembly 808. In some embodiments, the gearbox assembly may abut on an electric motor assembly. The electric motor assembly may include rotor 810 and stator housing 812. In some embodiments, components of the electric propulsion system may be substantially aligned along an axis. In some embodiments, the main shaft may represent a central axis that electric propulsion system 800 components may be substantially aligned along. In alternative embodiments, the sequence of the inverter assembly, gearbox assembly, and motor assembly may be rearranged such that different electric propulsion system components abut each other, as described herein. A housing of the inverter assembly 804 may be affixed to the thermal plate of the inverter assembly by screws 802. In some embodiments, fasteners 816 may affix the electric engine 800 to a boom of the aircraft.

Figure 9:
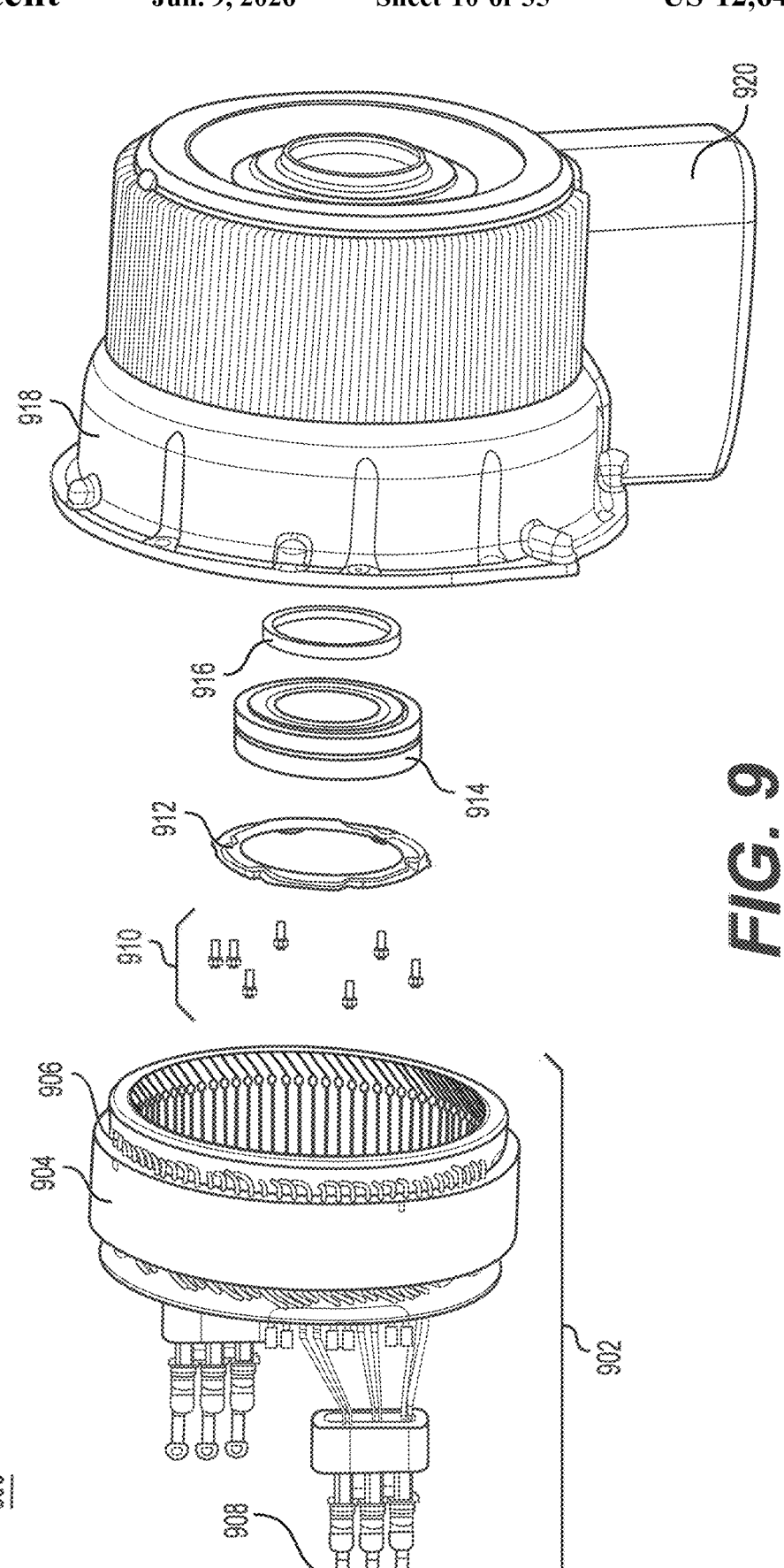
FIG. 9 is an illustration of an exploded view of an exemplary electric motor assembly of a VTOL aircraft, consistent with disclosed embodiments.

Embodiments of an electric engine may include an electric motor assembly, as described herein. FIG. 9 is an illustration of an exploded view of an exemplary electric motor assembly of a VTOL aircraft, consistent with disclosed embodiments. In some embodiments, electric motor assembly 900 may be included in electric engine 800. Electric motor assembly 900 may include stator assembly 902. In some embodiments, a stator may include laminations and coils of insulated wires. In some embodiments, stator assembly 902 may include permanent magnets. Stator assembly 902 may include stator core 904 and wire windings 906. In some embodiments, wire windings 906 may be comprised of copper. Stator assembly 902 may also include busbars 908. As an example, busbars 908 may be electrically coupled to stator assembly 902 and assist in electrical conduction of a current. Electric motor 900 may include various bearings, including bearing retainer 912 and roller bearing 914. Bearing retainer 912, roller bearing 914, and shaft seal 916 may be substantially aligned along a central axis. In some embodiments, bearing retainer 912 may assist in cooling as a cooling oil manifold. In some embodiments, roller bearing 914 may comprise a circular shape. Electric motor 900 may include bearing screws 910. Bearing screws 910 may fasten bearing retainer 914 to various components of electric motor 900, including to roller bearing 914. In some embodiments, stator housing 918 may enclose the stator assembly 902, roller bearing 914, bearing retainer 912, shaft seal 916, and bearing screws 910. Stator housing 918 may have an interference fit or press fit with stator assembly 902. For example, stator housing 918 may have a press fit with stator laminations. In some embodiments, stator housing 918 may have a thermal interference fit to stator assembly 902. As an example, stator housing 918 may be a common housing that packages components of stator 900 together, providing advantages including mass reduction and elimination of tubes, hoses, and other connectors. In some embodiments, a stator housing 918 may include a sump 920 for collecting liquid used in cooling or lubricating the electric propulsion system, as described herein. Further, in some embodiments, additional components of an electric propulsion system may reside within the stator housing to provide further mass reduction.

Figures 10A, 10B, 10C:
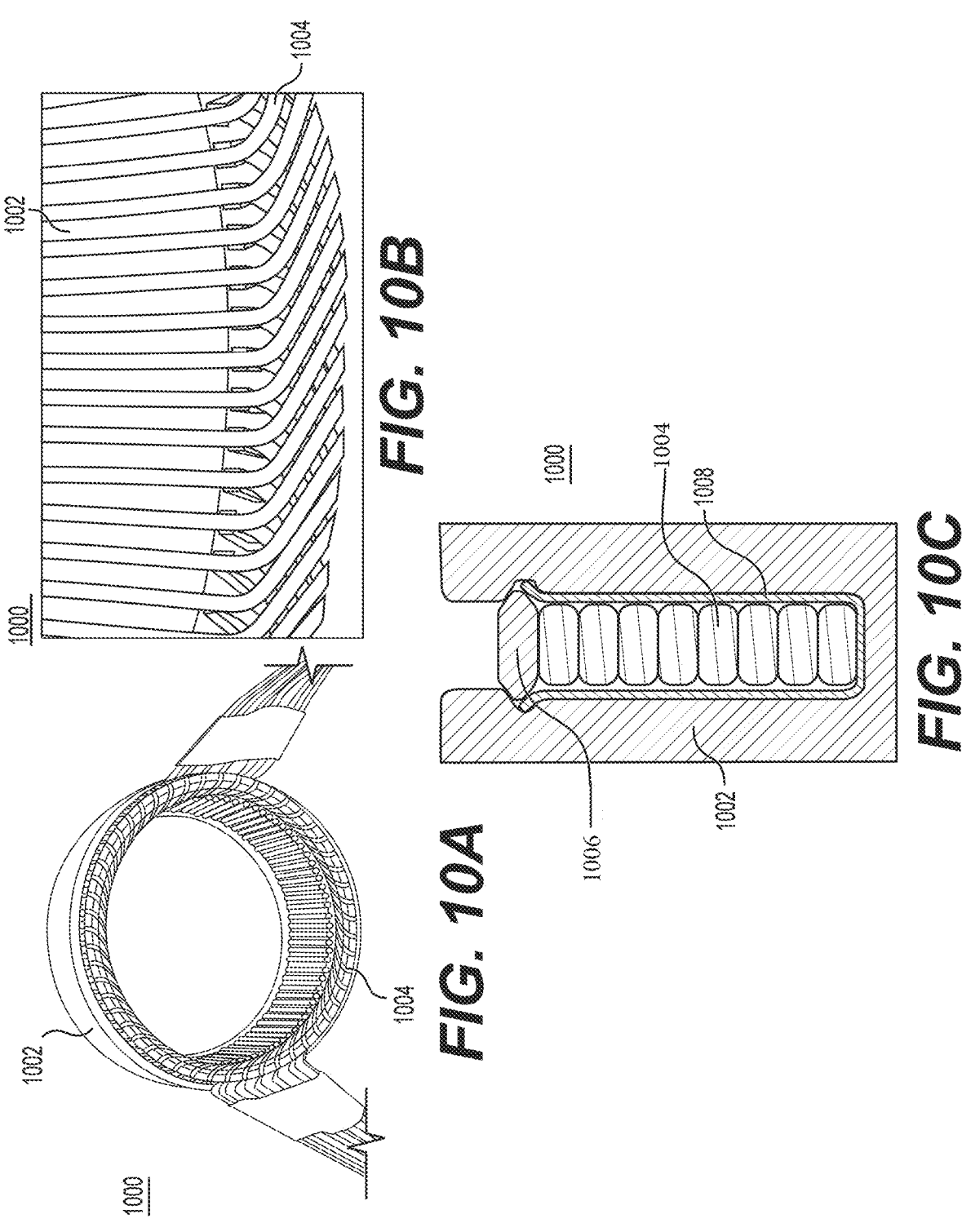
FIGS. 10A-10C are illustrations of stator assemblies of a VTOL aircraft, consistent with disclosed embodiments.

FIGS. 10A-10C are illustrations of views of a stator assembly of a VTOL aircraft, consistent with disclosed embodiments. FIG. 10A illustrates a view of a stator core. In some embodiments, stator core 1000 may include a wound stator assembly including a stator iron 1002, and copper windings 1004. FIG. 10B illustrates a zoomed-in view of a stator core 1000. Laminations of stator iron 1002 may separate copper windings 1004. FIG. 10C depicts an example of a stator slot. As an example, stator core 1000 may include copper windings 1004, which may be housed in stator iron 1002. Slot liner 1008 may separate copper windings 1004 from stator iron 1002. Slot liner 1008 may provide electric insulation. Stator iron 1002 may be contoured to fit slot wedge 1006, with the slot wedge 1006 residing above the copper windings 1004. The slot wedge 1006 may hold the copper windings 1004 in place in the stator iron 1002. In some embodiments, stator laminations may be comprised of stator iron 1002. Stator laminations may aid in insulating the core and reducing eddy currents or losses. In some embodiments, a stator assembly may include a cavity filled with oil that is posited around the stator to aid in cooling. Such a cavity may be fluidically coupled to a heat exchanger, as described herein.

Figures 11A, 11B:
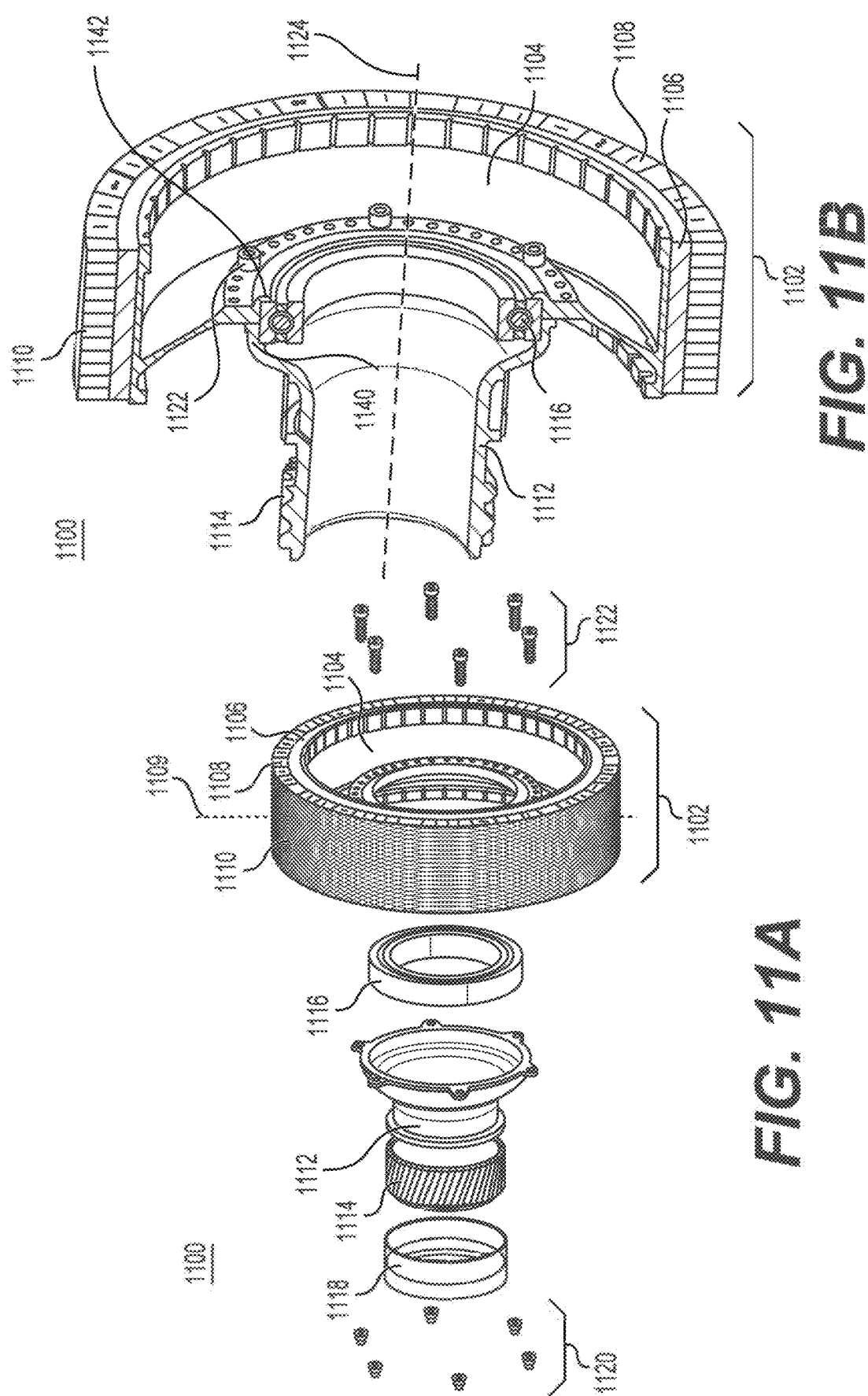
FIGS. 11A-11C are illustrations of an exploded view and cross-section of rotor assemblies of a VTOL aircraft, consistent with disclosed embodiments.
Figure 11C:
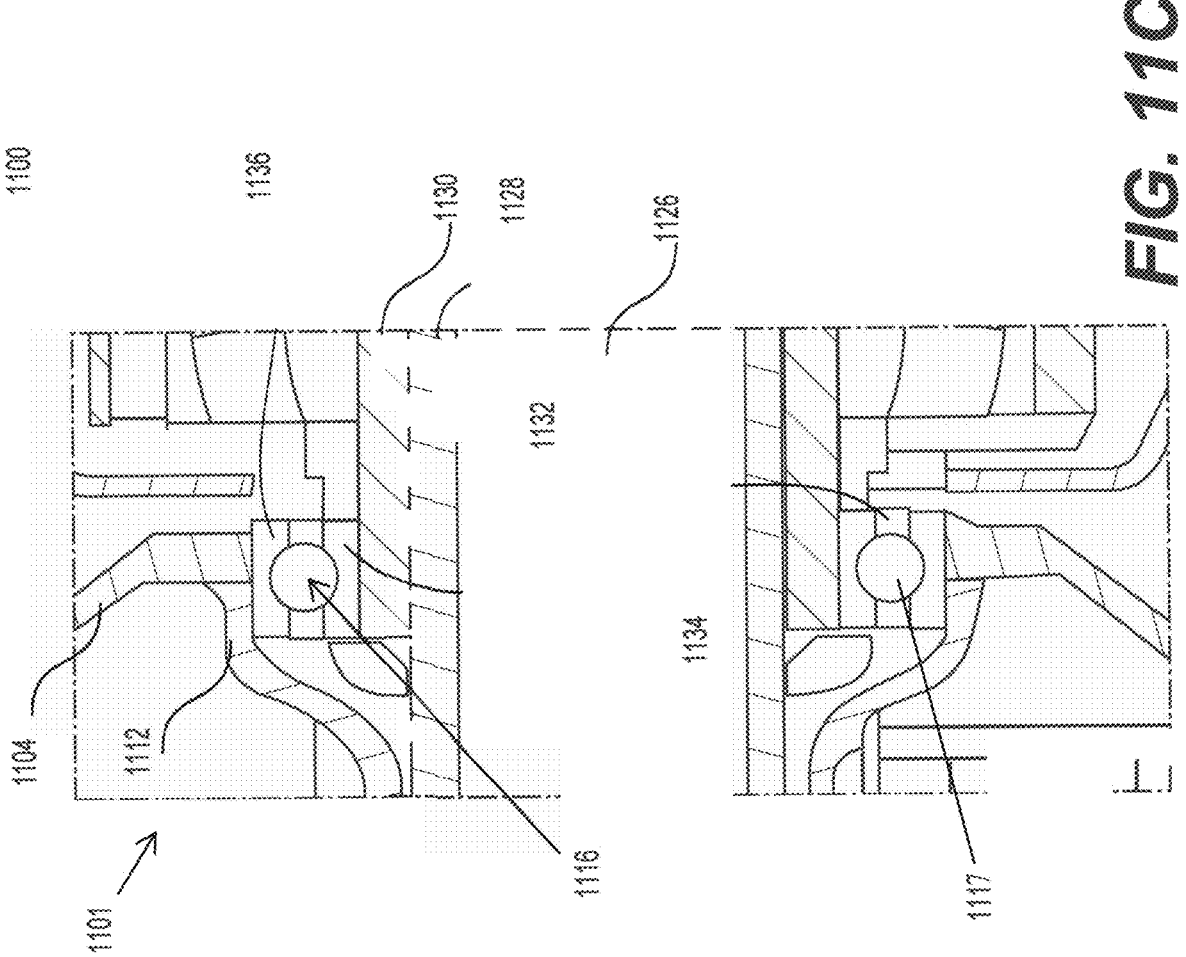

FIGS. 11A-11C may possess like numerals and refer to similar elements of the rotor assemblies 1100 and 1100. As such, similar design considerations and configurations may be considered throughout the embodiments.

Disclosed embodiments of an electric motor assembly may include a rotor. In some embodiments, the electromagnetic field produced by a stator in an electric motor assembly may drive a rotation of a rotor about an axis.

FIGS. 11A-11B are illustrations of an exploded view and cross-section of rotor assemblies of a VTOL aircraft, consistent with disclosed embodiments. FIG. 11A illustrates an exemplary exploded view of a rotor. Rotor assembly 1100 may comprise a rotor 1102 including a rotor hub 1104. A hub may include a disk, covering, or central component. A hub may connect one or more components in the rotor assembly. For example, the hub may connect a bearing to the rotor. Rotor hub 1104 hub may be comprised of metals. In some embodiments, a rotor assembly may involve one or more rotor hubs.

In some embodiments, rotor hub 1104 may be machined and comprised of aluminum.

Rotor 1102 may include laminations 1106 and Halbach array 1108. Laminations 1106 may have a thermal interference fit to rotor hub 1104. Rotor 1102 may be enclosed by rotor overwrap 1110. In some embodiments, rotor overwrap 1110 may be comprised of carbon fiber. Halbach array 1108 may include magnets. Rotor overwrap 1110 may abut on Halbach arrays 1108 and apply pressure on the magnets of Halbach array 1108. In some embodiments, rotor 1102 may include hollow portions. Hollow portions of the rotor may allow for various motor assembly or gearbox assembly components to travel through the rotor 1102, enabling configurations that may couple components to the rotor 1102. In some embodiments, an electric motor assembly may be mechanically coupled to a gearbox assembly. Disclosed embodiments include various means of mating a rotor and sun gear. Rotor 1102 may be mechanically coupled to sun gear 1112 and affixed concentrically by various means of connecting and aligning components. Rotor 1102 may be mechanically coupled to sun gear 1112 by various fastening means. As an example, rotor 1102 may be fastened to sun gear 1112 using locking nuts 1120, dowel pins, or screws 1122. Bearing 1116 may have an interference fit with rotor assembly 1102 and sun gear 1112. In some embodiments, sun gear 1112 may include gear teeth 1114, which may be used in a gearbox assembly as described herein. Sun gear 1112 may comprise a hollow center. In some embodiments, a sun gear 1112 may be mechanically coupled to an oil sleeve 1118 that may assist in distributing cooling or lubricating liquid using centrifugal force during rotation.

FIG. 11B illustrates a cross-sectional view of a rotor assembly 1100 (e.g., cross-section taken along line 1109 as illustrated in FIG. 11A) As described herein, rotor 1102 may include rotor hub 1104, lamination stack 1106, and Halbach array 1108. Rotor overwrap 1110 may abut on Halbach array 1108 and enclose stator assembly 1102. Bearing 1116 may include an inner race and outer race. In some embodiments, sun gear 1112 may be mechanically coupled with rotor 1102. Some embodiments may include mechanically coupling the sun gear 1112 and rotor 1102 using screws 1122. Bearing 1116 may assist with mechanically coupling rotor 1102 and sun gear 1112, as the sun gear 1112 and rotor 1102 may have diameters larger than that of bearing 1116, allowing the sun gear 1112 and rotor 1102 to both rest on bearing 1116. In some embodiments, a main shaft of the electric engine assembly may travel through the bearing 1116, and thus through the sun gear 1112 and rotor 1102. Further, some embodiments may include the bearing 1116 serving to support the rotor 1102, and rotor hub 1104, with any loads experienced by the rotor 1102 or rotor hub 1104 during normal operation. In some embodiments, the inner surface of the rotor assembly 1102 may possess a diameter equal to the outer race of bearing 1116. Sun gear 1112 may include gear teeth 1114. In some embodiments, rotor assembly 1112 and sun gear 1112 may be substantially aligned along a central axis 1124. In some embodiments, a portion 1140 of sun gear 1112 may abut a portion 1142 of rotor 1102.

As described herein, disclosed embodiments of an electric propulsion system may include a motor assembly and gearbox assembly. In some embodiments, a gearbox assembly may comprise torque paths that may exert loads. As described herein, an electric propulsion system may include a gearbox assembly and a rotor of an electric motor assembly, both of which may exert loads on a shaft. For example, gyroscopic effects due to the spinning rotor being in motion may exert moment loads. The moment loads may be on a centralized path of the shaft. A gearbox assembly, which includes planetary gears, may share torque through several paths, so the sharing of loads may be dependent on tolerances of components within the electric engine. As such, solutions that support loads and resist moments created by generated torque while maintaining a low mass and drag profile may be advantageous.

Disclosed embodiments may include a bearing system comprising a rotor utilizing a bearing to support loads. FIG. 11C illustrates a cross-sectional view of an exemplary embodiment of rotor assembly 1100, consistent with embodiments of the present disclosure. In some embodiments, a rotor assembly may include a bearing system 1101. Bearing system 1101 may include a rotor hub 1104, sun gear 1112, and main shaft 1126. Bearing system 1101 may use various types of bearings to reduce loads experienced by components substantially aligned along a shaft. As described herein, a rotor assembly may be mechanically coupled to a sun gear 1112. Main shaft 1126 may comprise outer surface 1128, which may abut on shaft flange assembly 1130. Shaft flange 1130 may abut on bearing 1116. Bearing 1116 may have an inner race 1134 mechanically coupled to the main shaft 1126 and outer race mechanically coupled to rotor hub 1130. In some embodiments, bearing 1116 may have an inner race mechanically coupled to the main shaft 1126 and outer race mechanically coupled to rotor hub 1104 and the sun gear 1112. In some embodiments, bearing 1116 may abut on both rotor hub 1104 and sun gear 1112. Bearing 1116 may be mechanically coupled to shaft flange assembly 1130. As described herein, bearing 1116 may support rotor hub 1104 and support loads from rotor hub 1104. For example, the rotation and motion of rotor hub 1104 may cause gyroscopic effects that exert a load. Bearing 1116 may support loads including radial or axial rotor loads. Bearing 1116 may allow sun gear 1112 to float, which may allow the variation in loads to be absorbed. In some embodiments, bearing 1116 may be a rolling element bearing. For example, bearing 1116 may include rolling element(s) 1117, which may be immersed in lubricant 1132 within bearing 1116. In some embodiments, lubricant 1132 may comprise oil. Other bearings, such as a ball bearing or deep groove ball bearing, capable of support loads and high speeds of rotations, may be used.

Some disclosed embodiments may include a hydrodynamic bearing that can resist, or counteract, rotor moment loads. In some embodiments, a hydrodynamic bearing may be positioned along a sun gear. For example, a hydrodynamic bearing may be located between a sun gear 1112 and main shaft 1126, and the hydrodynamic bearing may be located in a position along the length of the sun gear 1112 (e.g., along the circumference of outer surface 1128), as referenced in FIG. 11C. In some embodiments, the hydrodynamic bearing may extend along the full length of the sun gear 1112. The hydrodynamic bearing may be positioned where a main shaft 1126 has a shoulder, or cavity, as described herein. For example, the hydrodynamic bearing may comprise fluids between a sun gear 1112 and a shoulder, or cavity, of a main shaft 1126. In some embodiments, the size or shape of the shoulder may be determined by properties of the rotor. The hydrodynamic bearing may comprise fluids, such as oil, located between a sun gear 1112 and the outer surface 1128 of a main shaft 1126. The hydrodynamic bearing may assist in resisting moment loads experienced by sun gear 1112. For example, the hydrodynamic bearing may exert a restoring force to resist gyroscopic loads. In some embodiments, hydrodynamic bearing may comprise oil. The hydrodynamic bearing may allow sun gear 1112 or a ring gear to float. The hydrodynamic bearing may allow for tolerances within various components of the electric propulsion system. The hydrodynamic bearing may comprise the same liquid, such as oil, that is used throughout the electric propulsion system for lubrication and cooling. As discussed herein, utilizing a single liquid for hydrodynamic bearings, cooling, and lubricating may provide advantages of reducing mass and reducing the size of various components.

Figures 12A, 12B:
FIGS. 12A and 12B are cross-sectional illustrations of electric propulsion systems of a VTOL aircraft, consistent with disclosed embodiments.

FIGS. 12A-12B are cross-sectional illustrations of electric propulsion systems of a VTOL aircraft, consistent with disclosed embodiments. FIG. 12A illustrates an exemplary embodiment of a tilter electric propulsion system. As disclosed herein, a tilter may refer to an electric propulsion system for tilt. A tilter 1200 may include an inverter assembly 1204, a gearbox assembly 1206, and an electric motor assembly 1202. As described herein, heat exchanger 1218 may be thermally, fluidically, and mechanically coupled to inverter assembly 1204. Inverter housing 1216 may enclose inverter assembly 1204. A gearbox assembly 1206 may abut on the inverter assembly 1204 and the electric motor assembly 1202. Motor-gearbox assembly housing 1210 may enclose an electric motor assembly 1202 and a gearbox assembly 1206. Sump 1212 may include a fluid inlet 1214 to transfer oil or other liquid to a heat exchanger 1218. In some embodiments, sump 1212 may be a reservoir to hold oil. Sump 1212 may abut on motor housing 1210. In some embodiments, main shaft 1208 extends from an end bell assembly sealing the motor-gearbox assembly housing 1210, through the gearbox assembly 1206 and electric motor assembly 1202 to a shaft flange assembly 1220. As described herein, gearbox assembly 1206 and electric motor assembly 1202 may be substantially aligned along main shaft 1208.

Further, an inverter assembly 1204 may be substantially aligned along an axis sharing the axis of the main shaft 1208.

As described above, a tilter may possess a variable pitch mechanism that serves to change the pitch of the propeller blades of a VTOL aircraft. In some embodiments, a variable pitch mechanism may be mounted to the rear of the electric engine assembly, such as the rear of an inverter assembly. Further, a variable pitch mechanism may interact with a main shaft, as described herein, to alter the pitch of the propeller blades. In such embodiments, the inverter assembly 1204, inverter assembly housing 1216, and divider plate, as discussed herein, may include one or more passages through their housings to allow the variable pitch mechanism to interface with the main shaft or propeller blades. As discussed throughout, a lifter electric propulsion system may not alter its orientation of thrust or pitch of blades. Therefore, in some embodiments, a divider plate may not possess a passage such as the one present in the tilter electric propulsion system. Further, the inverter assembly and inverter assembly housing of a lifter electric propulsion system may not possess such a passage, but it is recognized that from a safety testing point of view and a manufacturability standpoint, it may be beneficial to have the inverter assembly and inverter assembly housing of a lifter electric propulsion system possess a similar packaging, including the passage, to that of the tilter electric propulsion system.

FIG. 12B illustrates an exemplary embodiment of a lifter electric propulsion system. As disclosed herein, a lifter may refer to an electric propulsion system for lift. A lifter 1200 may include inverter assembly 1204, gearbox assembly 1206, and electric motor assembly 1202. As described herein, heat exchanger 1218 may be thermally, fluidically, and mechanically coupled to inverter assembly 1204. Inverter housing 1216 may enclose inverter assembly 1204. A gearbox assembly 1206 may abut on inverter assembly 1204 and electric motor assembly 1202. Motor-gearbox housing 1210 may enclose an electric motor assembly 1202. In some embodiments, main shaft 1208 extends from an end bell assembly sealing the motor-gearbox housing 1210, through gearbox assembly 1206, to electric motor assembly 1202. As described herein, gearbox assembly 1206 and electric motor assembly 1202 may be substantially aligned along main shaft 1208. Further, an inverter assembly 1204 may be substantially aligned along an axis sharing the axis of the main shaft 1208.

As discussed herein, it is noted that having similar components between the tilter and lifter electric propulsion systems may be beneficial with respect to manufacturability of the overall aircraft. Further, using similar components between the tilter and lifter electric propulsion systems may be beneficial in terms of diagnosing issues and assuring safety requirements and protocols are met. However, in some embodiments, a lifter and tilter may possess components that are not present within the other. For example, a lifter electric propulsion system 1200 may include a lock nut 1222 posited between the main shaft 1208 and the shaft flange assembly 1220 that is larger than the lock nut present within the tilter electric propulsion system 1200. A lock nut 1222 may serve to ensure the mechanical coupling of the main shaft 1208 and shaft flange assembly 1220 may not be damaged or corrupted due to the various vibrations loads experienced throughout the flight. For example, as discussed herein, some phases of flight do not require the lifter electric propulsion system to be active and in such cases may require the blades to be stored in a certain fashion. However, if the lifter blades were to not be properly stored, they may experience a drag force against the blades and the mechanical coupling of the main shaft 1208 and shaft flange assembly 1220 may experience a tension force. Further, in some embodiments, the lock nut 1212 of the lifter electric propulsion system 1200 may counteract operational loads. In some embodiments, a lifter electric propulsion system may also include a larger propeller flange 1226, compared to the shaft flange of the tilter, for similar reasons as to the presence of the lock nut 1222. Further, the lifter electric propulsion system may also include a bearing 1224 to assist in the rotation of the propeller flange 1226. As described herein, an electric propulsion system may achieve different angles of orientation during operation. As such, fluids in the electric propulsion system, including coolants or lubricants, may move due to gravitational forces. For example, a lubricant or coolant such as oil may be shifted within the electric propulsion system during operation. Oil may reside in a sump, and the oil may shift within the sump and the electric propulsion system. Not matter the orientation, some embodiments may require some quantity of oil or other liquid acting as coolant or lubricant throughout all phases of flight. As such, a cooling system may be designed to allow for the circulation of oil no matter the orientation of the aircraft.

FIGS. 13A-13E are cross-sectional illustrations of electric propulsion systems of a VTOL aircraft, consistent with disclosed embodiments. FIGS. 13A-13D may possess like numerals and refer to similar elements of the electric propulsion systems 1300, 1300, 1300, and 1300. As such, similar design considerations and configurations may be considered throughout the embodiments.

Figures 13A, 13B:
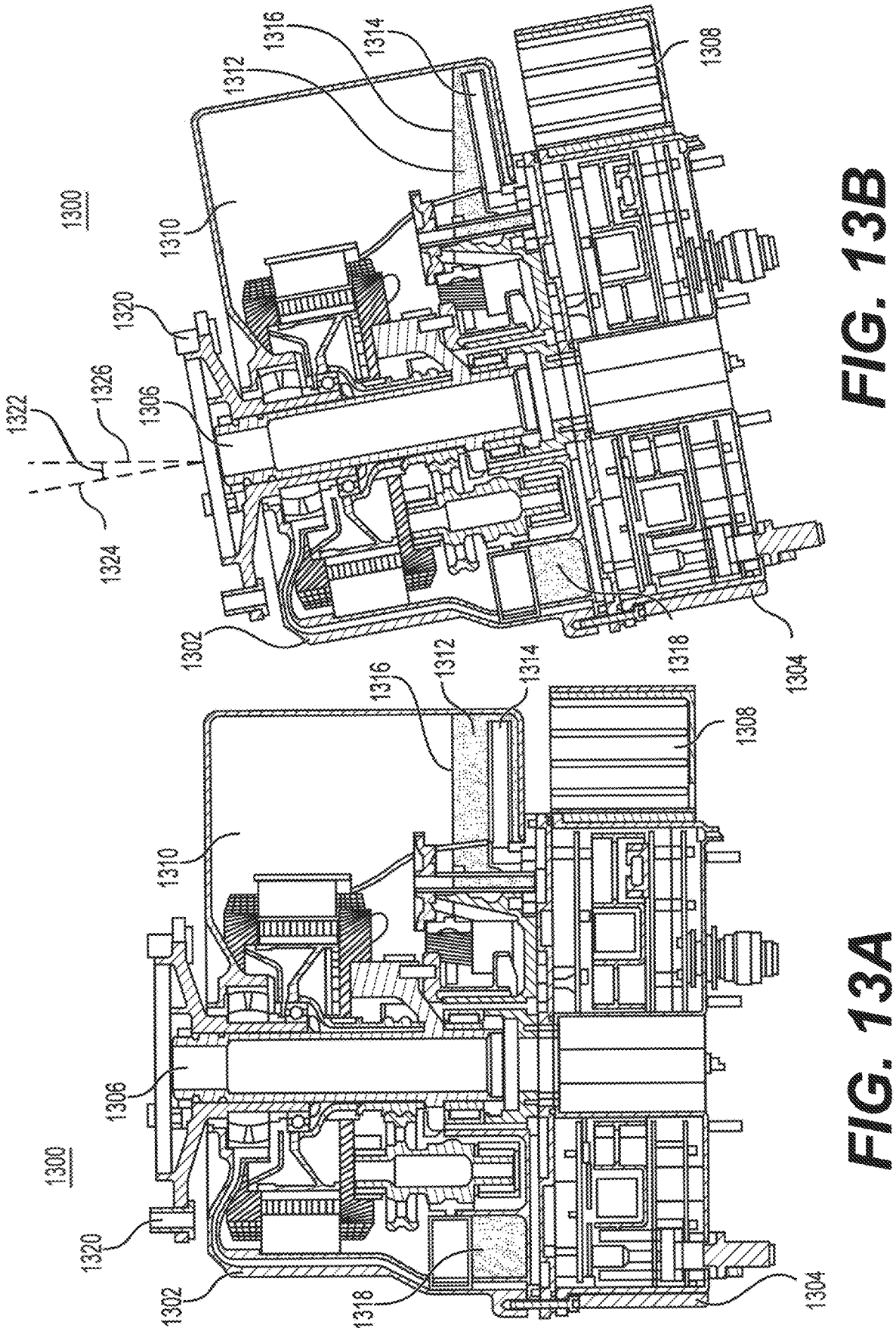
FIGS. 13A-13I are cross-sectional illustrations of electric propulsion systems of a VTOL aircraft in various flight phases, consistent with disclosed embodiments.

FIG. 13A illustrates an exemplary embodiment of an electric propulsion system in an upright orientation. As an example, an upright orientation could be achieved during flight operations including, but not limited to, takeoff, landing, or hover. Electric propulsion system 1300 may include motor-gearbox assembly housing 1302, inverter assembly housing 1304, main shaft 1306, heat exchanger 1308, sump 1310. In some examples, electric propulsion system 1300 may also include a shaft flange assembly 1320). Lubricants or coolants such as oil 1312 may be located in sump 1310. In the exemplary orientation 1300, oil may also be present in the volume 1318 at an oil level 1316 in the volume 1318 and the sump 1310. Oil 1312 may enter pump inlet 1314 and travel to heat exchanger 1308. Then, oil 1312 may be cooled in heat exchanger 1308, and distributed throughout the electric propulsion system, as described herein. In some embodiments, oil may be distributed along main shaft 1306 by centrifugal forces.

FIG. 13B illustrates an exemplary embodiment of an electric propulsion system 1300 in a first angled orientation, for example a hover orientation at an angle 1322. As an example, electric propulsion system 1300 may be oriented along central axis 1324 at an angle 1322 from vertical axis 1326. As shown in FIG. 13B, although the electric propulsion system 1300 is in an angled orientation, pump inlet 1314 remains in contact with the oil 1312 and under the oil level 1316 to allow oil to continue to circulate through the liquid flow paths as described herein.

Figure 13C:
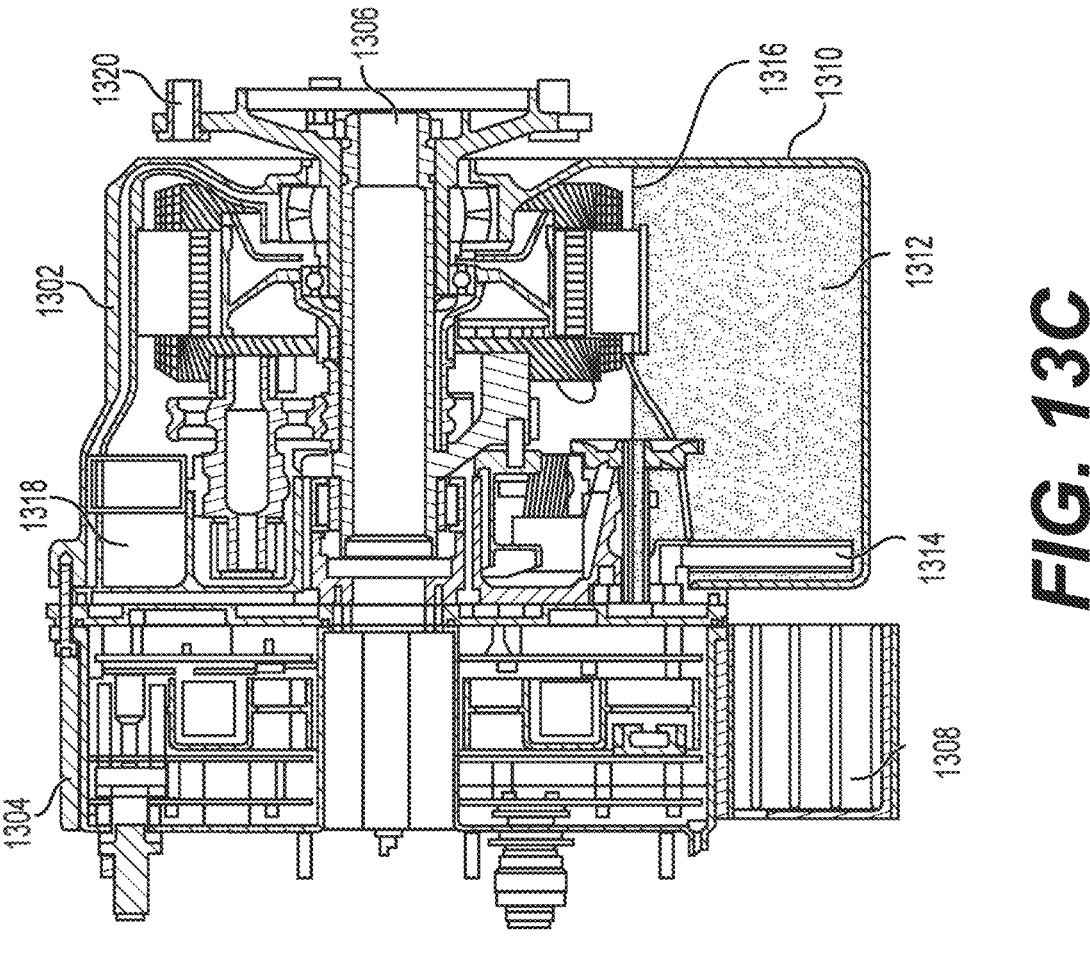

FIG. 13C illustrates an exemplary embodiment of an electric propulsion system 1300 in a horizontal orientation. As an example, electric propulsion system 1300 may be in a horizontal orientation during forward flight or cruise configuration. As shown in FIG. 13C, during a horizontal orientation, the pump inlet 1314 remains in contact with the oil 1312 and under the oil level 1316 to allow oil to continue to circulate through the liquid flow paths as described herein.

Further, the volume 1318 may not contain oil during a horizontal configuration due to the force of gravity.

Figure 13D:
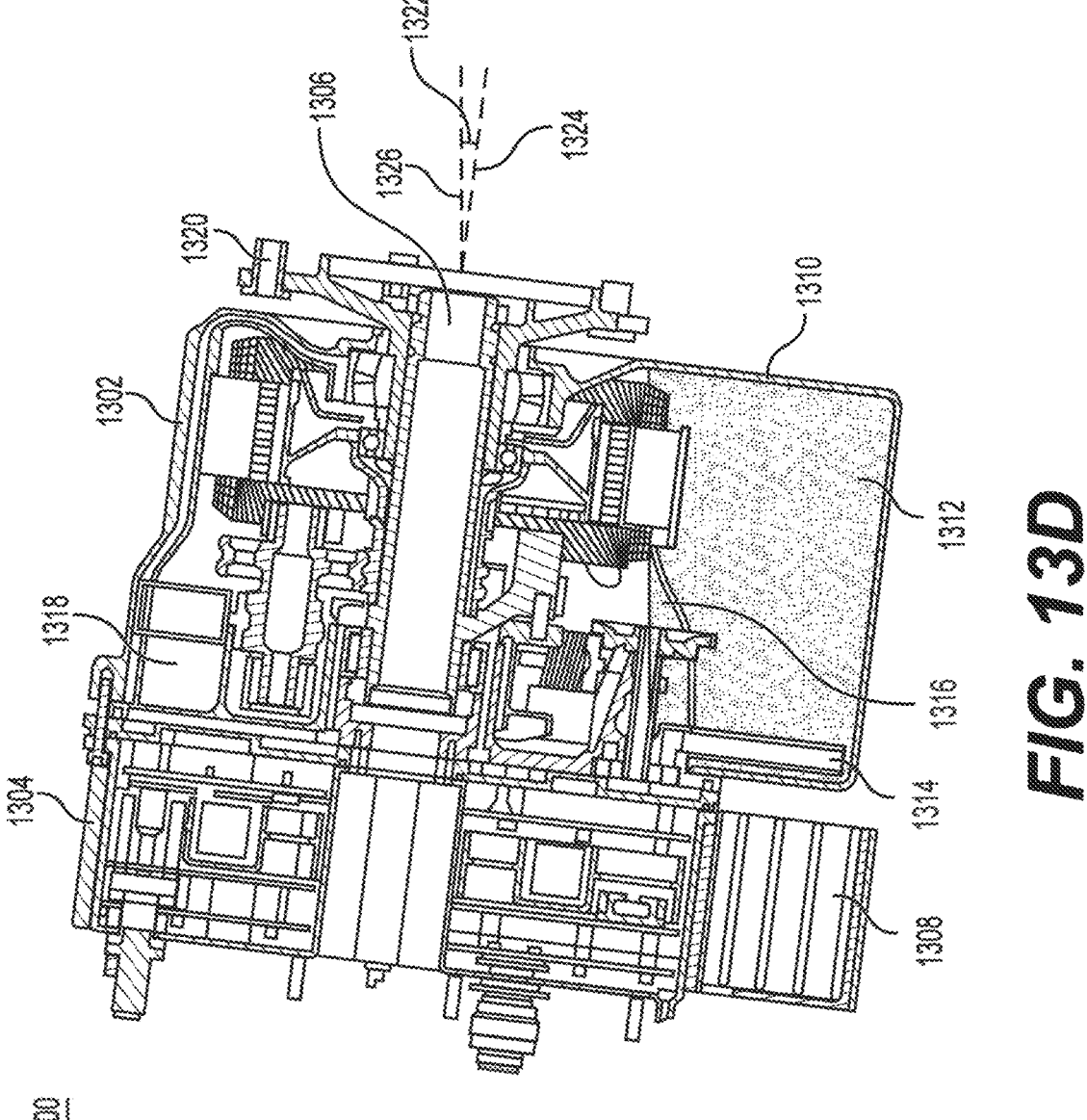

FIG. 13D illustrates an exemplary embodiment of an electric propulsion system 1300 in a second angled orientation, for example a dive at angle 1322. As shown in FIG. 13D, during a dive orientation, the pump inlet 1314 remains in contact with the oil 1312 and under the oil level 1316 to allow oil to continue to circulate through the liquid flow paths as described herein. Further, the volume 1318 may not contain oil during a horizontal configuration due to the force of gravity. In some embodiments, oil, or other flammable liquid, may be used as a lubricant throughout an electric engine and may also be used as coolant fluid to assist in managing the heat generated by the engine during operation. As has been disclosed herein, an electric engine may have different primary functionalities, and as such may not include the same amount of lubricant and coolant. For example, a lifting and landing engine may only require less than one quart of oil while an engine that operates in all stages of flight may require more than one quart of oil. It should be understood that the example embodiments as mentioned herein are representative and do not dictate the bounds of the amount of lubricant and coolant that may be used in an electric engine.

Figure 13E:

FIG. 13E illustrates an exemplary embodiment of an electric propulsion system. Electric propulsion system 1300 may include motor housing 1302, inverter housing 1304, main shaft 1306, heat exchanger 1308, and sump 1310. Electric propulsion system 1300 may include a fluid distribution system, including a fluid reservoir such as sump 1310. In some embodiments, the fluid may be distributed for at least one of cooling or lubricating parts of the electric motor, as discussed herein. In some embodiments, the fluid may be oil. Sump 1310 may contain oil 1312. Lubricants or coolants such as oil 1312 may be located in sump 1310. Filter 1328 may filter oil 1312 during distribution throughout the electric propulsion system 1300. In some embodiments, filter 1328 may be adjacent to main shaft 1306, for example, the filter 1328 may abut on the main shaft 1306.

Figure 13F:
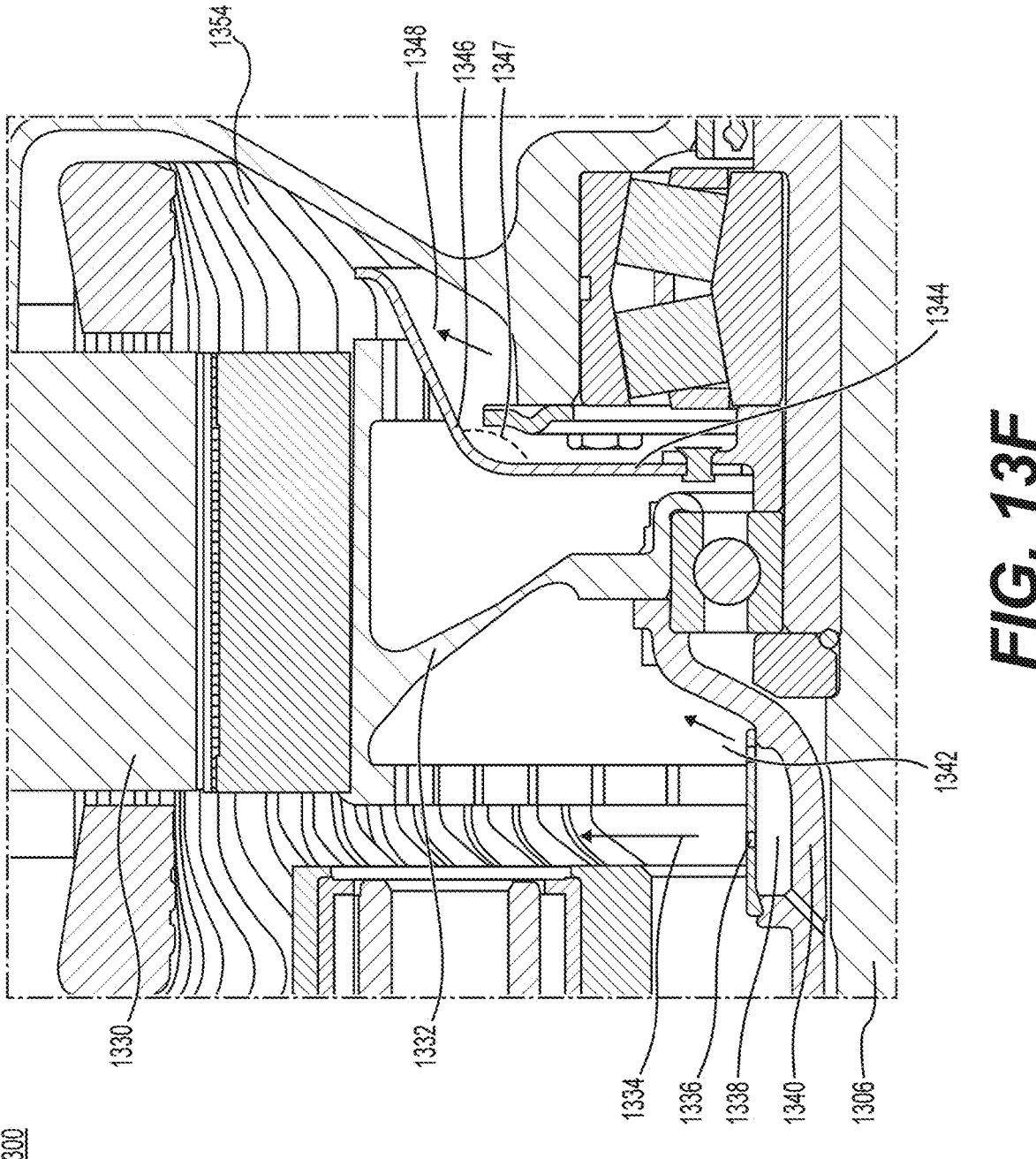

It will be appreciated that electric propulsion systems for aircraft, automobiles, and other vehicles may include an electric motor assembly. FIG. 13F illustrates a cross-sectional view of an electric propulsion system 1300, consistent with embodiments of the present disclosure. In some embodiments, the electric propulsion system may include a stator having a stator ring 1330 and a rotor 1332 positioned within the stator. For example, rotor 1332 may be positioned within the stator such that the stator encircles the rotor. In some embodiments, a hollow shaft 1340 may be attached to the rotor 1332. As an example, the hollow shaft may be coupled, attached, fixed, or fastened to the rotor by means of attaching a shaft to a rotor discussed herein, including screws, fasteners, and bolts. A hollow shaft may include shafts with an interior that is at least partly empty. For example, hollow shaft 1340 may include a sun gear of a planetary gearset providing a gear reduction which may drive movement of a main shaft, such as main shaft 1306. In some examples, main shaft 1306 may extend through the hollow shaft 1340. The electric propulsion system may include a fluid distribution chamber 1338, which may be located on the outer surface of the hollow shaft 1340, as described herein. Some disclosed embodiments may involve at least one fluid distribution chamber located on an outer surface of the hollow shaft. A fluid distribution chamber may involve a channel, passageway, tube, cavity, or compartment for distributing, transporting, spreading, or circulating fluids (e.g., a liquid and/or a coolant such as oil, as described herein). For example, fluid distribution chamber 1338 may rotate with hollow shaft 1340. In some examples, electromagnetic properties of stator ring 1330 and rotor 1332 may drive a rotation of the hollow shaft 1340, which may then drive the rotation of fluid distribution chamber 1338. As a result, fluids in fluid distribution chamber 1338, such as oil, may experience centrifugal force, which may include a centripetal force. The rotation of the hollow shaft may create a centrifugal force such that fluid in the fluid distribution chamber may be pushed, driven, propelled, or pressed. In some embodiments, the fluid distribution chamber may include at least one opening positioned to direct a fluid toward various components within the electric propulsion system, including the stator ring, during a rotation of the hollow shaft. The rotation of the hollow shaft may drive, fling, thrust, or actuate the movement of fluids, such as oil 1334, through one or more openings. For example, oil 1334 may be propelled through opening 1336 and may travel to stator ring 1330 to provide cooling and/or lubrication. In some embodiments, the at least one fluid distribution chamber may include at least one second opening positioned to direct the fluid toward the rotor during the rotation of the hollow shaft. For example, fluid distribution chamber 1338 may include one or more openings, such as a second opening which may distribute oil 1342 to provide cooling for rotor 1332. Centrifugal force may propel the fluid through the second opening, and the second opening may guide the fluid toward the rotor 1332, including rotor magnets and rotor core, to provide cooling. In some embodiments, at least one opening may involve more than one first or second opening in the electric propulsion system. In some embodiments, the at least one first opening and the at least one second opening may be bleed holes. For example, bleed holes may allow the passage of fluids through the holes or openings. In some embodiments, fluid in fluid distribution chamber 1338 may receive fluid from main shaft 1306. In some examples, the stator may receive electricity from an inverter. For example, the stator may receive electricity from a power inverter assembly 704 as referenced in FIG. 7.

In some embodiments, components within an electric propulsion system may be configured to form various paths that can reach points within the electric propulsion system to distribute lubrication or cooling. In some embodiments, electrical propulsion system 1300, as referenced in FIG. 13F, may comprise a collar 1344 connected to a rotating component of electrical propulsion system 1300, such as any shaft or rotor (e.g., rotor 1332) of electrical propulsion system 1300. For example, collar 1344 may be connected to the main shaft 1306. A collar may comprise a pipe, ring, tube, sleeve, flange, bowl, rim, or component which may encircle another component. In some embodiments, the collar encircles the main shaft. Connected may refer to coupling, fastening, or fixing, including by machining, adhesives, fasteners, or bolts. For example, the collar may be a conical component disposed on the perimeter of the main shaft. In some embodiments, a first portion of the collar may extend outward from the main shaft toward the rotor. Extend outward may refer to the first portion having a length that may extend from the main shaft. In some embodiments, at least a portion of the collar may be formed to direct a fluid away from the main shaft and toward the stator ring by centrifugal force. Formed to direct a fluid may include being configured to guide a fluid, such as oil. For example, the collar 1344 may include angles, gradients, slants, or corners to guide fluid toward the stator ring. In some embodiments, a second portion of the collar may be angled to direct fluid around an edge of the rotor. For example, fluid may be directed around the edge of the rotor 1332 and may reach the stator ring 1354. In some embodiments, fluid may be directed away from the main shaft 1306 by a rotation of the main shaft. For example, rotation of the main shaft, such as rotation driven by a gearbox and/or electric engine, may guide or propel fluid away from the main shaft. In some embodiments, centrifugal force may be created by a rotation of the main shaft, as described herein. Centrifugal force may propel or drive the fluid in the collar from the main shaft to the stator ring. For example, oil may be located in a propeller end feed, and rotation of the main shaft may create centrifugal force which may sling or propel the oil against walls of the collar 1344. In some embodiments, the fluid may be directed towards one or more end turns of the stator ring 1354. Thereby, the oil in the collar may be guided along the walls of the collar towards the stator and stator ring to provide cooling. For example, the oil may be directed towards the stator end turns, and the oil may be travelling at a high velocity, which may provide improved thermal heat transfer from the copper of the stator to the oil. In some embodiments, oil may be directly fed to the collar from an oil passage in the housing. Oil may reside in sumps, reservoirs, tubes, or other passages in the housing having a circular internal volume within the electric propulsion system. Directly fed may involve oil transferred from the passageways or tubes in the housing to the collar. In some embodiments, fluid is indirectly fed to the collar from one or more rotating components of the electric motor. Indirectly fed may involve fluid traveling between more than one component.

For example, a collar 1344 may be connected to main shaft 1306F, as referenced in FIG. 13F. The collar may be formed to direct a fluid such as oil away from main shaft 1306 and toward stator ring 1330 by centrifugal force. The collar 1344 may comprise a portion 1346 extending away outward from main shaft 1306, and the collar may include a bend 1347 (e.g., an angle) to direct fluid around the rotor 1332, such as around an edge of rotor 1332. In some examples, collar 1344 may be configured to provide fluid paths that direct fluids in a direction 1348. Thereby, fluid such as oil may be guided towards the stator and stator ring 1330 to provide heat transfer and cooling. Centrifugal force may propel oil in a direction 1348 toward the stator ring. In some embodiments, rotating components may include a bearing at an output end of the main shaft 1306. For example, a bearing at an output end of the shaft may include a bearing positioned on the main shaft 1306 near a propeller flange 1307 (e.g., of a propeller shaft flange assembly or propeller mount), as referenced in FIG. 13E. In some embodiments, a propeller flange 1307 may be attached to the main shaft 1306, and the collar may be attached to the propeller flange 1307. For example, the propeller flange 1307 may be mechanically coupled or fastened to the main shaft 1306. As a result, oil from propeller flange 1307, from bearings near the propeller, or from propeller end feeds may be indirectly fed to the collar to provide cooling for the stator. In some embodiments, the motor housing 1302 may include passages that deliver oil to various portions of the electric motor and/or gearbox assembly, such as fluid passage 1351 that delivers oil near the propeller flange 1307. It is appreciated that such configurations of a collar may provide increased thermal heat transfer and enable a compact engine design through the circulation and distribution of oil.

However, in some embodiments it may be desirable to direct oil or other fluids at the stator windings with high pressure, such as in a jet stream or spray, rather than by simply flinging the oil over a collar portion as described above. Such pressurized distributions may allow the oil to better penetrate the stator windings for improved cooling efficiency, or may allow for a multi-directional distribution of oil to provide better coverage. It will be appreciated that the disclosed embodiments provide improvements to distributing fluids that may cool and/or lubricate components of electric propulsion systems as described herein. In some embodiments, it may be desired to distribute fluid to an electric motor assembly at increased velocities, amounts, pressures, or distances. As described below, the disclosed embodiments may eject cooling fluids at a higher pressure than what is available by, e.g., the configuration of FIG. 13F. The disclosed embodiments may collect fluid within a rotating channel of a collar to generate a pressure head, which can enable a pumping effect to distribute such fluids through a nozzle or other opening at high pressure using centrifugal forces from a rotating component of the electric propulsion system. As described herein, providing fluid to the rotor or stator of an electric motor assembly may enable improved thermal transfer, thereby increasing the rate of cooling of the electric motor assembly, which may result in efficiency improvements. In some embodiments, fluids for cooling may include one or more of glycol, oil, or any other liquid that enables the transfer of heat from components of the electric propulsion system to the liquid. It will be appreciated that the disclosed embodiments may be applicable to any system utilizing an electric propulsion system, including aircraft (e.g., VTOL aircraft), vehicles, transmission systems, industrial machinery, wind turbines, and ships, as non-limiting examples.

Figure 13G:
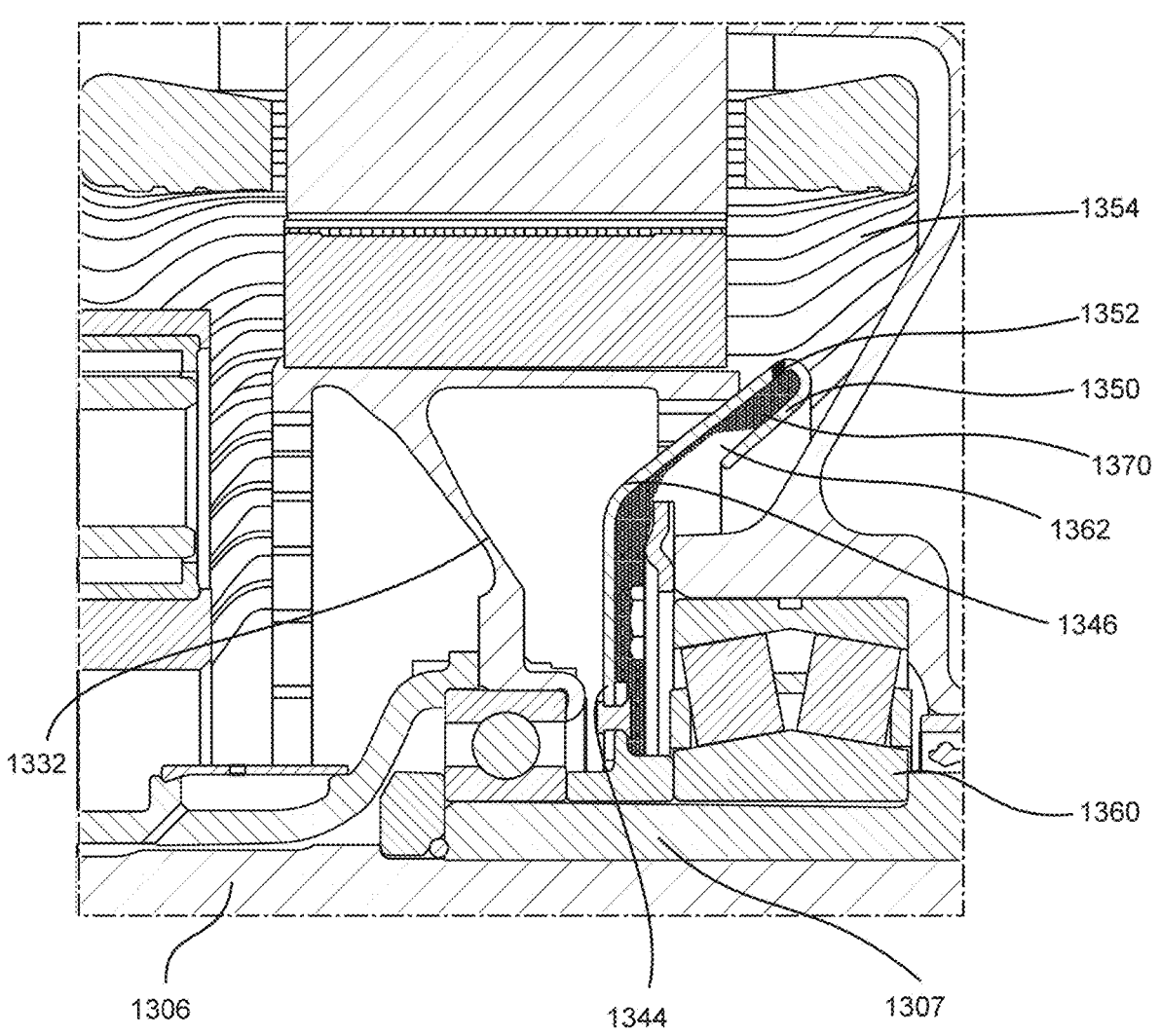

In some embodiments, a collar may be configured to distribute fluid to an electric motor assembly at increased velocity, pressure, or distance. FIG. 13G illustrates a cross-section of an electric propulsion system 1300, consistent with disclosed embodiments. Electric propulsion system 1300 may include an electric motor assembly including a rotor 1332 and a stator. The stator may comprise end windings 1354, which may also be referred to as stator end turns. As described herein, the rotor may be connected to a main shaft 1306, such as through a hollow shaft (e.g., a sun gear). In some examples, the rotor may be directly connected to main shaft 1306. In some embodiments, collar 1344 may be connected to the main shaft 1306. For example, collar 1344 may be coupled to main shaft 1306 through various components, including flange 1307 which may abut on the main shaft 1306, such that rotations of main shaft 1306 may also drive rotations of collar 1344. In such an example, collar 1344 may rotate at the same speed as the main shaft 1306 (e.g., and thereby at the same speed as a propeller driven by main shaft 1306). In some examples, collar 1344 may be connected to main shaft 1306 by abutting on main shaft 1306. In some embodiments, collar 1344 may encircle the main shaft, such as by collar 1344 completely encircling main shaft 1306. In some examples, collar 1344 may encircle the main shaft by partially encircling main shaft 1306. For example, in some embodiments there may be a plurality of collars 1344G arranged around main shaft 1306, each collar partially encircling the main shaft. Collar 1344 may include one or more portions, which may be sections of the collar defined by angles or bends. Collar 1344 may include at least a first portion in some embodiments. For example, collar 1344 may include a first portion 1346 extending outward from main shaft 1306. Additionally, or alternatively, collar 1344 may include a second portion 1350 extending toward the main shaft 1306. For example, the second portion 1350 may extend inward toward main shaft 1306 in relation to first portion 1346.

In some embodiments, collar 1344 may be configured to direct fluid 1370 away from the main shaft 1306. As described herein, fluids in electrical propulsion system 1300 may experience centrifugal forces (e.g., due to the rotation of components including but not limited to the main shaft 1306, rotor, and collar 1344). For example, centrifugal forces may act on fluids within electrical propulsion system 1300, and the collar 1344 may guide the fluids in a direction away from main shaft 1306. In some embodiments, collar 1344 may include a channel configured to direct fluid away from the main shaft. A channel may refer to a compartment for distributing or transporting fluids, such as a chamber, conduit, reservoir, tube, or passageway. Collar 1344 may form channel 1362, such as a channel formed within the inside of the collar or along edges of the collar. In some embodiments, channel 1362 may be formed between first portion 1346 and second portion 1350 of collar 1344. For example, collar 1344 may form channel 1362 such that fluid 1370 may collect in the space between first portion 1346 and second portion 1350. In some embodiments, collar 1344 may include one or more openings 1352 anywhere along its perimeter or within collar 1344. An opening may also refer to an orifice or hole. Openings may include any shape, such as circular, ovular, or rectangular as non-limiting examples. In some examples, openings may include a slit. In examples where collar 1344 includes a plurality of openings, the openings may be of different sizes or shapes. Alternatively, the openings may have similar sizes or shapes. For example, opening 1352 may be positioned in the first portion 1346, in the second portion 1350, or along a bend between first portion 1346 and second portion 1350. In some embodiments, opening 1352 may be sized based on, e.g., dimensions of channel 1362, expected RPM ranges of the rotor, or desired pressures or flow rates of oil through the opening 1352. For example, fluid 1370 collected in channel 1362 may form a fluid column, such as a column of oil collected between the first portion 1346 and the second portion 1350 due to centrifugal force. The fluid column may be the volume of oil accumulated between first portion 1346 and second portion 1350 during operation of electric propulsion system 1300. In some examples, the diameter of opening 1352 may be sized to be smaller than that of the channel 1362. In such an example, as the fluid (e.g., oil) travels from channel 1362 through the opening 1352 due to centrifugal force, since the opening 1352 has a smaller cross-sectional area than channel 1362, the fluid may experience an increase in pressure resulting in a higher velocity as it exits the channel through the opening. Thus the fluid column may create a pressure head that causes fluid 1370 to be ejected from opening 1352 under a pressure that is greater than the local ambient pressure with the region between the stator windings 1354 and rotor 1332. It will be appreciated that the opening 1352 may thus act as a jet or spray nozzle and cause the fluid to exit at a higher speed. For example, channel 1362 of collar 1344 may be configured to direct oil away from main shaft 1306, through at least one opening 1352 in the collar, and toward end windings 1354. It will be appreciated that by distributing fluids (such as oil) travelling at higher speeds to components of the electrical propulsion system, including to the end windings 1354 of the stator, the disclosed embodiments provide increased heat transfer efficiency to such components.

Further, the use of channels may allow for a collar be made smaller while achieving cooling results that are the same as, or better than, a collar having no channels for forming a pressure head. For example, a collar having a channel may be made radially smaller and lighter than a corresponding collar having no channels while still enabling a desired amount of oil to reach the stator windings. Thus the collar can be made lighter and more compact.

In some embodiments, the fluid may be fed to collar 1344 from one or more rotating components of the electric propulsion system, including components such as main shaft 1306, propeller flange 1307, or various bearings within electrical propulsion system 1300. For example, collar 1344 may receive oil from bearing 1360 which may be disposed at an output end of main shaft 1306, as described herein. In some embodiments, collar 1344 may be configured to direct oil to certain components of the electric propulsion system 1300, as described herein. In some examples, collar 1344 may be configured to provide fluid paths (e.g., fluid path in direction 1348) that direct fluids to some components, such as first portion 1346 and/or second portion 1350 including a bend 1347 (as referenced in FIG. 13F) configured to direct fluid around the rotor such that the fluid may reach end windings 1354. In some examples, the bend 1347 may be disposed adjacent to bearing 1360. In some embodiments, bend 1347 may be disposed adjacent to bearing 1360 by being next to bearing 1360. In some embodiments, bend 1347 may be disposed adjacent to bearing 1360 by the collar being configured to receive fluids from bearing 1360. The collar may receive fluid from bearing 1360 in addition or alternatively to other fluid sources and rotating components. In some examples, collar 1344 may receive fluid from non-rotating components, such as from fluid passageways within housing(s) of electric propulsion system 1300.

Figure 13H:
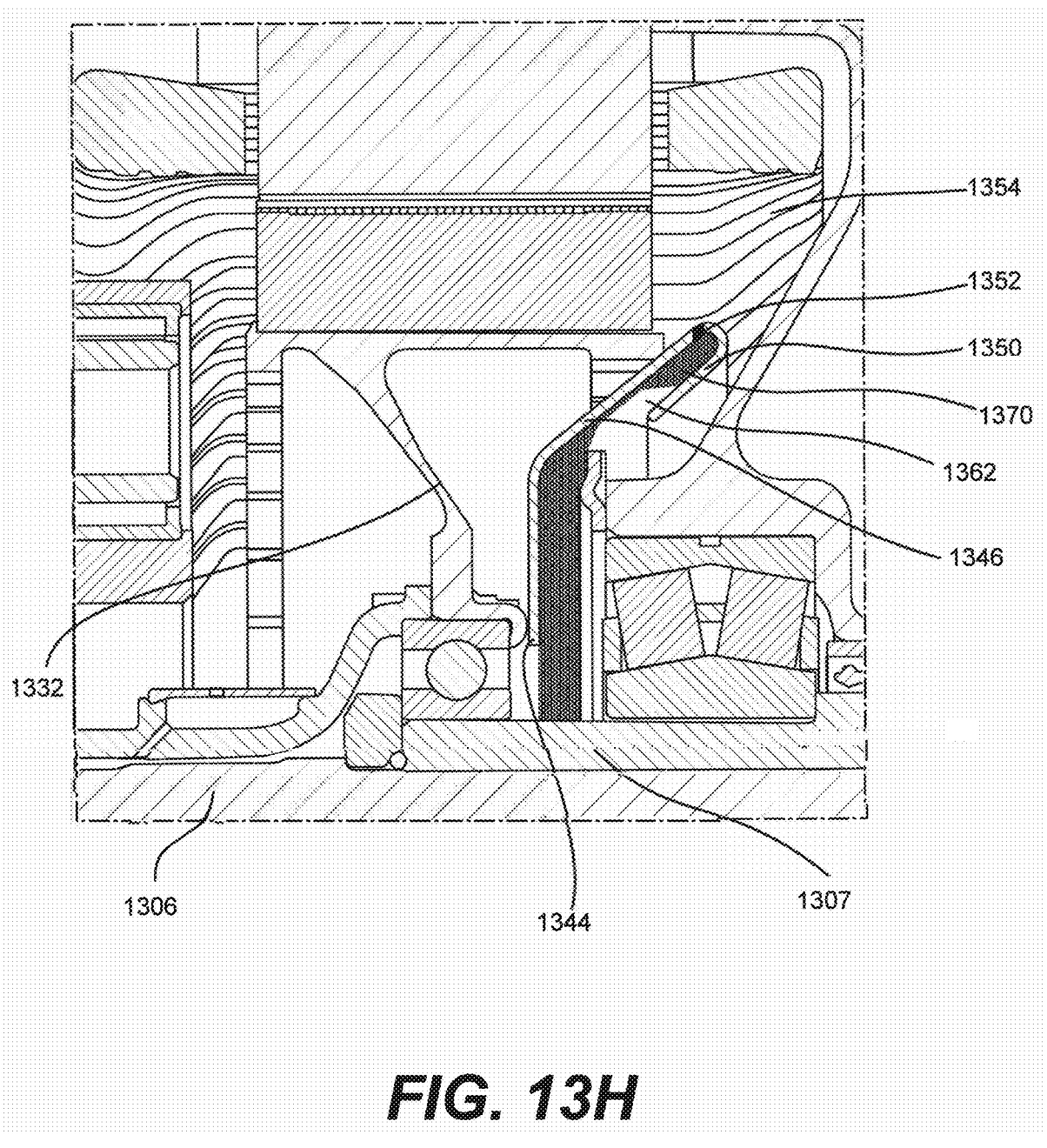

FIG. 13H illustrates a cross-sectional view of an electric propulsion system 1300, consistent with embodiments of the present disclosure. As described herein, collar 1344 may be connected to a rotating component of electric propulsion system 1300. In some embodiments, a rotating component may include rotor 1332, and collar 1344 may be connected to rotor 1332. For example, collar 1344 may be connected to rotor 1332 by abutting on rotor 1332. In some examples, collar 1344 may be connected to rotor 1332 through a friction fit. Additionally, or alternatively, collar 1344 may be connected to rotor 1332 through various means of attachment, coupling, or fastening. For example, collar 1344 may be connected to rotor 1332 by screws, fasteners, bolts or the like.

In another example, collar 1344 may be connected to a shaft connected to rotor 1332. For example, collar 1344 may be connected to hollow shaft 1340. As described herein, hollow shaft 1340 may abut on rotor 1332 and may be driven by rotor 1332. Accordingly, in some embodiments, it will be appreciated that collar 1344 may rotate at speeds similar and/or proportional to the rotational speed of rotor 1332.

Figure 13I:
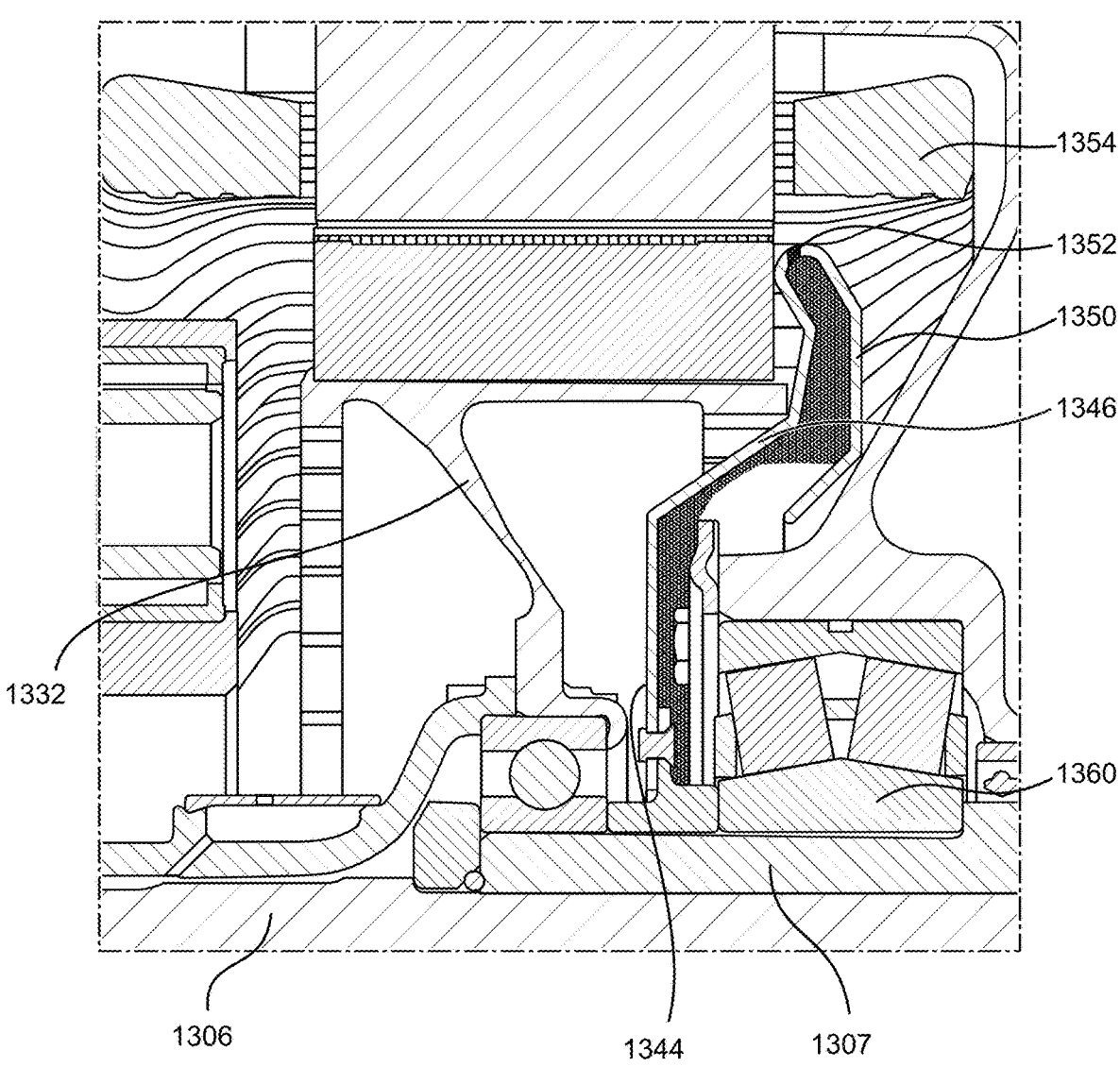

In some embodiments, electric propulsion systems may involve collars configured to distribute fluid to various component(s). For example, the disclosed embodiments include collars that distribute fluids to other components of the electrical propulsion system in addition or alternatively to distributing fluid to the stator. It will be appreciated that embodiments of the present disclosure are not limited to a particular shape of a collar, and various shapes or configurations of collars can be used to distribute fluid to various component(s). FIG. 13I illustrates a cross-sectional view of an electric propulsion system 1300, consistent with embodiments of the present disclosure. Electric propulsion system 1300 may include an electric motor assembly including a rotor 1332 and stator. Collar 1344 may be configured to direct fluid to locations including the rotor, stator, or both the rotor and the stator. In some examples, collar 1344 may be configured to circumvent rotor 1332 to enable fluid to directly reach stator windings 1354. For example, the first portion 1346 of collar 1344 may include one or more sections or angled segments extending away from main shaft 1306, and the first portion 1346 may be configured to guide fluid around rotor 1332. The second portion 1350 of collar 1344 may include one or more sections extending away from opening 1352 and towards main shaft 1306, such that a channel may be formed between second portion 1350 and first portion 1346. In some embodiments, the configuration of collar 1344 may determine the amount of fluid in the channel formed between first portion 1346 and second portion 1350. For example, the distance between first portion 1346 and second portion 1350 can be increased or decreased to allow varying amounts of fluid to collect. In another example, the number of angled segments, the length of the angled segments, and/or the angles in first portion 1346 or second portion 1350 can be varied to modulate fluid collection or to direct fluid at different angles through opening 1352. The disclosed embodiments may be configured to direct fluid around (e.g., away from) various components of the electric propulsion system 1300 and/or to direct fluid toward various components. For example, collar 1344 may be configured to direct fluid to any component within the electric propulsion system 1300, including bearings (e.g., bearing 1360), rotor components, and/or stator components. In some examples, electric propulsion system 1300 may include multiple collars. For example, multiple collars in electrical propulsion system 1300 may be configured to direct fluid to various components, such as each collar directing fluid to a different component.

Figure 14A:
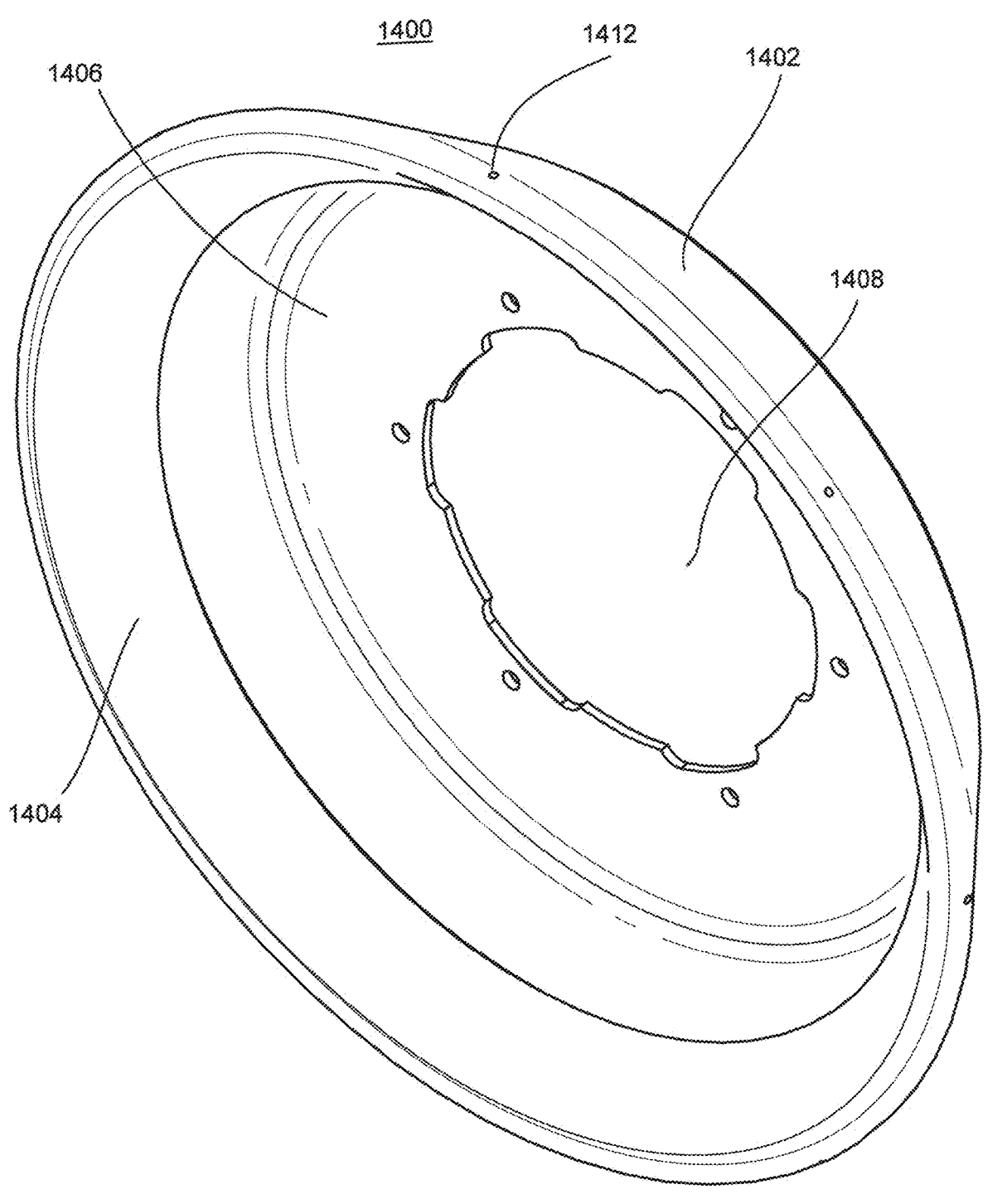
FIGS. 14A-14I are illustrations of views of a collar, consistent with disclosed embodiments.
Figure 14B:
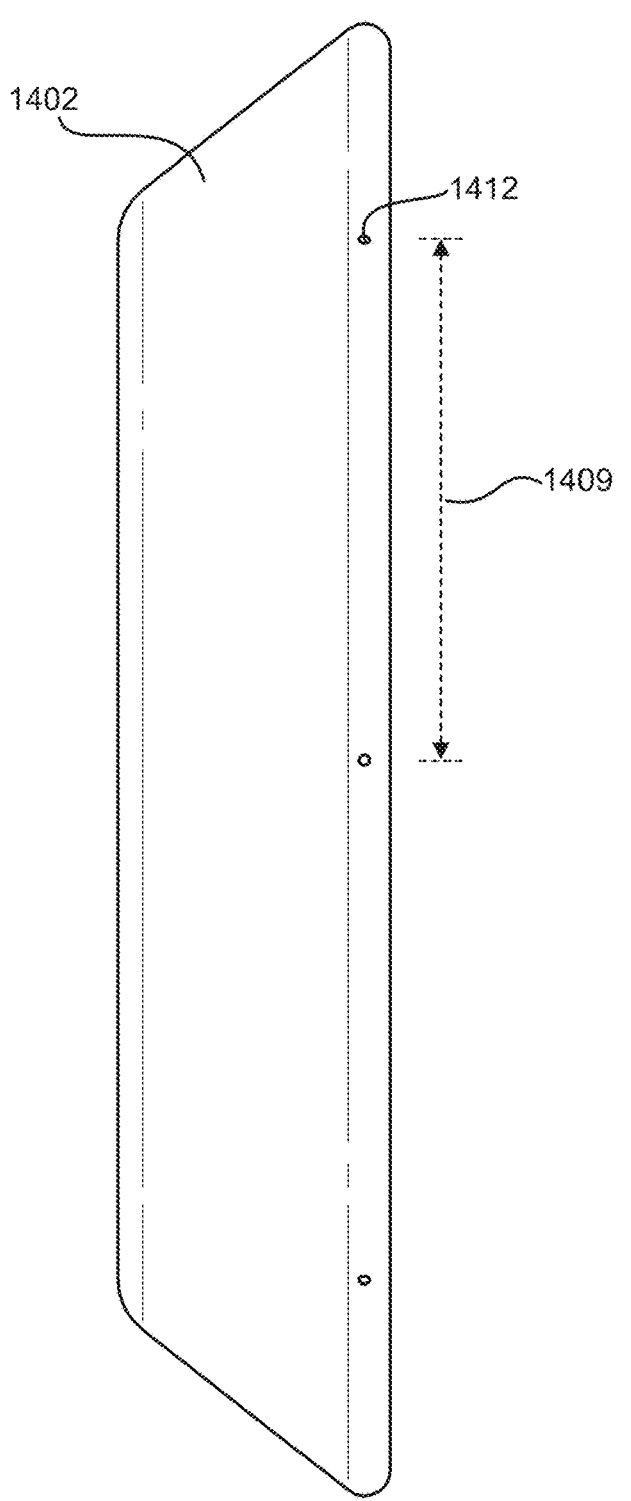

FIGS. 14A-14I illustrate views of collars having one or more channels, consistent with embodiments of the present disclosure. FIG. 14A illustrates a perspective view of a collar 1400, consistent with embodiments of the present disclosure. Collar 1400 may include a first portion 1402, as described herein. The first portion 1402 may form an inner side 1406 and an outer side (not illustrated) of collar 1400. In some examples, rotating components of an electric propulsion system may extend through, or be coupled to, an annular space 1408 of collar 1400. For example, a main shaft of the electric propulsion system and/or a flange may contact first portion 1402 and extend through the annular space 1408. Collar 1400 may include a second portion 1404, which may be oriented at an angle with respect to first portion 1402. As described herein, collar 1400 may include a plurality of openings 1412. Alternatively, collar 1400 may include a single opening FIG. 14B illustrates a front view of a collar 1400, consistent with embodiments of the present disclosure. In some embodiments, collar 1400 may include a plurality of openings 1412. For example, openings 1412 may be disposed on the first portion 1402 and/or the second portion (e.g., second portion 1404, as referenced in FIG. 14E) of the collar 1400. It will be appreciated that having multiple openings may enable collar 1400 to distribute fluid to multiple components within the electric propulsion system as well as to distribute fluid to different locations of the same component within the electric propulsion system. For example, collar 1400 may have a spacing 1409 between the plurality of openings 1412. In the example, spacing 1409 may determine how the fluid can be distributed to different components in the electric propulsion system. Spacing 1409 may be increased or decreased, and the spacing 1409 may be equal or different between holes, to enable a desired fluid distribution.

Figure 14C:
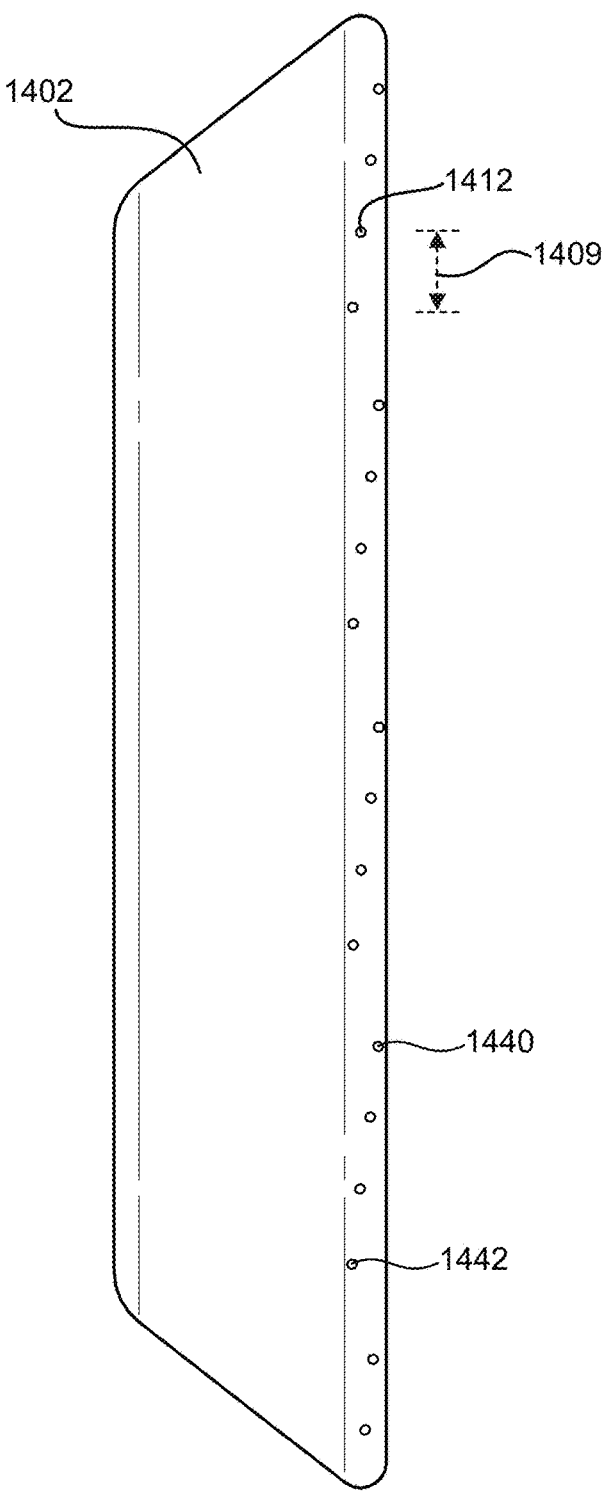
Figure 14D:
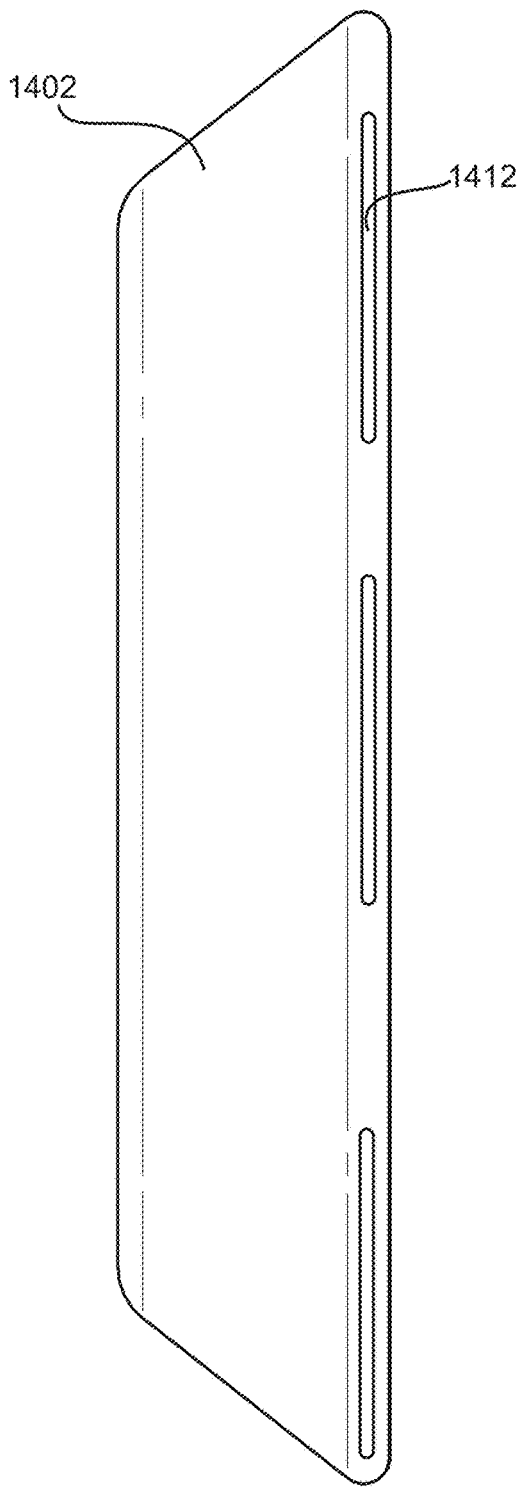

In some embodiments, as illustrated in FIG. 14C, collar 1400 may include openings configured to direct fluid in one or more directions. The collar 1400 may include a plurality of openings 1412, and the openings 1412 may be positioned axially offset. For example, openings 1412 may be offset relative to the right-most edge of collar 1400. First portion 1402 may have a plurality of openings 1412 at various positions relative to the right-most edge of collar 1400. For example, a first opening 1440 may be positioned at a first offset position relative to the edge of collar 1400, and a second opening 1442 may be positioned at a second offset position relative to the edge of collar 1400. The first opening 1440 may be configured to direct the fluid in a first direction, and the second opening 1442 may be configured to direct the fluid in a second direction, which may be a different direction than the first direction. First opening 1440 and second opening 1442 may be configured to direct fluid in different directions due to their differing axial positions (e.g., differing offset positions). As first opening 1440 and second opening 1442 may have different axial and/or radial positions, it will be appreciated that fluid travelling through first opening 1440 and second opening 1440 would be guided through such differing positions and thereby the fluid can travel in different direction. Thus, the disclosed embodiments may involve collar 1400 directing the fluid in different directions through differential positioning of the plurality of openings 1412. It will be appreciated that such configurations may enable distribution of fluid to different components and location of components within the electric propulsion system. For example, such configurations may enable distribution of fluid to cover a range of locations of the stator windings (e.g., the ends of windings as well as the middle of the windings). Additionally, or alternatively, collar 1400 may involve an opening of the plurality openings 1412 in a second portion (not illustrated) at various positions with respect to the right-most edge of collar 1400. For example, a first opening may be in the first portion 1402, and a second opening may be in the second portion, thereby directing fluid in different directions. Further, by varying the spacing 1409 of the plurality of openings 1412 along a circumferential direction, in combination with varying the offset position of the plurality of openings 1412, a desired distribution of fluids may be provided. It will be appreciated that in the example of multiple openings, the disclosed embodiments are not limited to the illustrated series of four repeating opening positions along the axial length of collar 1400, but may involve any suitable number such as two, three, five, or more openings in any of a plurality of positions.

Further, as discussed above and illustrated at FIG. 14D, openings 1412 need not be round jets. For example, one or more openings 1412 may comprise, e.g., an elongated slit shape along a circumferential direction, an axial direction, or at an angle between the circumferential and axial directions. Further, the slit need not be straight, but in some embodiments may comprise, e.g., zig-zag, serpentine or other curved shapes.

Figure 14E:
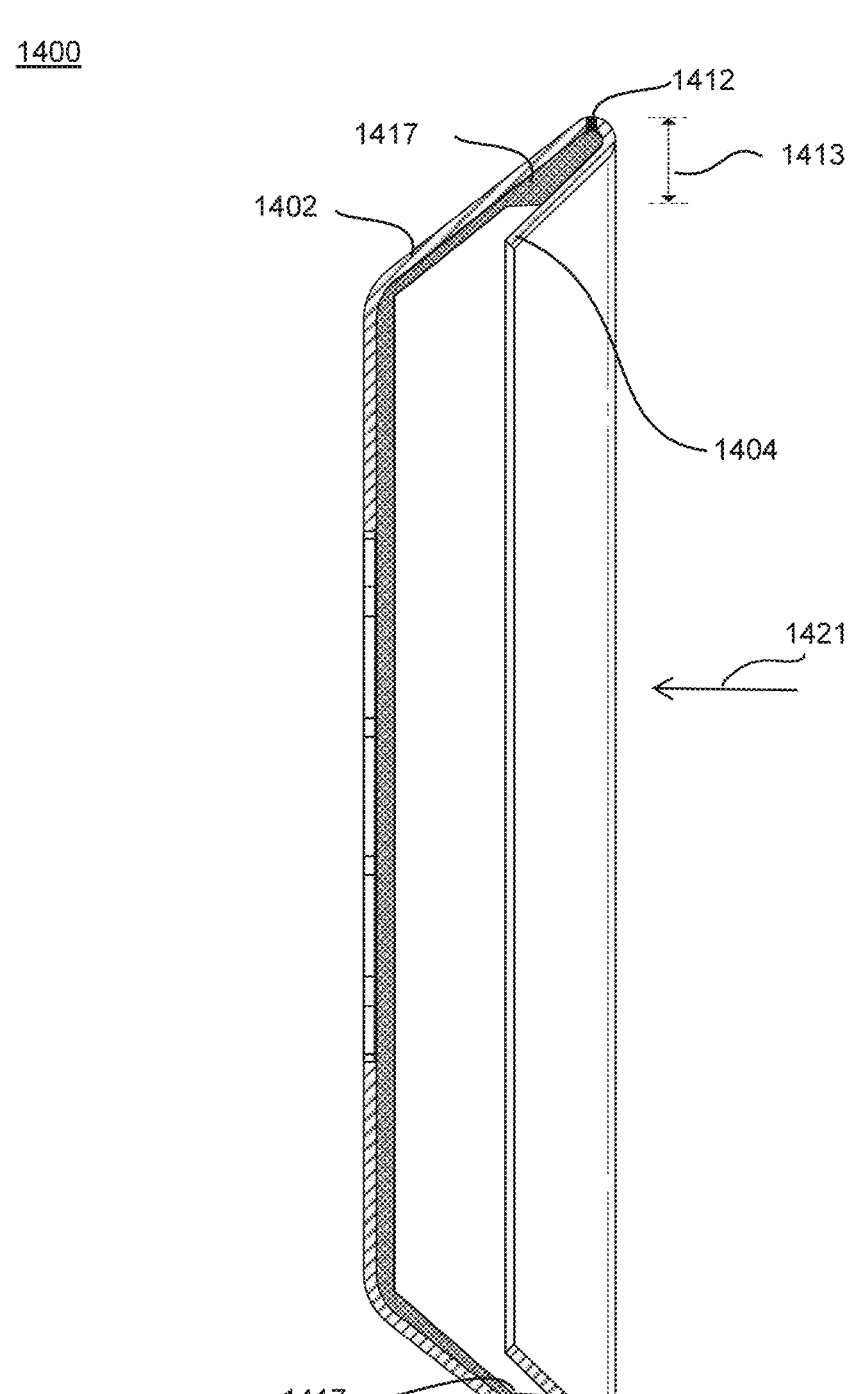

FIG. 14E illustrates a cross-section view of collar 1400, consistent with embodiments of the present disclosure. In some embodiments, collar 1400 may receive fluids such as oil from direction 1421. In some examples, openings 1412 may be disposed along first portion 1402 of collar 1400, or openings 1412 may be disposed along second portion 1404 of collar 1400. In some examples, collar 1400 may involve multiple openings, such as when a first opening may be disposed along first portion 1402 and a second opening may be disposed along second portion 1404. As described herein, channel 1417 may be formed between first portion 1402 and second portion 1404 of collar 1400, and the channel may collect fluid such as oil. The fluid in channel 1417 may have a depth 1413 (e.g., height) relative to the outer periphery of collar 1400. Among other factors, the pressure of the fluid at the opening in the plurality of openings 1412 may depend on the depth 1413 and the rotational speed of the collar, which may be a function of the distance from an opening in the plurality of openings 1412 to the axis of rotation (e.g., a main shaft in some examples). Thus, by varying the position of the opening in the plurality of openings 1412 and/or varying the relative angle and length of the second portion 1404 in relation to the first portion 1402, the disclosed embodiments may achieve a desired fluid pressure at the opening and thereby a desired speed of fluid exiting the opening. As such, the disclosed embodiments provide a pumping effect to direct fluid through the opening 1412 to desired locations within the electric propulsion system at desired speeds to improve thermal heat transfer and improve cooling of components.

Figure 14F:
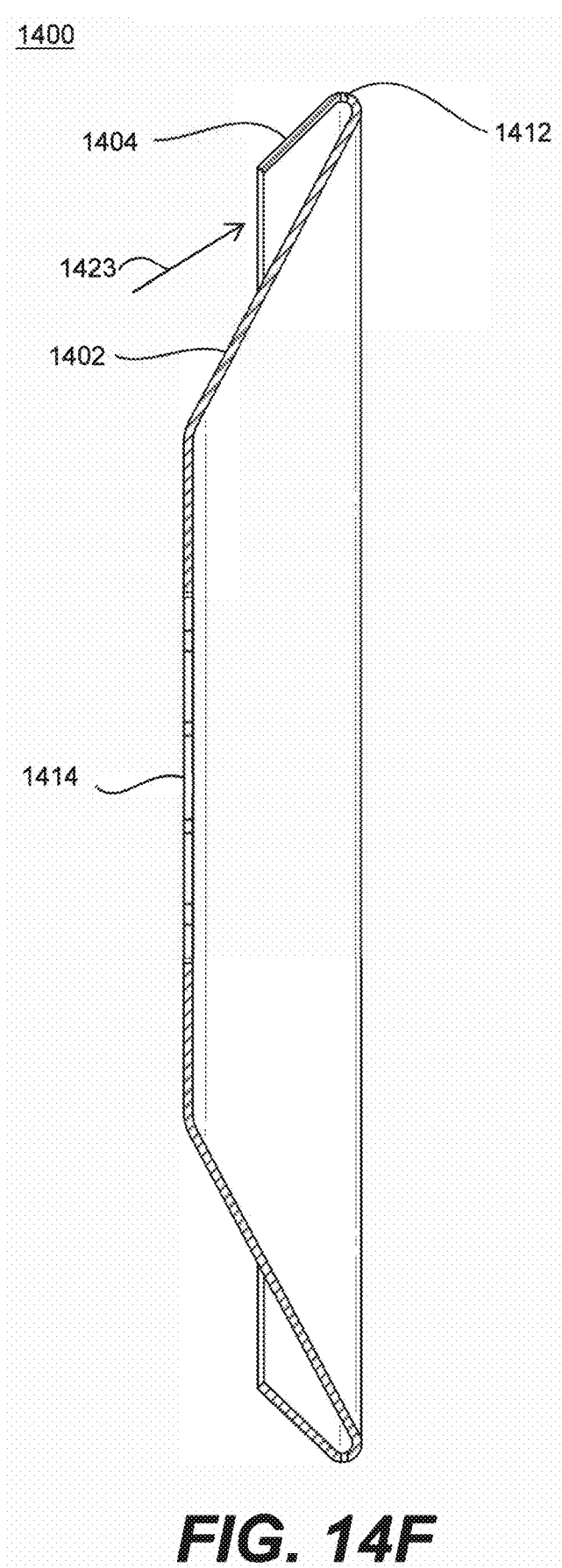

FIG. 14F illustrates a cross-section view of collar 1400, consistent with embodiments of the present disclosure. Collar 1400 may be an exemplary collar included in electric propulsion systems as described herein. Collar 1400 may have a first portion 1402 and a second portion 1404, with a plurality of openings 1412 disposed between the first portion 1402 and the second portion 1404. As an example, second portion 1404 may be a portion of collar 1400 bent toward first portion 1402 (e.g., as compared to the bend between first portion 1402 and second portion 1404 bent toward an inner edge of collar 1400 as referenced in FIG. 14E). A channel may be formed between first portion 1402 and second portion 1404 such that fluid may be directed through opening 1412. In some examples, disclosed embodiments of a collar may include inlets or openings to receive fluid. For example, collar 1400 may include inlets or openings along outer edge 1414 to receive fluid, and such fluid may then experience centrifugal force and be directed through opening 1412. In some examples, collar 1400 may receive fluid from a side opposite to outer edge 1414. Additionally, or alternatively, collar 1400 may receive fluid from direction 1423.

Figure 14G:
Figure 14G:
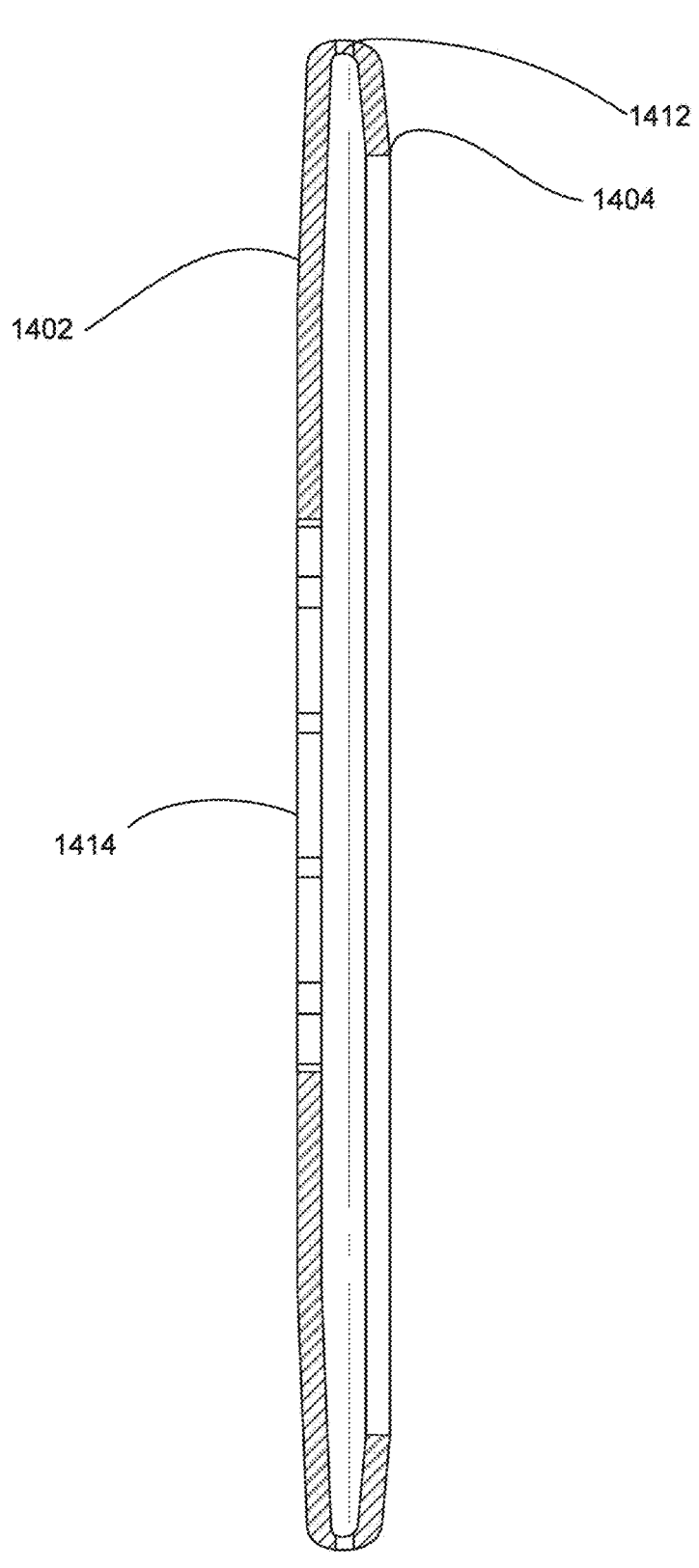
Figure 14H:
Figure 14H:
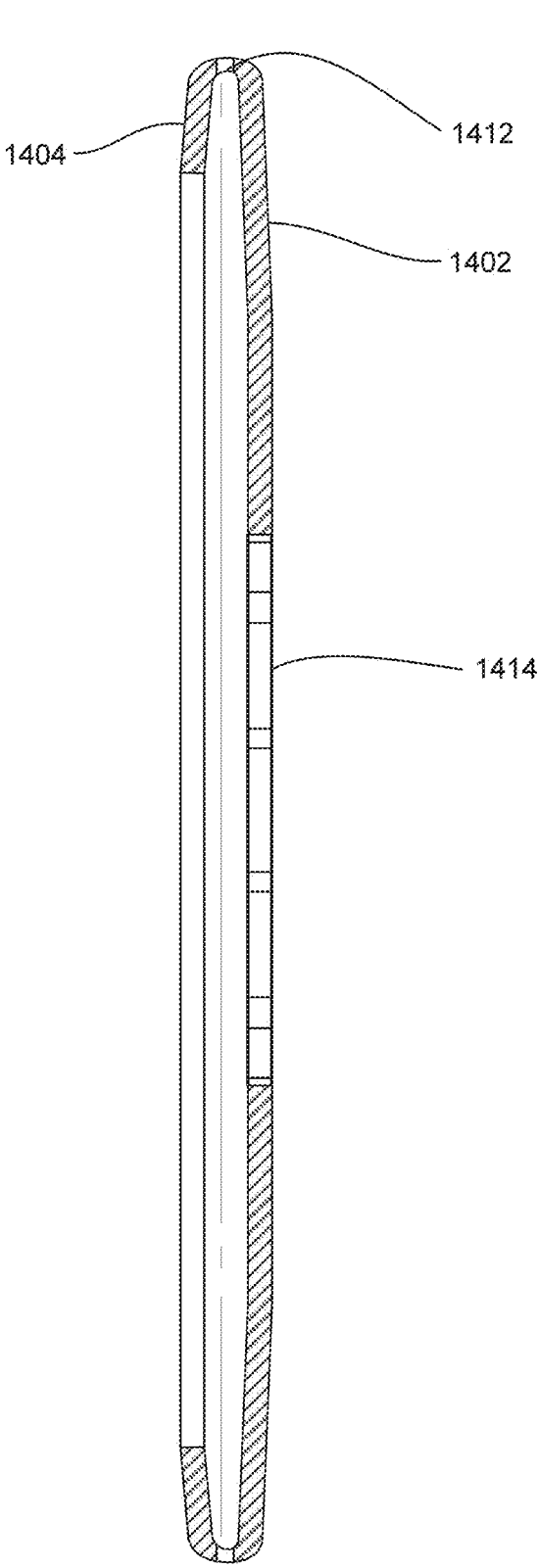

FIGS. 14G and 14H illustrate cross-section views of collar 1400, consistent with embodiments of the present disclosure. Collar 1400 may be an exemplary collar included in electric propulsion systems as described herein. For example, in some embodiments it may not be necessary to redirect oil around a rotor, thus collar 1400 may be, e.g., disc shaped and extend in a radial direction. Collar 1400 may be configured to direct fluids to components in an electric propulsion system located adjacent to opening 1412. Collar 1400 may have a channel formed between first portion 1402 and a second portion 1404, respectively. In examples where collar 1400 encircle a rotating component of an electric propulsion system (e.g., a main shaft), the channel formed may thereby also encircle the rotating component. In some examples, the formed channel may be configured to receive or collect fluids such as oil during operation of the electric propulsion system, or the formed channel may contain various amounts of the fluid (e.g., the amount of fluid contained in the channel may depend on the dimensions of the first portion 1402,1902, the second portion 1404, 1404, as well as the depth and/or diameter of openings 1412, 1412). As such, openings 1412, 1412 may be configured as nozzles to direct oil provided at higher pressure towards components of the electric propulsion system. Channels according to embodiments of the present disclosure may be bent toward or away from an output shaft direction of the electric propulsion system. For example, outer edge 1414 of collar 1400 referenced in FIG. 14G or outer edge 1414 of collar 1400 referenced in FIG. 14H may be oriented in any direction, such as a direction that allows openings 1412 to guide fluid towards a rotor of an engine. It will be appreciated that the orientation and shapes of collars as described herein may be configured depending on the configuration of the electric propulsion system. For example, second portion 1404 may be disposed proximate to components of an electric propulsion system which may provide oil to collar 1400, such as various bearings or fluid passageways in the electric propulsion system.

Figure 14I:
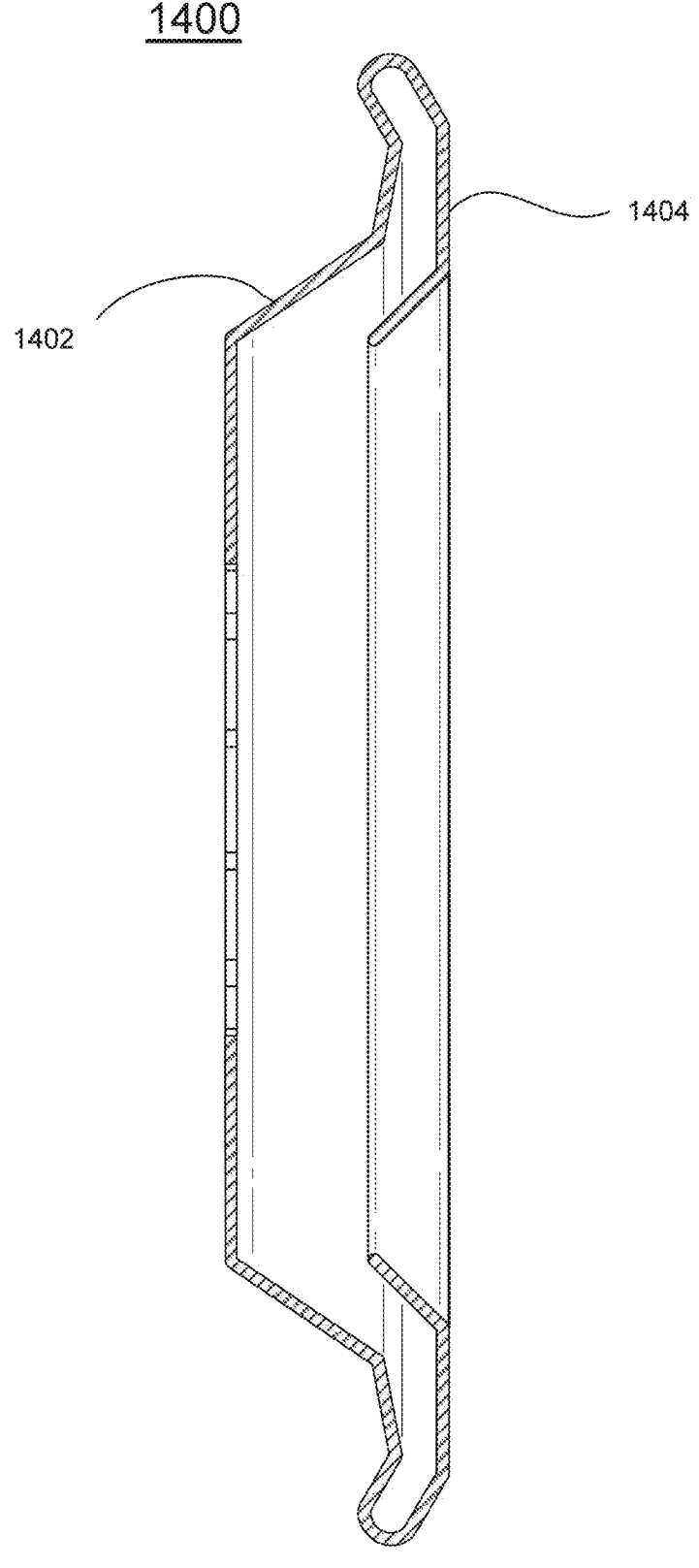

FIG. 14I illustrates a cross-sectional view of collar 1400, consistent with embodiments of the present disclosure. For example, electric propulsion system 1300, as referenced in FIG. 13I, may include collar 1400. Collar 1400 may include first portion 1402 and second portion 1404, which may be formed to direct fluid in the collar towards various locations or components in the electric propulsion system. In some embodiments, first portion 1402 and/or second portion 1404 may be configured based on components of the electric propulsion system. For example, the channel formed between first portion 1402 and second portion 1404 may be configured according to spatial constraints in the electric propulsion system. The first portion and/or second portion 1404 may include various segment lengths, various amount of segments, and various angles between segments according to such spatial constraints from other components in the electric propulsion system. For example, to direct fluid around components in the electric propulsion system, collar 1400 may include a first portion 1402 and/or second portion 1404 having angled segments such that the channel formed between first portion 1402 and second portion 1404 can direct fluid around the components and provide a path to travel to a desired location. Thus, collar 1400

Figure 15A:
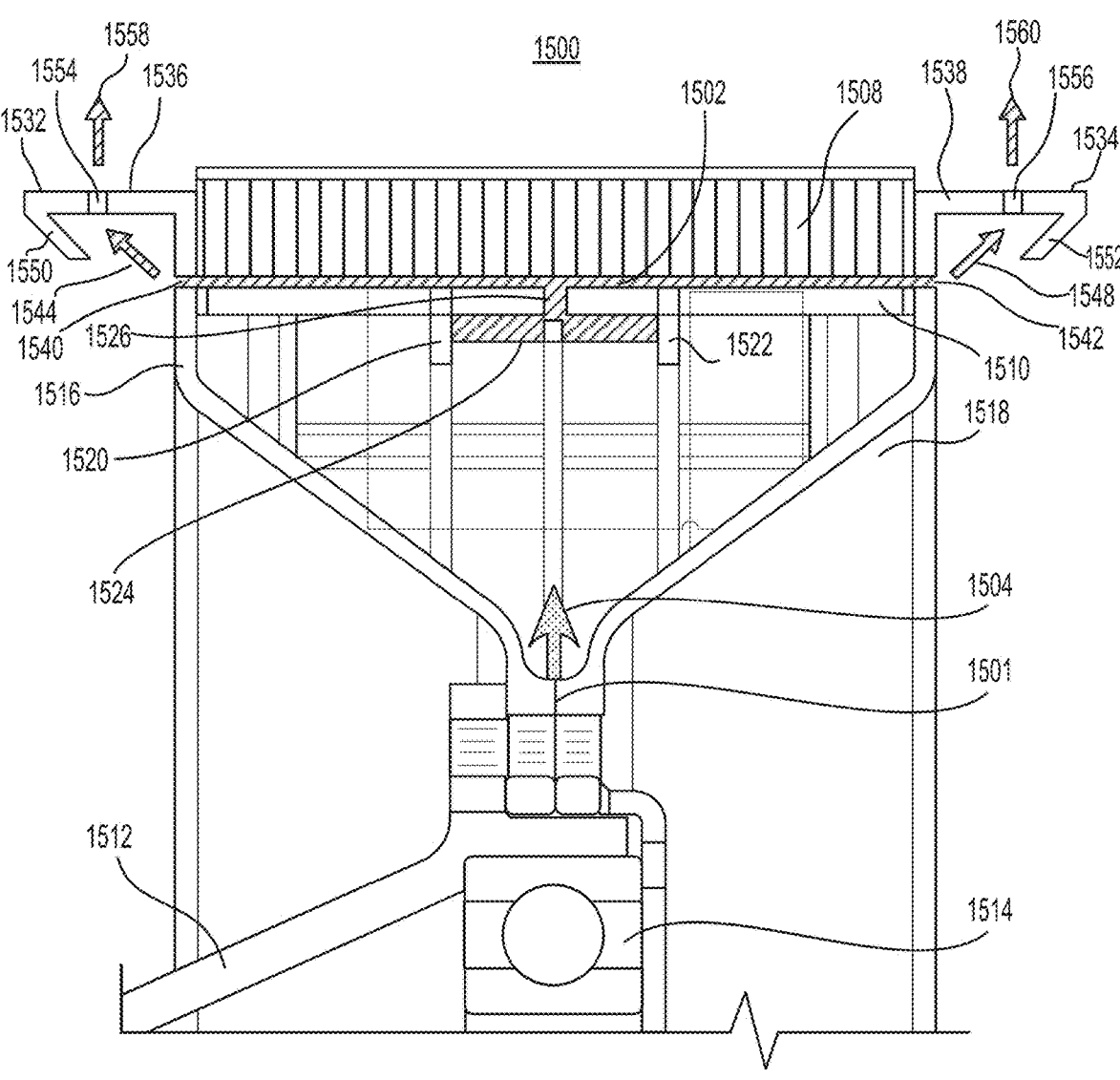
FIGS. 15A-15C are illustrations of rotor assemblies and electric motor assemblies, consistent with disclosed embodiments.
Figure 15B:
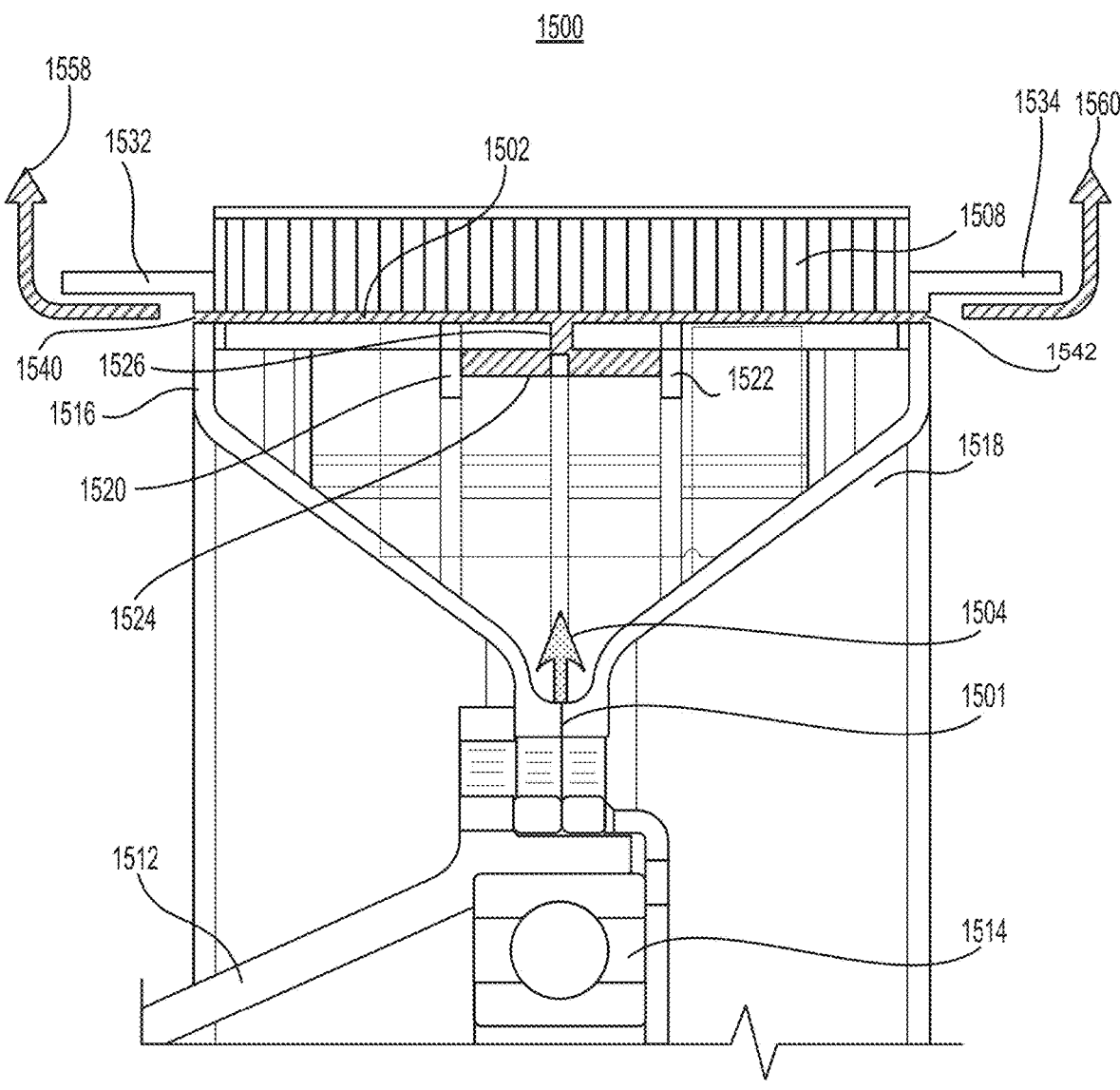
Figure 15C:
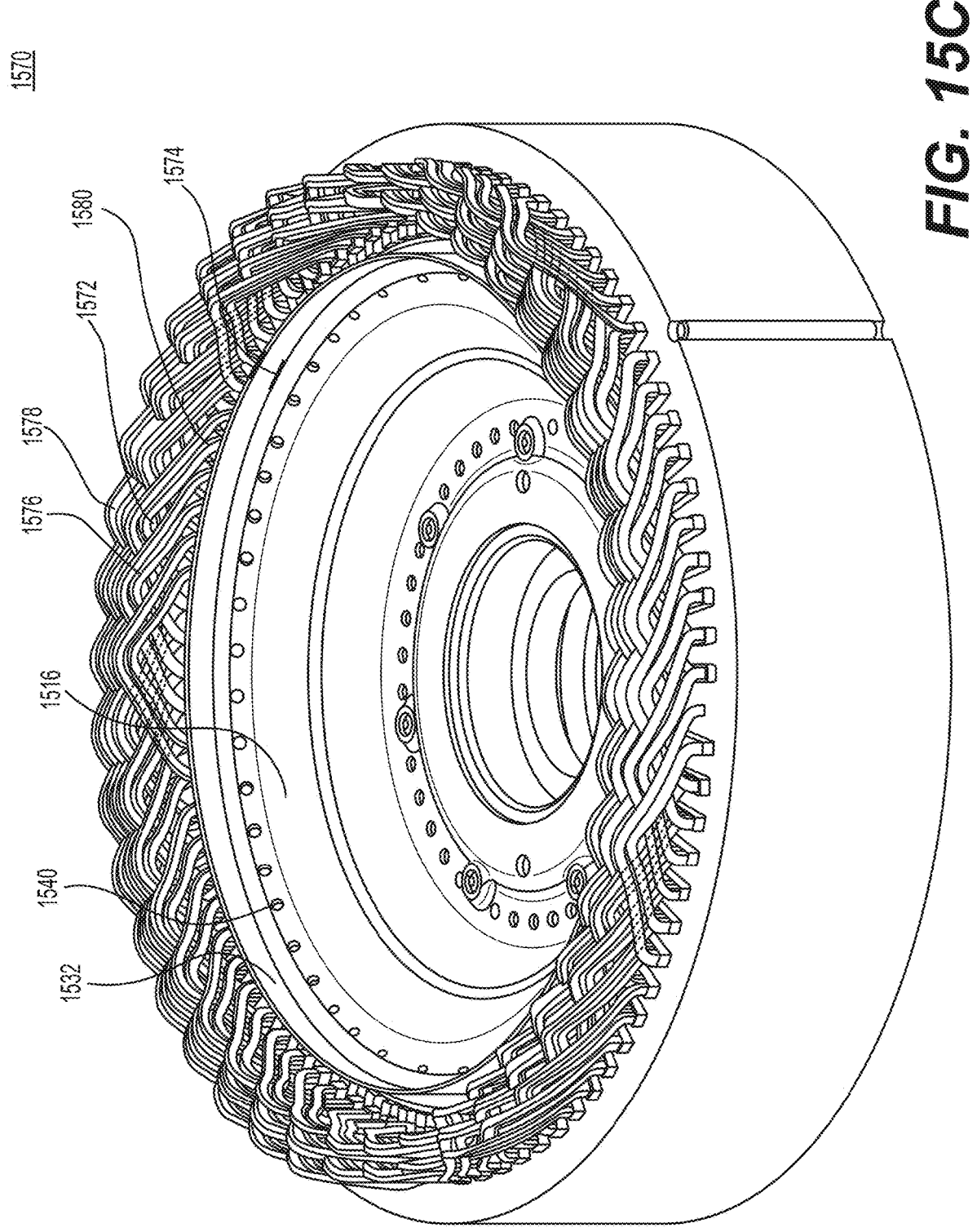

FIGS. 15A-15C illustrate views of a rotor assembly, consistent with embodiments of the present disclosure. In some embodiments, rotor assemblies may be configured to provide improved cooling for components of an electric propulsion system, including the stator windings of an electric motor. It will be appreciated that cooling the windings of a stator may assist in reducing efficiency losses in the stator, increasing the lifespan of the stator, and maintaining consistent stator performance. Some rotor assemblies may provide cooling to stators by splashing oil onto the rotor magnets and stator windings; however, such rotor assemblies may not provide adequate cooling to the stator windings, as oil may not reach some portions of the stator windings. In some embodiments, rotor assemblies as described herein may provide improved cooling to stator windings of an electric motor through improved flow of fluids to the stator windings and/or by increased heat transfer capabilities. Rotor assemblies as described herein may include features which can direct oil to a certain portion of the stator windings. For example, a rotor assembly may direct oil as desired to the top, middle, or bottom portions of stator windings (e.g., it may be desired to guide oil to the top, middle, or bottom according to the surface area of the windings in these portions). Additionally, or alternatively, a rotor assembly may include features which can increase the heat transfer capabilities of oil that cools the stator windings. For example, a rotor assembly may increase the speed of oil directed to the stator windings, thereby providing an increased rate of heat transfer.

FIG. 15A illustrates a cross-sectional view of a rotor assembly 1500, consistent with embodiments of the present disclosure. Rotor assembly 1500 may refer to any rotor assembly described herein, such as rotor assembly 1102 as referenced in FIG. 11. In some embodiments, rotor assembly 1500 may include features for directing coolant flow to stator windings and/or features for increasing heat transfer efficiency for fluids used to cool the stator windings. In some embodiments, rotor assembly 1500 may include one or more rotor hubs, as described herein. For example, rotor assembly 1500 may include first rotor hub 1516 and second rotor hub 1518. First rotor hub 1516 and/or second rotor hub 1518 may contact hollow shaft 1512. For example, hollow shaft 1512 may comprise part of a sun gear, as described herein. In some embodiments, rotor assembly 1500 may include lamination core 1510. A lamination core may refer to a core of an electric motor. In some embodiments, lamination core 1510 may be comprised of metals such as steel or iron. Lamination core 1510 may assist in transferring magnetic flux between different poles on the stator or rotor of an electric motor. Lamination cores may refer to a back iron, steel core, steel laminations, or lamination stack. In some embodiments, lamination core 1510 may support rotor magnets 1508. In some embodiments, lamination core 1510 may assist in the collection and distribution of fluids that may be used to cool components of electric propulsion systems as described herein, such as providing cooling to stator windings. For example, oil in the electric propulsion system may be used to cool magnets 1508 and the stator windings as well as provide lubrication for hollow shaft 1512 or bearing 1514. As described herein, fluids in rotor assembly 1500 may experience centrifugal force, such as centrifugal force due to the rotation of the rotor assembly and/or shafts in the electric propulsion system (e.g., hollow shaft 1512 or a main shaft). For example, oil flowing adjacent to hollow shaft 1512 or bearing 1514 may experience centrifugal force, and may be directed towards the rotor hubs. In some embodiments, rotor hubs may assist in distributing and directing fluids for cooling. For example, centrifugal force may drive or splash the oil such that the oil enters gap 1501 between first rotor hub 1516 and second rotor hub 1518, and the centrifugal force may drive the oil to travel in a direction 1504 towards the lamination core 1510. In some embodiments, lamination core 1510 may include wall 1520 (e.g., a dam) and wall 1522, such that when oil moves in direction 1504 toward lamination core 1510, the oil forms a collection of oil, such as pool 1524. Centrifugal force or pressure may drive fluid from the pool, through opening 1526 to cavity 1502. In some embodiments, opening 1526 may be provided to allow for the flow of fluids such as oil. For example, opening 1526 may be a leak path or hole such that pressure drives the movement of oil through the opening 1526 and into the cavity 1502. For example, cavity 1502 may be a passageway between magnets 1508 and lamination core 1510, such that oil residing in cavity 1502 may contact the magnets and provide cooling, such as directly contacting magnets 1508 to provide heat exchange. In some embodiments, rotor hubs may assist in directing fluids towards stator windings. For example, first rotor hub 1516 and/or second rotor hub 1518 may include a collar, as described herein. In some embodiments, the collar may be formed as a flange. For example, first rotor hub 1516 may have a flange 1532. Additionally, or alternatively, second rotor hub 1518 may have a flange 1534. Flanges 1532,1534 may be any extension or projection of first rotor hub 1516 or second rotor hub 1518, such as a lip, edge, collar, or rim. For example, flanges 1532,1534 may be a continuous portion of rotor hub 1516 or rotor hub 1518 (e.g., machined as a continuous part) or flanges 1532, 1534 may be joined to rotor hub 1516 or rotor hub 1518 (e.g., through welding or fasteners).

In some embodiments, flanges 1532, 1534 of rotor hubs may include first portions 1536, 1538 and second portions 1550, 1552. First portions 1536, 1538 may include one or more openings to assist with directing and distributing fluid. In some embodiments, first portions 1536, 1538 may have openings 1540,1542. For example, openings 1540, 1542 may be an opening disposed along first portions 1536, 1538. Openings 1540, 1542 may be any opening as described herein, such as a hole or slit configured to permit fluid to pass through. For example, Centrifugal force may drive or direct fluid from cavity 1502 through openings 1540,1542. In some embodiments, the first and second portions of flanges may form a channel, as described herein. For example, flange 1532 of rotor hub 2216 may include first portion 1536 and second portion 1550 which form a channel 1544 of oil received from opening 1540. Similarly, flange 1534 of rotor hub 2218 may include first portion 1538 and second portion 1552 which form a channel 1548 of oil received from opening 1542. As described herein, fluids collected in channel 1544, 1548 may form a fluid column, such as a column of oil collected between the first portion(s) 1536, 1538, and respective second portion(s) 1550, 1552 due to centrifugal force. For example, the fluid column may be the volume of oil accumulated between first portion 1538 and second portion 1550. In some embodiments, flanges 1532, 1534 may include openings to direct fluid towards components of the electric propulsion system. For example, first portions 1532, 1538 may include openings 1554,1556. In some embodiments, first portions 1532, 1538 may direct fluids towards the stator. For example, first portions 1536, 1538 may include openings 1554, 1556 configured to direct oil in direction(s) 1558,1560 (e.g., away from magnets 1508 and towards stator windings). In the example, centrifugal force may direct oil in channels 1544, 1548 through openings 1552, 1556, in direction(s) 1558, 1560. In some embodiments, openings 1552,1556 may be sized based on, e.g., dimensions of flanges or of rotor hubs, expected RPM ranges of the rotor assembly 1500, or desired pressures or flow rates of oil through the openings 1552, 1556. In some examples, the diameter of opening 1552 may be sized to be smaller than that of the channel 1544. In such an example, as the fluid (e.g., oil) travels from channel 1544 through the opening 1552 due to centrifugal force, since the opening 1552 has a smaller cross-sectional area than channel 1544, the fluid may experience an increase in pressure resulting in a higher velocity as it exits the channel through the opening. Thus the fluid column may create a pressure head that causes fluid travelling in direction 1558 to be ejected from opening 1552, and opening 1552 may thus act as a jet or spray nozzle and cause the fluid to exit at a higher speed, as described herein.

FIG. 15B illustrates a cross-sectional view of a rotor assembly 1500, consistent with embodiments of the present disclosure. As described herein, rotor hubs 1516, 1518 may have flanges 1532, 1534 which assist in distributing fluids. In some embodiments, flanges 1532, 1534 may distribute fluids by allowing fluids to splash onto various components within the electric propulsion system. For example, flanges 1532, 1534 may include openings 1540, 1542. As described herein, centrifugal force may drive fluid in cavity 1502 through openings 1540, 1542. The flanges 1532, 1534 may direct the fluid in direction 1558, 1560 towards components of the electric propulsion system, such as towards stator windings. Flanges 1532, 1534 may thus guide oil in rotor assembly 1500 towards stator windings. In some embodiments, rotor assembly 1500 as illustrated in FIG. 15B may not include channels. For example, flanges 1532, 1534 may extend further outwards than the magnets of the rotor assembly, thereby guiding oil towards stator windings without the use of channels by splashing the oil onto the stator windings.

FIG. 15C illustrates an electric motor assembly, consistent with embodiments of the present disclosure. In some embodiments, electric motor assembly 1570 may include stator windings 1572 and a rotor assembly, such as rotor assembly 1500 as referenced in FIGS. 15A and 15B. For example, electric motor assembly 1570 may include rotor hub 1516 having flange 1532, as described herein. In some embodiments, rotor hub 1516 may include openings 1540. For example, the openings 1540 may be disposed along a first portion of flange 1532. As described with reference to FIG. 15B, centrifugal force may drive oil in the rotor assembly through openings 1540 in a direction along flange 1532 towards stator windings 1572. Thus, it will be appreciated that the disclosed embodiments provide cooling to the stator windings 1572. In some embodiments, the size of flanges 1572 may be configured to target various areas of stator windings 1572 for cooling. For example, the size 1574 (e.g., the length or height) of flange 1532 may enable oil to be distributed to the center 1576 of stator windings 1572, since oil exiting openings 1540 travels along the length of flange 1532. Thus, the size 1574 can be modulated such that oil travels along the length of flange 1532 and then splashes onto the center 1576 of stator windings 1572. Additionally, or alternatively, the size 1574 of flanges 1532 may be increased or decreased to provide oil to the top 1578 or bottom 1580 of stator windings 1572. For example, the size of flange 1532 can be modulated so that the distance the fluid travels along it can be shortened or lengthened, thereby adjusting the position at which the fluid splashes onto stator windings 1572. Thus, it will be appreciated that the disclosed embodiments provide increased cooling to stator windings of electric propulsion systems and can provide targeted cooling to different portions of the stator windings, which may enable improved cooling efficiency by providing cooling to portions of the windings which would benefit most from cooling (e.g., such as regions with larger surface areas of stator windings). In some embodiments, flange 1532 may include openings which enable a nozzle or squirting effect, as described herein with respect to FIG. 15A. For example, as described with reference to rotor assembly 1500 in FIG. 15A, flange 1532 of electric motor assembly 1570 in FIG. 15C may have a portion bent inward (e.g., towards the center of electric motor assembly 1570). Such portion may form a channel and such portion may have additional openings (e.g., similar to openings 1554 as referenced in FIG. 15A), so that the channel can collect oil from openings 1540 and guide the oil along flange 1532 toward the additional openings. For example, as oil travels through openings 1540 or other openings of flanges 1532, the oil may have a high velocity, resulting in an increased heat transfer coefficient and ability to travel to farther portions of the stator windings.

In some embodiments, rotor assembly 1500 may include a single rotor hub, and the rotor hub may be configured to direct fluids towards the stator windings. For example, a rotor hub may contain a channel or passageway (e.g., a fluid passageway formed within the interior surface of the rotor hub).

Figure 16:
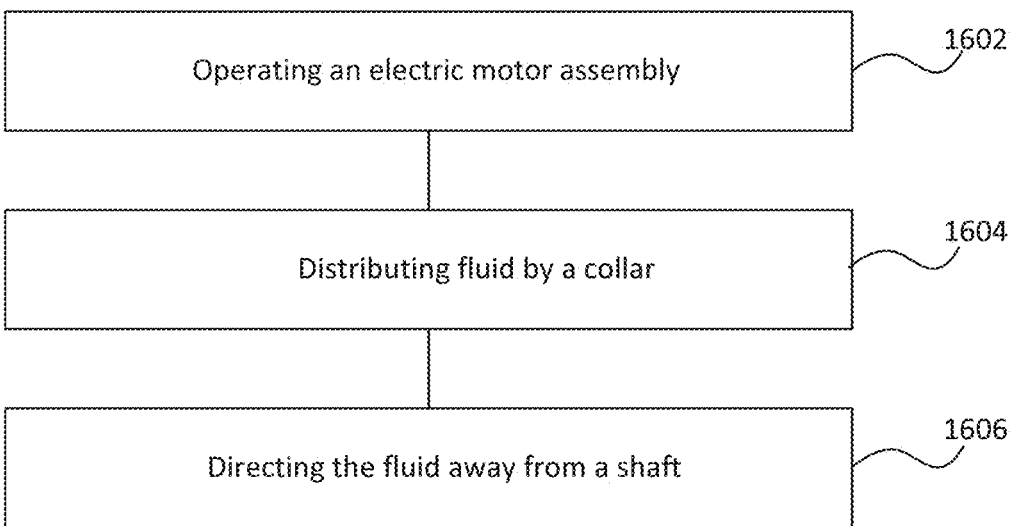
FIG. 16 is a flow diagram of an exemplary process of operating an electric propulsion system, consistent with disclosed embodiments.

FIG. 16 illustrates a flow diagram of a method 1600 of operating an electric propulsion system, consistent with embodiments of the present disclosure. In some embodiments, method 1600 may involve a step 1602 of operating an electric motor assembly. Operating an electric motor assembly may involve using an electric motor assembly (e.g., for an electric propulsion system as described herein). In some embodiments, the electric motor assembly may include a rotor and a stator. In some examples, the stator may have end windings. In some embodiments, step 1602 may involve rotating a main shaft connected to the rotor. In some examples, the rotor may be directly connected to the main shaft. In some examples, the rotor may be connected to the main shaft through a gear reduction. For example, the rotor may drive the rotation of the main shaft, which may propel the electric propulsion system (e.g., by driving a propeller in the case of aircraft).

In some embodiments, method 1600 may involve a step 1604 of distributing fluid by a collar. Method 1600 may involve feeding the fluid to the collar from one or more rotating components of the electric propulsion system, such as the main shaft or various bearings as described herein. The fluid may include oil. In some examples, the collar may be connected to the main shaft. In some examples, the collar may encircle the main shaft. The collar may be include a channel which may be used to distribute the fluid. The collar may include a first portion and a second portion, and the channel may be formed between the first portion and the second portion. In some examples, the first portion my extend outward from the main shaft, and the second portion may extend inward toward the main shaft in relation to the first portion.

In some embodiments, method 1600 may involve a step 1606 of directing the fluid away from the main shaft. For example, method 1600 may involve directing the fluid in the channel away from the main shaft, through one or more openings in the collar, and towards end windings of the stator. For example, a pressure head may be formed in the channel by the centrifugal forces exerted on the fluid. In some embodiments, step 1606 may involve directing the fluid in a first direction by a first opening and directing the fluid in a second direction by a second opening.

The embodiments may further be described using the following clauses:

Clause Set A: 1. An electric propulsion system, comprising an electric motor assembly including a rotor and a stator, the stator having end windings; a main shaft connected to the rotor; and a collar connected to a rotating component of the electric motor assembly, wherein: the collar encircles the main shaft, and the collar comprises a channel configured to direct a fluid away from the main shaft, through at least one opening in the collar, and toward the end windings.

2. The system of clause A1, wherein the collar comprises a first portion and a second portion, and the channel is formed between the first portion and the second portion.

3. The system of clause A2, wherein the first portion extends outward from the main shaft, and the second portion extends inward toward the main shaft in relation to the first portion.

4. The system of clause A2, wherein one of the first portion or the second portion comprises a bend configured to direct the fluid around the rotor.

5. The system of clause A4, further comprising a bearing at an output end of the main shaft, wherein the bend is disposed adjacent to the bearing.

6. The system of clause A1, wherein the rotating component comprises the main shaft.

7. The system of clause A1, wherein the rotating component comprises the rotor.

8. The system of clause A1, wherein the fluid is fed to the collar from the rotating component of the electric propulsion system.

9. The system of clause A8, wherein the rotating component includes a bearing at an output end of the main shaft.

10. The system of clause A1, wherein a fluid pressure at the at least one opening depends on a depth of the fluid in the channel and a rotational speed of the collar.

11. The system of clause A1, wherein the at least one opening in the collar comprises a slit.

12. The system of clause A1, wherein the at least one opening in the collar comprises a plurality of openings in the collar.

13. The system of clause A12, wherein: a first opening of the plurality of openings is configured to direct the fluid in a first direction; and a second opening of the plurality of openings is configured to direct the fluid in a second direction different from the first direction.

14. The system of clause A1, wherein the main shaft is connected to the rotor via a gear reduction, and the main shaft extends through the rotor.

15. The system of clause A1, wherein the electric propulsion system is configured to provide propulsion for an electric aircraft.

16. The system of clause A15, wherein the electric aircraft is an electric vertical takeoff and landing (eVTOL) aircraft.

17. The system of clause A1, further comprising an inverter mounted to a first end of a housing of the electric motor assembly, wherein the stator receives electricity from the power inverter.

18. The system of clause A1, wherein the fluid comprises oil.

19. A method of operating an electric propulsion system, the method comprising: operating an electric motor assembly including a rotor and a stator by rotating a main shaft connected to the rotor, wherein the stator includes end windings; distributing fluid by a collar connected to the main shaft, wherein the collar encircles the main shaft and the collar comprises a channel; and directing the fluid away from the main shaft, through at least one opening in the collar, and toward the end windings.

20. The method of clause A19, wherein the collar comprises a first portion and a second portion, and the channel is formed between the first portion and the second portion.

21. The method of clause A20, wherein the first portion extends outward from the main shaft, and the second portion extends inward toward the main shaft in relation to the first portion.

22. The method of clause A20, wherein one of the first portion or the second portion comprises a bend configured to direct the fluid around the rotor.

23. The method of clause A22, further comprising a bearing at an output end of the main shaft, wherein the bend is disposed adjacent to the bearing.

24. The method of clause A19, further comprising feeding the fluid to the collar from one or more rotating components of the electric propulsion system.

25. The method of clause A24, wherein the one or more rotating components includes a bearing at an output end of the main shaft.

26. The method of clause A19, wherein a fluid pressure at the at least one opening depends on a depth of the fluid in the channel and a rotational speed of the collar.

27. The method of clause A19, wherein the at least one opening in the collar comprises a slit.

28. The method of clause A19, wherein the at least one opening in the collar comprises a plurality of openings in the collar.

29. The method of clause A28, further comprising: directing the fluid in a first direction by a first opening of the plurality of openings; and directing the fluid in a second direction different from the first direction by a second opening of the plurality of openings 30. The method of clause A19, wherein the main shaft is connected to the rotor via a gear reduction, and the main shaft extends through the rotor.

31. An electric propulsion system comprising the electric propulsion system of any of clauses A1-A30.

The embodiments disclosed herein are intended to be non-limiting. Those of ordinary skill in the art will appreciate that certain components and configurations of components may be modified without departing from the scope of the disclosed embodiments. It is also intended that the sequence of steps shown in figures are only for illustrative purposes and are not intended to be limited to any particular sequence of steps. As such, those skilled in the art can appreciate that these steps can be performed in a different order while implementing the same method.

What is claimed is:

1. An electric propulsion system, comprising:
an electric motor assembly including a rotor and a stator, the stator having end windings;
a main shaft connected to the rotor; and
a collar connected to a rotating component of the electric motor assembly, wherein:
the collar encircles the main shaft, and
the collar comprises a channel configured to direct a fluid away from the main shaft, through at least one opening in the collar, and toward the end windings.

2. The system of claim 1, wherein the collar comprises a first portion and a second portion, and the channel is formed between the first portion and the second portion.

3. The system of claim 2, wherein the first portion extends outward from the main shaft, and the second portion extends inward toward the main shaft in relation to the first portion.

4. The system of claim 2, wherein one of the first portion or the second portion comprises a bend configured to direct the fluid around the rotor.

5. The system of claim 4, further comprising a bearing at an output end of the main shaft, wherein the bend is disposed adjacent to the bearing.

6. The system of claim 1, wherein the rotating component comprises the main shaft.

7. The system of claim 1, wherein the rotating component comprises the rotor.

8. The system of claim 1, wherein the fluid is fed to the collar from the rotating component of the electric propulsion system.

9. The system of claim 8, wherein the rotating component includes a bearing at an output end of the main shaft.

10. The system of claim 1, wherein a fluid pressure at the at least one opening depends on a depth of the fluid in the channel and a rotational speed of the collar.

11. The system of claim 1, wherein the at least one opening in the collar comprises a slit.

12. The system of claim 1, wherein the at least one opening in the collar comprises a plurality of openings in the collar.

13. The system of claim 12, wherein:

a first opening of the plurality of openings is configured to direct the fluid in a first direction; and a second opening of the plurality of openings is configured to direct the fluid in a second direction different from the first direction.

14. The system of claim 1, wherein the main shaft is connected to the rotor via a gear reduction, and the main shaft extends through the rotor.

15. The system of claim 1, wherein the electric propulsion system is configured to provide propulsion for an electric aircraft.

16. The system of claim 15, wherein the electric aircraft is an electric vertical takeoff and landing (eVTOL) aircraft.

17. The system of claim 1, further comprising an inverter mounted to a first end of a housing of the electric motor assembly, wherein the stator receives electricity from the inverter.

18. The system of claim 1, wherein the fluid comprises oil.

19. A method of operating an electric propulsion system, the method comprising:

operating an electric motor assembly including a rotor and a stator by rotating a main shaft connected to the rotor, wherein the stator includes end windings;

distributing fluid by a collar connected to the main shaft, wherein the collar encircles the main shaft and the collar comprises a channel; and directing the fluid away from the main shaft, through at least one opening in the collar, and toward the end windings.

20. The method of claim 19, wherein the collar comprises a first portion and a second portion, and the channel is formed between the first portion and the second portion.

* * * * *